(12) United States Patent
Yamato et al.

(10) Patent No.: US 10,781,552 B2
(45) Date of Patent: Sep. 22, 2020

(54) MICRO CELLULOSE FIBER COMPLEX

(71) Applicant: KAO CORPORATION, Tokyo (JP)

(72) Inventors: Kyohei Yamato, Wakayama (JP); Yoshiaki Kumamoto, Wakayama (JP)

(73) Assignee: KAO CORPORATION, Tokyo (JP)

( * ) Notice: Subject to any disclaimer, the term of this patent is extended or adjusted under 35 U.S.C. 154(b) by 77 days.

(21) Appl. No.: 15/108,211

(22) PCT Filed: Dec. 11, 2014

(86) PCT No.: PCT/JP2014/082836
§ 371 (c)(1),
(2) Date: Jun. 24, 2016

(87) PCT Pub. No.: WO2015/098544
PCT Pub. Date: Jul. 2, 2015

(65) Prior Publication Data
US 2016/0340827 A1 Nov. 24, 2016

(30) Foreign Application Priority Data

Dec. 26, 2013 (JP) ................................ 2013-270216
Nov. 28, 2014 (JP) ................................ 2014-241846

(51) Int. Cl.
| | | |
|---|---|---|
| *C08B 15/00* | (2006.01) | |
| *D06M 15/53* | (2006.01) | |
| *C08B 15/04* | (2006.01) | |
| *C08L 1/04* | (2006.01) | |
| *C08L 63/00* | (2006.01) | |
| *D06M 13/17* | (2006.01) | |
| *C08L 33/08* | (2006.01) | |
| *D06M 13/325* | (2006.01) | |
| *C08L 33/10* | (2006.01) | |
| *C08L 67/00* | (2006.01) | |
| *C08L 101/00* | (2006.01) | |
| *D06M 13/402* | (2006.01) | |
| *D06M 101/06* | (2006.01) | |

(52) U.S. Cl.
CPC ............. *D06M 15/53* (2013.01); *C08B 15/00* (2013.01); *C08B 15/04* (2013.01); *C08L 1/04* (2013.01); *C08L 33/08* (2013.01); *C08L 33/10* (2013.01); *C08L 63/00* (2013.01); *C08L 67/00* (2013.01); *C08L 101/00* (2013.01); *D06M 13/17* (2013.01); *D06M 13/325* (2013.01); *D06M 13/402* (2013.01); *C08L 2205/16* (2013.01); *D06M 2101/06* (2013.01)

(58) Field of Classification Search
CPC ........................... C08B 15/00; C09D 197/02
See application file for complete search history.

(56) References Cited

U.S. PATENT DOCUMENTS

| | | | | |
|---|---|---|---|---|
| 9,534,091 | B2* | 1/2017 | Saiki | ............................ C08J 3/05 |
| 2006/0142478 | A1* | 6/2006 | Luo | ............................ C08B 11/12 |
| | | | | 525/54.1 |
| 2006/0142483 | A1 | 6/2006 | Weerawarna | |
| 2009/0005471 | A1 | 1/2009 | Bauer et al. | |
| 2010/0063177 | A1 | 3/2010 | Takenaka et al. | |
| 2012/0283363 | A1* | 11/2012 | Kumamoto | .............. C08J 5/045 |
| | | | | 524/35 |
| 2013/0000512 | A1 | 1/2013 | Saiki et al. | |
| 2015/0011685 | A1 | 1/2015 | Mori et al. | |

FOREIGN PATENT DOCUMENTS

| | | |
|---|---|---|
| CN | 102652154 A | 8/2012 |
| CN | 102791789 A | 11/2012 |
| EP | 1 586 619 A2 | 10/2005 |
| JP | 2008-174718 A | 7/2008 |
| JP | 2011-47084 A | 3/2011 |
| JP | 2011-140738 A | 7/2011 |
| WO | WO 2013/077354 A1 | 5/2013 |
| WO | WO 2013/077354 A1 | 5/2013 |
| WO | WO 2013/099770 A1 | 7/2013 |
| WO | WO 2013/099770 A1 | 7/2013 |

OTHER PUBLICATIONS

Huntsman Corporation, "The FEFFAMINE Polyetheramines", 2007.*
Lasseuguette et al., Grafting onto microfrils of native cellulose, Cellulose, vol. 15, issue 4, pp. 571-580, 2008.*
Johnson et al., Ppreparation and Characterization of hydrophobic derivatives of TEMPO-oxidized nanocellulose, Cellulose, vol. 18, pp. 1599-1609, 2011.*
Extended European Search Report for European Application No. 14875027.6, dated Jul. 5, 2017.
Korean Office Action for Korean Application No. 10-2016-7018229, dated Jun. 30, 2017.
Chinese Search Report for Chinese Application No. 201480019297.4, dated Apr. 13, 2016.
International Search Report (Form PCT/ISA/210) for International Application No. PCT/JP2014/082836, dated Mar. 17, 2015.

(Continued)

Primary Examiner — Monique R Peets
(74) Attorney, Agent, or Firm — Birch, Stewart, Kolasch & Birch, LLP

(57) ABSTRACT

A fine cellulose fiber composite containing fine cellulose fibers and a polymer having an ethylene oxide/propylene oxide (EO/PO) copolymer moiety or a propylene oxide (PO) polymer moiety, the fine cellulose fibers being connected with the polymer via an amide bond. The fine cellulose fiber composite of the present invention has high dispersibility in the resin and can exhibit an effect of increasing strength, so that the fine cellulose fiber composite is suitably used as various fillers, and the like. Also, the resin composition of the present invention containing a dispersion of the fine cellulose fiber composite can be suitably used in various industrial applications such as daily sundries, household electric appliance parts, wrapping materials for household electric appliance parts, and automobile parts.

18 Claims, No Drawings

(56) References Cited

OTHER PUBLICATIONS

Lasseuguette, "Grafting onto microfibrils of native cellulose," Cellulose, vol. 15, 2008 (Published online Feb. 6, 2008), pp. 571-580.
Chinese Office Action, dated Aug. 19, 2016, for Chinese Application No. 2014880019297.4.
Chinese Office Action and Search Report issued in the corresponding Chinese Patent Application No. 201710804832.2 dated Aug. 5, 2019.

* cited by examiner

MICRO CELLULOSE FIBER COMPLEX

FIELD OF THE INVENTION

The present invention relates to a fine cellulose fiber composite. More specifically, the present invention relates to a fine cellulose fiber composite which can be suitably blended as a nanofiller in daily sundries, household electric appliance parts, automobile parts, and the like, and a fine cellulose fiber composite dispersion and a resin composition each containing the fine cellulose fiber composite.

BACKGROUND OF THE INVENTION

Conventionally, plastic materials derived from limited resource petroleum have been widely used; however, in the recent years, techniques with less burdens on the environment have been spotlighted. In view of the technical background, materials using cellulose fibers, which are biomass existing in nature in large amounts have been remarked.

Patent Publication 1 discloses a polyester resin composition containing a polyester resin and a fine cellulose fiber composite in which fine cellulose fibers are bound with a hydrocarbon group via an amide bond, wherein the fine cellulose fiber composite has an average fiber size of from 0.1 to 200 nm.

Patent Publication 1: Japanese Patent Laid-Open No. 2013-151636

SUMMARY OF THE INVENTION

The present invention relates to the following [1] to [3]:
[1] A fine cellulose fiber composite containing fine cellulose fibers and a polymer having an ethylene oxide/propylene oxide (EO/PO) copolymer moiety or a propylene oxide (PO) polymer moiety, the fine cellulose fibers being connected with the polymer via an amide bond.
[2] A fine cellulose fiber composite dispersion, containing a fine cellulose fiber composite as defined in the above [1] and a plasticizer.
[3] A resin composition containing a thermoplastic resin or a curable resin and a fine cellulose fiber composite as defined in the above [1].

DETAILED DESCRIPTION OF THE INVENTION

In the composition containing a fine cellulose fiber composite of Patent Publication 1, it is not yet said to be sufficient in satisfying both transparency and mechanical strength.

The present invention relates to a fine cellulose fiber composite capable of providing a resin composition having a smaller amount of aggregates and having excellent transparency and heat resistance when blended with a plasticizer, and having excellent transparency and mechanical strength when blended with a thermoplastic resin or a curable resin, and a fine cellulose fiber composite dispersion and a resin composition each containing the composite. In addition, the present invention relates to a fine cellulose fiber composite capable of providing a resin composition having excellent mechanical strength when blended with a thermoplastic resin or a curable resin that does not require transparency, and a fine cellulose fiber composite dispersion and a resin composition each containing the composite.

The fine cellulose fiber composite of the present invention can provide a resin composition having excellent transparency and mechanical strength when blended with a thermoplastic resin or a curable resin (hereinafter simply referred to as a resin), and a resin composition having excellent mechanical strength when blended with a thermoplastic resin or a curable resin that does not require transparency. In addition, when blended with a plasticizer, some excellent effects that the aggregates in the dispersion obtained are small in amounts, and transparency and heat resistance are excellent are exhibited.

[Fine Cellulose Fiber Composite]

The fine cellulose fiber composite of the present invention has the feature that the composite contains fine cellulose fibers and a polymer having an ethylene oxide/propylene oxide (EO/PO) copolymer moiety or a propylene oxide (PO) polymer moiety, the fine cellulose fibers being connected with the polymer via an amide bond, which may be an amide bond of an amide group that is directly bonded to a C6 position of a cellulose backbone. The phrase " . . . and a polymer having an EO/PO copolymer moiety or a PO polymer moiety, . . . being connected with the polymer via an amide bond" as used herein means a state in which carbon atoms of the amide group is covalently bound with the cellulose backbone, so that a polymer having an EO/PO polymer moiety or a PO polymer moiety is covalently bound with a nitrogen atom directly or via a linking group. The fine cellulose fiber composite may sometimes be hereinafter referred to as a fine cellulose fiber composite A.

The reasons why the resin composition containing a fine cellulose fiber composite A of the present invention has excellent transparency and mechanical strength, and further has excellent heat resistance and dimensional stability depending upon the resins are considered to be as follows. The fine cellulose fiber composite A of the present invention contains fine cellulose fibers and an amine having a specified polymer chain, the fine cellulose fiber being covalently bound with the amine at a an already existing carboxy group on the surface thereof, so that dispersibility in the resin is increased due to repulsion caused by steric repulsion of the cellulose fiber composites themselves having the above ethylene oxide/propylene oxide (EO/PO) copolymer moiety or the propylene oxide (PO) polymer moiety, and at the same time affinity to the resin of the fine cellulose fiber composite itself is increased. Therefore, the dispersibility in the resin becomes excellent when blended with the resin, whereby it is made possible that a resin composition obtained has excellent mechanical strength while maintaining inherently owned transparency, and further improved heat resistance and dimensional stability depending upon the resins.

<Fine Cellulose Fibers>
(Average Fiber Size)

The average fiber size of the fine cellulose fibers constituting the fine cellulose fiber composite A usable in the present invention is preferably 0.1 nm or more, more preferably 0.2 nm or more, even more preferably 0.5 nm or more, even more preferably 0.8 nm or more, and still even more preferably 1 nm or more, from the viewpoint of producing a fine cellulose fiber composite having an average fiber size that gives even fiber sizes. Also, the average fiber size is preferably 200 nm or less, more preferably 100 nm or less, even more preferably 50 nm or less, even more preferably 20 nm or less, even more preferably 10 nm or less, and still even more preferably 5 nm or less, from the viewpoint of sufficiently improving mechanical strength when contained in a thermoplastic resin or curable resin to provide a resin composition (also referred to a composite material), and at the same time maintaining transparency, so that the resin further has excellent heat resistance or dimensional stability (these may be simply collectively referred to as mechanical strength or the like), depending upon the resins. Here, the average fiber size of the cellulose fibers as used herein can be measured with an interatomic force microscope (AFM), and specifically, the average fiber size can be measured in accordance with a method described in Examples set forth below. Generally, a minimum unit of cellulose nanofibers prepared from higher plants is packed in nearly square form having sizes of 6×6 molecular chains, so that the height analyzed in the image according to the AFM can be assumed to be a width of the fibers.

(Carboxy Group Content)

The carboxy group content of the fine cellulose fibers is preferably 0.1 mmol/g or more, more preferably 0.4 mmol/g or more, even more preferably 0.6 mmol/g or more, and even more preferably 0.8 mmol/g or more, from the viewpoint of allowing to stably finely pulverize and allowing amide formation. In addition, the carboxy group content is preferably 3 mmol/g or less, more preferably 2 mmol/g or less, even more preferably 1.8 mmol/g or less, and even more preferably 1.5 mmol/g or less, from the viewpoint of improving handling property. Fine cellulose fibers of which carboxy group content is outside the above range may be contained in the fine cellulose fibers used in the present invention as impurities unintentionally. Here, the term "carboxy group content" means a total amount of carboxy groups in the celluloses constituting the fine cellulose fibers, and specifically measured in accordance with a method described in Examples set forth below.

(Average Aspect Ratio)

The average aspect ratio (fiber length/fiber size) of the fine cellulose fibers is preferably 10 or more, more preferably 20 or more, even more preferably 50 or more, and still even more preferably 100 or more, from the viewpoint of sufficiently improving mechanical strength when contained in a resin to provide a composite material. In addition, the average aspect ratio is preferably 1,000 or less, more preferably 500 or less, even more preferably 400 or less, and still even more preferably 350 or less, from the viewpoint of inhibiting the lowering of the mechanical strength that accompanies the lowering of dispersibility in the resin. The fine cellulose fibers of which average aspect ratio is within the above range have excellent dispersibility in a resin and high mechanical strength when the fine cellulose fibers are blended in the resin, so that a resin composition which is hardly likely to undergo brittle fracture is obtained. Here, the average aspect ratio as used herein is obtained by taking an inverse of the aspect ratio of the cellulose fibers according to the following formula (1), from the relationship between a cellulose fiber concentration in the dispersion and a specific viscosity against water of the dispersion. Here, the following formula (1) is derived from viscosity equation (8.138) of a rigid rod-shape molecule described in *The Theory of Polymer Dynamics*, M. DOI and D. F. EDWARDS, CLARENDON PRESS•OXFORD, 1986, P312 and a relation of $Lb^2 \times \rho = M/N_A$, wherein L is a fiber length, b is a fiber width (assuming that a cross section of the cellulose fibers is a square), $\rho$ is a concentration of the cellulose fibers (kg/m³), M is a molecular weight, and $N_A$ is an Avogadro number. In addition, in the above viscosity formula (8.138), the rigid rod-shaped molecule is assumed as cellulose fibers. In the following formula (1), $\eta_{SP}$ is a specific viscosity, $\pi$ is a ratio of the circumference to a diameter, ln is a natural logarithm, P is an aspect ratio (L/b), $\gamma = 0.8$, $\rho_S$ is a density of a dispersion medium (kg/m³), $\rho_0$ is a density of cellulose crystals (kg/m³), and C is a mass concentration of cellulose (C=$\rho/\rho_S$).

$$\eta_{sp} = \frac{2\pi P^2}{45(\ln P - \gamma)} \times \frac{\rho_s}{\rho_0} \times C \quad (1)$$

(Crystallinity)

The crystallinity of the fine cellulose fibers is preferably 30% or more, more preferably 35% or more, even more preferably 40% or more, and still even more preferably 45% or more, from the viewpoint of improving mechanical strength when contained in a resin to form a composite material. In addition, the crystallinity is preferably 95% or less, more preferably 90% or less, even more preferably 85% or less, and still even more preferably 80% or less, from the viewpoint of improving reaction efficiency of amide-formation reaction. The crystallinity of the cellulose as used herein is a cellulose I crystallinity calculated according to Segal method from diffraction intensity values according to X-ray diffraction method, which is defined by the following calculation formula (A):

Cellulose I Crystallinity (%)=[(I22.6−I18.5)/I22.6]×100    (A)

wherein I22.6 is a diffraction intensity of a lattice face (face 002) (angle of diffraction 2θ=22.6°), and I18.5 is a diffraction intensity of an amorphous portion (angle of diffraction 2θ=18.5°), in X-ray diffraction. Here, cellulose I is a crystalline form of a natural cellulose, and the cellulose I crystallinity means a proportion of the amount of crystalline region that occupies the entire cellulose.

<Amine Having EO/PO Copolymer Moiety or PO Polymer Moiety>

In the fine cellulose fiber composite A of the present invention, the above fine cellulose fibers are connected with a polymer having an EO/PO copolymer moiety or a PO polymer moiety via an amide bond. Accordingly, in the present invention, the amine having an EO/PO copolymer moiety or a PO polymer moiety may be bound with a carboxy group of the above fine cellulose fibers via an amide bond, and the amine may be any one of a primary amine and a secondary amine, and a primary amine is preferred, from the viewpoint of reactivity with an amide bond.

(EO/PO Copolymer Moiety or PO Polymer Moiety)

The EO/PO copolymer moiety means a structure in which ethylene oxides (EO) and propylene oxides (PO) are polymerized in a random or block form, and the PO polymer moiety means a chain structure in which propylene oxides (PO) are polymerized. For example, when an amine having an EO/PO copolymer moiety or a PO polymer moiety is represented by the formula (i) given later, the ethylene oxides (EO) and the propylene oxides (PO) form a chain structure of a random or block form, and when an amine has a structure represented by the formula (ii) given later, (EO)a(PO)b, (EO)c(PO)d, and (EO)e(PO)f do not need to be in chain form.

The molecular weight of the EO/PO copolymer moiety or the PO polymer moiety is preferably 500 or more, more preferably 700 or more, even more preferably 1,000 or more, and even more preferably 1,500 or more, from the viewpoint of providing a resin composition having smaller amounts of aggregates in the dispersion obtained and having excellent transparency and heat resistance when blended with a plasticizer, and also having excellent mechanical strength or the like when blended in the resin. From the same viewpoint, the molecular weight is preferably 10,000 or less, more preferably 7,000 or less, even more preferably 5,000 or less, even more preferably 4,000 or less, even more preferably 3,500 or less, and still even more preferably 2,500 or less. The molecular weight can be obtained by calculating from an average number of moles added when an amine is produced. For example, in a case of an amine having a structure represented by the formula (ii) given later, a total of the molecular weights of (EO)a(PO)b+(EO)c(PO)d+(EO)e (PO)f is defined as a molecular weight of the EO/PO copolymer moiety.

The PO content ratio (% by mol) in the EO/PO copolymer moiety is preferably 1% by mol or more, more preferably 6% by mol or more, and even more preferably 8% by mol or more, from the viewpoint of providing a resin composition having smaller amounts of aggregates in the dispersion obtained and having excellent transparency and heat resistance when blended with a plasticizer, and also having excellent mechanical strength or the like when blended in the resin. From the same viewpoint, the content ratio is preferably less than 100% by mol, more preferably 99% by mol or less, even more preferably 90% by mol or less, even more preferably 80% by mol or less, even more preferably 74% by mol or less, even more preferably 60% by mol or less, even more preferably 51% by mol or less, even more preferably 40% by mol or less, and even more preferably 30% by mol or less. The PO content ratio (% by mol) of the EO/PO copolymer moiety can be obtained by calculating from an average number of moles added when an amine is produced.

It is preferable that the EO/PO copolymer moiety or the PO polymer moiety and the amine are bound directly or via a linking group. The linking group is preferably a hydrocarbon group, and an alkylene group having the number of carbon atoms of preferably from 1 to 6, more preferably from 1 to 3, is used. For example, an ethylene group or a propylene group is preferred.

The amine having an EO/PO copolymer moiety or a PO polymer moiety includes, for example, a compound represented by the following formula (i):

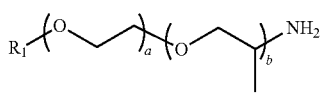
(i)

wherein $R_1$ is a hydrogen atom, a linear or branched alkyl group having from 1 to 6 carbon atoms, a $—CH_2CH(CH_3)NH_2$ group, or a group represented by the following formula (ii); EO and PO are present in a random or block form; a is 0 or a positive number showing an average number of moles of EO added; and b is a positive number showing an average number of moles of PO added, wherein the formula (ii) is:

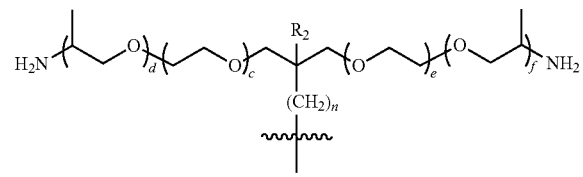
(ii)

wherein n is 0 or 1; $R_2$ is a phenyl group, a hydrogen atom, or a linear or branched alkyl group having from 1 to 3 carbon atoms; EO and PO are present in a random or block form; c and e show an average number of moles of EO added, which is independently a number of from 0 to 50; and d and f show an average number of moles of PO added, which is independently a number of from 1 to 50.

In a case of an amine having a PO polymer moiety, a in the formula (i) is 0. On the other hand, in a case of an amine having an EO/PO copolymer moiety, a in the formula (i) is preferably exceeding 0, more preferably 1 or more, even more preferably 5 or more, even more preferably 10 or more, even more preferably 15 or more, even more preferably 20 or more, and even more preferably 25 or more, from the viewpoint of providing a resin composition having smaller amounts of aggregates in the dispersion obtained and having excellent transparency and heat resistance when blended with a plasticizer, and also having excellent mechanical strength or the like when blended in the resin. From the same viewpoint, it is preferably 100 or less, more preferably 80 or less, even more preferably 60 or less, and even more preferably 45 or less.

In a case of an amine having a PO polymer moiety, b in the formula (i) is preferably 9 or more, more preferably 12 or more, even more preferably 17 or more, and still even more preferably 26 or more, from the viewpoint of providing a resin composition having smaller amounts of aggregates in the dispersion obtained and having excellent transparency and heat resistance when blended with a plasticizer, and also having excellent mechanical strength or the like when blended in the resin. From the same viewpoint, it is preferably 175 or less, more preferably 120 or less, even more preferably 80 or less, even more preferably 70 or less, even more preferably 60 or less, and still even more preferably 44 or less.

In a case of an amine having an EO/PO polymer moiety, b in the formula (i) is preferably 1 or more, more preferably 2 or more, and even more preferably 3 or more, from the same viewpoint as above. It is preferably 100 or less, more preferably 70 or less, even more preferably 50 or less, even more preferably 30 or less, even more preferably 25 or less, even more preferably 20 or less, and still even more preferably 12 or less, from the same viewpoint.

In addition, as to the PO content ratio (% by mol) in the EO/PO copolymer moiety, when an amine is represented by the formula (i) defined above, the PO content ratio in the copolymer moiety can be calculated from a and b mentioned above, which can be obtained by the formula: $b \times 100/(a+b)$. When an amine is represented by the formula (i) and the formula (ii) defined above, the content ratio can be similarly calculated by the formula: $(b+d+f) \times 100/(a+b+c+d+e+f)$. The preferred ranges are as mentioned above.

$R_1$ in the formula (i) is a hydrogen atom, a linear or branched alkyl group having from 1 to 6 carbon atoms, a $—CH_2CH(CH_3)NH_2$ group, or a group represented by the formula (ii) defined above, and a hydrogen atom is preferred, from the viewpoint of providing a resin composition having smaller amounts of aggregates in the dispersion obtained and having excellent transparency and heat resistance, and also having excellent mechanical strength or the like when blended in the resin. The linear or branched alkyl group having from 1 to 6 carbon atoms is preferably a methyl group, an ethyl group, and an iso- or normal-propyl group.

In addition, when $R_1$ in the formula (i) is a group represented by the formula (ii), the linear or branched alkyl group having from 1 to 3 carbon atoms of $R_2$ in the formula (ii) is preferably a methyl group and an ethyl group. When $R_2$ is a methyl group or an ethyl group, it is preferable that n is 1, and when $R_2$ is a hydrogen atom, it is preferable that n is 0.

In addition, c and e in the formula (ii) are independently preferably from 10 to 30, and d and f are independently preferably from 5 to 25.

The amine having an EO/PO copolymer moiety or a PO polymer moiety represented by the formula (i) can be prepared in accordance with a known method. For example, ethylene oxides and propylene oxides may be added in desired amounts to a propylene glycol alkyl ether, and thereafter a hydroxyl group terminal may be formed into an amino group. The alkyl ether may be opened with an acid as needed so as to have a hydrogen atom at a terminal. For these production methods, Japanese Patent Laid-Open No. Hei-3-181448 can be referred.

In addition, commercially available products are suitably used, and specific examples include Jeffamine M-2070, Jeffamine M-2005, Jeffamine M-1000, Surfoamine B200, Surfoamine L100, Surfoamine L200, Surfoamine L207, Surfoamine L300, XTJ-501, XTJ-506, XTJ-507, XTJ-508 manufactured by HUNTSMAN; M3000 manufactured by BASF, Jeffamine ED-900, Jeffamine ED-2003, Jeffamine D-2000, Jeffamine D-4000, XTJ-510, Jeffamine T-3000, Jeffamine T-5000, XTJ-502, XTJ-509, XTJ-510 and the like. These can be used alone or in a combination of two or more kinds.

The binding amount of the amide groups having an EO/PO copolymer moiety or a PO polymer moiety in the fine cellulose fiber composite A is preferably 0.01 mmol/g or more, more preferably 0.05 mmol/g or more, even more preferably 0.1 mmol/g or more, and even more preferably 0.2 mmol/g or more, from the viewpoint of providing a resin composition having smaller amounts of aggregates in the dispersion obtained and having excellent transparency and heat resistance when blended with a plasticizer, and also having excellent mechanical strength or the like when blended in the resin. In addition, the binding amount is preferably 3 mmol/g or less, more preferably 2 mmol/g or less, even more preferably 1 mmol/g or less, and even more preferably 0.5 mmol/g or less, from the viewpoint of reactivity upon connecting via an amide bond. The binding amount of the amide group having an EO/PO copolymer moiety or a PO polymer moiety can be adjusted by changing an amount of amine, the kind of amines, a reaction temperature, a reaction time, a solvent, or the like.

In addition, the modification ratio of the amide group having an EO/PO copolymer moiety or a PO polymer moiety in the fine cellulose fiber composite A (also referred to as amide-formation ratio) is preferably 1% or more, more preferably 5% or more, even more preferably 10% or more, even more preferably 15% or more, and even more preferably 20% or more, from the viewpoint of providing a resin composition having smaller amounts of aggregates in the dispersion obtained and having excellent transparency and heat resistance when blended with a plasticizer, and also having excellent transparency and mechanical strength when blended in the resin. In addition, the modification ratio is preferably 90% or less, more preferably 70% or less, even more preferably 50% or less, and even more preferably 40% or less, from the viewpoint of reactivity. Here, the binding amount (mmol/g) and the modification ratio (%) of the amide group having an EO/PO copolymer moiety or a PO polymer moiety as used herein are specifically obtained by a method described in Examples set forth below.

<Method for Producing Fine Cellulose Fiber Composite A>

The fine cellulose fiber composite A can be produced in accordance with a known method without particular limitations, so long as an EO/PO copolymer moiety or a PO polymer moiety can be introduced via an amide group to fine cellulose fibers. For example, a reaction of introducing an EO/PO copolymer moiety or a PO polymer moiety to previously prepared fine cellulose fibers via an amide group may be carried out, or a reaction of, subsequent to the preparation of fine cellulose fibers, introducing an EO/PO copolymer moiety or a PO polymer moiety via an amide group may be carried out. Here, fine cellulose fibers can be produced according to a known method, for example, a method described in Japanese Patent Laid-Open No. 2011-140632.

Preferred methods for production include a production method including the following step (A) and step (B):

step (A): oxidizing natural cellulose fibers in the presence of an N-oxyl compound, to provide carboxy group-containing cellulose fibers; and step (B): subjecting the carboxy group-containing cellulose fibers obtained in the step (A) and an amine having an EO/PO copolymer moiety or a PO polymer moiety to an amide-formation reaction.

Here, preferred production methods mentioned above include a method including, subsequent to the step (A), carrying out a finely pulverizing step, to provide carboxy-group containing fine cellulose fibers, and thereafter carrying out the step (B) (Production Embodiment 1A); and a method including, subsequent to the step (A), carrying out the step (B), and then carrying out a finely pulverizing step (Production Embodiment 2A).

The method for producing a fine cellulose fiber composite A will be explained hereinafter on the basis of "Production Embodiment 1A" mentioned above.

[Step (A)]

The step (A) is a step of oxidizing natural cellulose fibers in the presence of an N-oxyl compound, to provide carboxy group-containing cellulose fibers.

In the step (A), first, a slurry of natural cellulose fibers dispersed in water is prepared. The slurry is obtained by adding water in an amount of about 10 to about 1,000 times the amount on mass basis based on the raw material natural cellulose fibers (on absolute dry basis: the mass of natural cellulose fibers after subjection to thermal drying at 150° C. for 30 minutes), and treating the mixture with a mixer or the like. The natural cellulose fibers include, for example, wooden pulp such as pulp from needle-leaf trees and pulp from broad-leaf trees; cotton pulp such as cotton linter and cotton lint; non-wooden pulp such as maize straw pulp and bagasse pulp; bacteria cellulose; and the like. These natural cellulose fibers can be used alone or in a combination of two or more kinds. The natural cellulose fibers may be subjected to a treatment of increasing surface areas such as treatment with a beater. In addition, the cellulose I crystallinity of the above-mentioned commercially available pulp is usually 80% or more.

(Oxidization Treatment Step)

Next, the above-mentioned natural cellulose fibers are subjected to an oxidation treatment in the presence of an N-oxyl compound to provide carboxy group-containing cellulose fibers, which may be hereinafter simply referred to as "oxidation treatment."

As the N-oxyl compound, one or more heterocyclic N-oxyl compounds selected from piperidinoxyl compounds, pyrrolidinoxyl compounds, imidazolinoxyl compounds, and azaadamantane compounds having an alkyl group having 1 or 2 carbon atoms are preferred. Among them, the piperidinoxyl compounds having an alkyl group having 1 or 2 carbon atoms are preferred, from the viewpoint of reactivity, which includes di-tert-alkylnitroxyl compounds such as a 2,2,6,6-tetraalkylpiperidin-1-oxyl (TEMPO), a 4-hydroxy-2,2,6,6-tetraalkylpiperidin-1-oxyl, a 4-alkoxy-2,2,6,6-tetraalkylpiperidin-1-oxyl, a 4-benzoyloxy-2,2,6,6-tetraalkylpiperidin-1-oxyl, a 4-amino-2,2,6,6-tetraalkylpiperidin-1-oxyl; a 4-acetamide-TEMPO, a 4-carboxy-TEMPO, a 4-phosphonoxy-TEMPO, and the like. Among these piperidinoxyl compounds, a 2,2,6,6-tetramethylpiperidin-1-oxyl (TEMPO), a 4-hydroxy-2,2,6,6-tetramethylpiperidin-1-oxyl, and a 4-methoxy-2,2,6,6-tetramethylpiperidin-1-oxyl are more preferred, and a 2,2,6,6-tetramethylpiperidin-1-oxyl (TEMPO) is even more preferred.

The amount of the N-oxyl compound may be a catalytic amount, and the amount is preferably from 0.001 to 10% by mass, more preferably from 0.01 to 9% by mass, even more preferably from 0.1 to 8% by mass, and still even more preferably from 0.5 to 5% by mass, based on the natural cellulose fibers, on absolute dry basis.

In the oxidation treatment of the natural cellulose fibers, an oxidizing agent can be used. The oxidizing agent includes oxygen or the air, peroxides, halogens, hypohalous acids, halous acids, perhalo acid, and alkali metal salts or alkaline earth metal salts thereof, halogen oxides, nitrogen oxide, and the like, from the viewpoint of solubility, reaction rate or the like when a solvent is adjusted to an alkaline region. Among them, an alkali metal hypohalite is preferred, which is specifically exemplified by sodium hypochlorite and sodium hypobromite. The amount of the oxidizing agent used may be selected in accordance with the carboxy group substitution degree (oxidation degree) of the natural cellulose fibers, and the amount of the oxidizing agent used is not unconditionally determined because the yields of the oxidation reaction differ depending upon the reaction conditions. The amount is within the range of from about 1 to about 100% by mass, based on the raw material natural cellulose fibers, on absolute dry basis.

In addition, in order to even more efficiently carry out the oxidation reaction, a bromide such as sodium bromide or potassium bromide, or an iodide such as sodium iodide or potassium iodide can be used as a promoter. The amount of the promoter may be an effective amount that can exhibit its function, without particular limitations.

The reaction temperature in the oxidation treatment is preferably 50° C. or lower, more preferably 40° C. or lower, and even more preferably 20° C. or lower, from the viewpoint of selectivity of the reaction and suppression of side reaction, and the lower limit of the reaction temperature is preferably −5° C. or higher.

In addition, it is preferable that a pH of the reaction system matches with the property of the oxidizing agent; for example, when sodium hypochlorite is used as an oxidizing agent, a pH of the reaction system is preferably on an alkaline side, preferably a pH of from 7 to 13, and more preferably a pH of from 10 to 13. Also, it is desired that a reaction time is from 1 to 240 minutes.

By carrying out the above-mentioned oxidation treatment, carboxy group-containing cellulose fibers having a carboxy group content preferably within the range of 0.1 mmol/g or more and 3 mmol/g or less are obtained.

(Purifying Step)

The carboxy group-containing cellulose fibers obtainable by the above-mentioned oxidation reaction contain an N-oxyl compound such as TEMPO used as a catalyst, or a by-product salt. The carboxy group-containing cellulose fibers may be subjected to the subsequent steps without any treatments, or the cellulose fibers may be subjected to a purification, whereby carboxy group-containing cellulose fibers having a high purity can be obtained. As a purification method, an optimal method can be employed according to the kinds of the solvents in the oxidation reaction, the degree of oxidation of the product, and the degree of purification. For example, the purification method includes re-precipitation with a well dissolvable solvent water and a hardly dissolvable solvent such as methanol, ethanol, or acetone, extraction of TEMPO or the like to a solvent that allows phase separation with water, such as hexane, and other purifications such as ion-exchange of salts and dialysis.

(Finely Pulverizing Step)

In Production Embodiment 1A, after the above-mentioned purifying step, a step of finely pulverizing the carboxy group-containing cellulose fibers obtained in the step (A) is carried out. In the finely pulverizing step, it is preferable that the carboxy group-containing cellulose fibers obtained through the above-mentioned purifying step are dispersed in a solvent, and subjected to a finely pulverizing treatment. By carrying out this finely pulverizing step, fine cellulose fibers having an average fiber size and an average aspect ratio respectively within the ranges mentioned above are obtained.

The solvent used as a dispersion medium is exemplified by water, an alcohol having from 1 to 6 carbon atoms, and preferably from 1 to 3 carbon atoms, such as methanol, ethanol, or propanol, a ketone having from 3 to 6 carbon atoms, such as acetone, methyl ethyl ketone or methyl isobutyl ketone, a linear or branched saturated hydrocarbon or unsaturated hydrocarbon having from 1 to 6 carbon atoms, an aromatic hydrocarbon such as benzene or toluene, a halogenated hydrocarbon such as methylene chloride or chloroform, a lower alkyl ether having from 2 to 5 carbon atoms, a polar solvent such as N,N-dimethylformamide, N,N-dimethylacetamide, dimethyl sulfoxide, or a diester obtained from succinic acid and triethylene glycol monomethyl ether, and the like. These solvents can be used alone or in a mixture of two or more kinds. The solvent is preferably water, an alcohol having from 1 to 6 carbon atoms, a ketone having from 3 to 6 carbon atoms, a lower alkyl ether having from 2 to 5 carbon atoms, or a polar solvent such as N,N-dimethylformamide, N,N-dimethylacetamide, dimethyl sulfoxide, or methyl triglycol succinate diester, from the viewpoint of operability of the finely pulverizing treatment, and more preferably water, from the viewpoint of environmental friendliness. The amount of the solvent used may be an effective amount that can disperse the carboxy group-containing cellulose fibers, without particular limitations. The solvent is used in an amount of preferably from 1 to 500 times the mass, and more preferably from 2 to 200 times the mass, based on the carboxy group-containing cellulose fibers.

In addition, as an apparatus to be used in the finely pulverizing treatment, a known dispersing machine is suitably used. For example, disintegrator, a beating machine, a low-pressure homogenizer, a high-pressure homogenizer, a grinder, a cutter mill, a ball-mill, a jet mill, a short shaft extruder, a twin-screw extruder, an ultrasonic agitator, a juice mixer for households, or the like can be used. In addition, the solid content concentration of the reaction product fibers in the finely pulverizing treatment is preferably 50% by mass or less.

The form of the carboxy group-containing fine cellulose fibers obtainable after the finely pulverizing step can be, as occasion demands, in the form of a suspension of which solid content concentration is adjusted, e.g. visually colorless transparent or opaque liquid, or in the form of powder subjected to a drying treatment, provided that it is intended to mean that the fine cellulose fibers are in the form of an aggregated powder, not cellulose particles. Here, when provided in the form of a suspension, as a dispersion medium, water alone may be used, or a mixed solvent of water with other organic solvent, e.g. an alcohol such as ethanol, a surfactant, an acid, a base or the like may be used.

By subjecting the natural cellulose fibers to the oxidation treatment and the finely pulverizing treatment as described above, hydroxyl groups at a C6-position of the cellulose constituting unit are selectively oxidized to carboxy groups via aldehyde groups, and cellulose fibers being composed of cellulose having the above-mentioned carboxy group content of preferably from 0.1 to 3 mmol/g, and preferably cellulose fibers being finely pulverized to an average fiber size of from 0.1 to 200 nm, having a crystallinity of preferably 30% or more, can be obtained. The above-mentioned carboxy group-containing fine cellulose fibers have a cellulose I crystal structure. This means that the carboxy group-containing fine cellulose fibers used in the present invention are fibers prepared by subjecting cellulose solid raw materials derived from nature having a cellulose I crystal structure to surface oxidation and finely pulverizing treatment. Here, in the step (A), after the oxidation treatment of the natural cellulose fibers, further an acid, e.g. hydrochloric acid, is allowed to react, so that a carboxy group content can be adjusted, and the reaction may be carried out before the finely pulverizing treatment or after the finely pulverizing treatment.

[Step (B)]

In Production Embodiment 1A, the step (B) is a step of subjecting the carboxy group-containing fine cellulose fibers obtained through the above-mentioned finely pulverizing step and an amine having an EO/PO copolymer moiety or a PO polymer moiety to an amide formation reaction, to provide a fine cellulose fiber composite. Specifically, a carboxy group contained in the carboxy group-containing fine cellulose fibers and an amino group of the amine having an EO/PO copolymer moiety or a PO polymer moiety are subjected to a condensation reaction to form an amide bond, to provide a fine cellulose fiber composite with which the EO/PO copolymer moiety or the PO polymer moiety is connected via an amide bond.

The amine having an EO/PO copolymer moiety or a PO polymer moiety usable in the step (B) includes those that are mentioned above in the fine cellulose fiber composite A.

The amount of the above amine used is an amount such that the amine groups, based on one mol of the carboxy groups contained in the carboxy group-containing fine cellulose fibers are used in an amount of preferably 0.1 mol or more, more preferably 0.5 mol or more, even more preferably 0.7 mol or more, and still even more preferably 1 mol or more, from the viewpoint of reactivity, and the amine groups are used in an amount of preferably 50 mol or less, more preferably 20 mol or less, and even more preferably 10 mol or less, from the viewpoint of manufactured article purity. Here, the amines in the amount contained in the above range may be supplied to the reaction at once, or may be supplied in divided portions. When the amine is a monoamine, the above amine groups are the same as the amine.

In the reaction of the above carboxy group-containing fine cellulose fibers with the above amine (which may be hereinafter referred to as "condensation reaction" or "amide bond formation reaction" in some cases), a known condensing agent can be used.

The condensing agent is not particularly limited, and includes condensing agents described in Gosei Kagaku Shirizu Pepuchido Gosei (*Synthetic Chemistry Series Peptide Synthesis*) (Maruzen Publishing), page 116, or described in *Tetrahedron*, 57, 1551(2001), and the like. The condensing agent includes, for example, 4-(4,6-dimethoxy-1,3,5-triazin-2-yl)-4-methylmorpholinium chloride (may be hereinafter referred to as "DMT-MM" in some cases), and the like.

In the above condensation reaction, a solvent includes the solvent in the above finely pulverizing step, and it is preferable to select a solvent that dissolves an amine used.

The reaction time and the reaction temperature in the above condensation reaction can be appropriately selected in accordance with the amine used and the kinds of the solvents and the like. The reaction time is preferably from 1 to 24 hours, and more preferably from 10 to 20 hours, from the viewpoint of reaction rate. Also, the reaction temperature is preferably 0° C. or higher, more preferably 5° C. or higher, and even more preferably 10° C. or higher, from the viewpoint of reactivity. In addition, the reaction temperature is preferably 200° C. or lower, more preferably 80° C. or lower, and even more preferably 30° C. or lower, from the viewpoint of the coloration of the composite.

After the reaction, post-treatments may be appropriately carried out in order to remove unreacted amines, the condensing agent, and the like. As the method for post-treatments, for example, filtration, centrifugation, dialysis, or the like can be used.

In Production Embodiment 2A, the same method as in Production Embodiment 1A can be carried out except for carrying out each of the above steps in the order of the step (A), the step (B), and the finely pulverizing step.

The fine cellulose fiber composite A thus obtained can be used in the state of a dispersion after subjecting to the post-treatment mentioned above, or alternatively is subjected to a drying treatment or the like to remove the solvents from the dispersion, to provide a fine cellulose fiber composite in a dry powdery state, and this dry powder can also be used. The term "powdery state" as used herein is a powdery state in which the fine cellulose fiber composites are aggregated, and does not mean cellulose particles.

The fine cellulose fiber composite A in a powdery state includes, for example, a dried product obtained by directly drying a dispersion of the above-mentioned fine cellulose fiber composite A; a powdered product obtained by a mechanical treatment of the dried product; a powdered product obtained by powdering a dispersion of the above-mentioned fine cellulose fiber composite A according to a known spray-drying method; a powdered product obtained by powdering a dispersion of the above-mentioned fine cellulose fiber composite A according to a known freeze-drying method; and the like. The above spray-drying method is a method including spraying the above-mentioned dispersion of a fine cellulose fiber composite A in the air, and drying the dispersion.

The average fiber size of the fine cellulose fiber composite A is preferably 0.1 nm or more, more preferably 0.2 nm or more, even more preferably 0.5 nm or more, even more preferably 0.8 nm or more, and still even more preferably 1 nm or more, from the viewpoint of heat resistance, i.e. a less degree of coloration upon molding. In addition, the average fiber size is preferably 200 nm or less, more preferably 100 nm or less, even more preferably 50 nm or less, even more preferably 20 nm or less, and still even more preferably 10 nm or less, from the viewpoint of mechanical strength and transparency.

Here, since the fine cellulose fiber composite A does not undergo lowering of crystallinity by the reaction of the step (B), it is preferable that the fine cellulose fiber composite has a crystallinity of the same level as the crystallinity of the above-mentioned fine cellulose fibers.

The fine cellulose fiber composite A contained in the resin composition of the present invention is one in which fine cellulose fibers are connected with an EO/PO copolymer moiety or a PO polymer moiety via an amide bond as mentioned above, and those having an average fiber size of from 0.1 to 200 nm are preferred.

The fine cellulose fiber composite contained in the resin composition of the present invention may be those in which the fine cellulose fibers are bound with an EO/PO copolymer moiety or a PO polymer moiety via an amide bond as mentioned above. Also, the present invention provides the followings as one embodiment of the above fine cellulose fiber composite. In other words, the present invention provides the above fine cellulose fiber composite in which the fine cellulose fibers are further bound with a specified cation and/or a functional group at a carboxy group. More specifically, the present invention provides a fine cellulose fiber composite wherein fine cellulose fibers are connected with a polymer having an ethylene oxide/propylene oxide (EO/PO) copolymer moiety or a propylene oxide (PO) polymer moiety via an amide bond, and wherein one or two bindings selected from the group consisting of the following (1) and (2) are further introduced.
(1) the binding via an ionic bond of a quaternary alkylammonium cation having a total number of carbon atoms of from 4 to 40; and
(2) the binding via an amide bond of an aromatic hydrocarbon group having a total number of carbon atoms of from 6 to 20.
The fine cellulose fiber composite may also be hereinafter referred to as a fine cellulose fiber composite a.

In the present invention, since the EO/PO copolymer moiety or the PO polymer moiety is present on a surface of the cellulose fibers, the cellulose fiber composites themselves have increased dispersibility in the resin due to repulsion caused by steric repulsion, and at the same time affinity to the resin is increased. Further, because of the presence of one or more members of a specified quaternary alkylammonium cation and aromatic hydrocarbon groups, some effects are exhibited such that wettability of the cellulose fiber composite is even more improved, thereby making it possible to perform high-dispersion in the resin, and that the mechanical strength is even more improved while maintaining the transparency of the resin composition obtained, so that the cellulose fiber composite further has excellent heat resistance and dimensional stability depending upon the resins. Here, in the present specification, the wettability shows compatibility with solvents and the resin, meaning that the higher the wettability, the higher the compatibility.

In the fine cellulose fiber composite a, fine cellulose fibers and an amine having an EO/PO copolymer moiety or a PO polymer moiety used, and a method for introducing the amine to fine cellulose fibers are the same as mentioned above.

In addition, upon binding of a specified cation and/or functional group to the fine cellulose fibers, a known method can be used. For example, in the case of a quaternary alkylammonium cation, a quaternary alkylammonium compound may be bound to form a salt, and in the case of an aromatic hydrocarbon group, an amine having an aromatic hydrocarbon group may be formed into an amide bonding. For the sake of convenience, the amine having an EO/PO copolymer moiety or a PO polymer moiety may be described as a first amine, and a compound used in the bond of the above (1) and (2) may be described as a second amine hereinafter.

The binding of the fine cellulose fibers with a quaternary alkylammonium compound having a total number of carbon atoms of from 4 to 40 at a carboxy group as used herein means that the carboxy group is deprotonated and at the same time forms a quaternary alkylammonium cation, and those are in the state of ionic bond.

The four alkyl groups of the quaternary alkyl ammonium compound may be identical or different, so long as a total number of carbon atoms is from 4 to 40, and the alkyl group may be substituted or unsubstituted. The alkyl group as used herein includes alkyl groups having from 1 to 20 carbon atoms, and specific examples include, for example, a methyl group, an ethyl group, a propyl group, a butyl group, a lauryl group, a cetyl group, a stearyl group, a benzyl group, and a phenethyl group. The total number of carbon atoms of these four alkyl groups may be 4 or more and 40 or less, and preferably 8 or more, and more preferably 12 or more, from the viewpoint of reactivity, and the total number of carbon atoms is preferably 36 or less, more preferably 32 or less, even more preferably 24 or less, even more preferably 20 or less, and even more preferably 18 or less, from the same viewpoint.

Specific examples of the quaternary alkylammonium compound having a total number of carbon atoms of from 4 to 40 include tetramethylammonium hydroxide, tetraethylammonium hydroxide, tetraethylammonium chloride, tetrabutylammonium hydroxide, tetrapropylammonium hydroxide, tetrabutylammonium chloride, lauryltrimethylammonium chloride, dilauryldimethyl chloride, stearyltrimethylammonium chloride, distearyldimethylammonium chloride, cetyltrimethylammonium chloride, and alkylbenzyldimethylammonium chloride. These quaternary alkylammonium compounds can be used alone or in a combination of two or more kinds. Among them, tetramethylammonium hydroxide, tetraethylammonium hydroxide, tetrapropylammonium hydroxide, and tetrabutylammonium hydroxide are preferred, from the viewpoint of reactivity. The quaternary alkylammonium compound used in the present invention may be prepared in accordance with a known method, or may be a commercially available product.

In addition, the above fine cellulose fibers are bound with an amine having an aromatic hydrocarbon group having a total number of carbon atoms of 6 to 20 at a carboxy group as used herein means that a carboxy group and the amine form an amide bond and are in the state of covalent bonding.

The amine having an aromatic hydrocarbon group may be those having a total number of carbon atoms of from 6 to 20, which may be any of primary amines and secondary amines, and the primary amines are preferred, from the viewpoint of reactivity with a carboxy group. In addition, the number of the aromatic hydrocarbon groups in the amine may be one or two, so long as a total number of carbon atoms is from 6 to 20, and one is preferred.

The amine having an aromatic hydrocarbon group includes an amine having an aryl group and an amine having an aralkyl group, and the amine having an aryl group is preferred, from the viewpoint of compatibility with the resin.

A total of the number of carbon atoms of the amine having an aromatic hydrocarbon group is 6 or more and 20 or less, and the total is preferably 18 or less, and more preferably 12 or less, from the viewpoint of compatibility with the resin. In the case of an amine having an aryl group, a total number of carbon atoms is 6 or more, and the total number is 20 or less, preferably 14 or less, more preferably 10 or less, and even more preferably 8 or less, from the viewpoint of compatibility with the resin. In the case of an amine having an aralkyl group, a total number of carbon atoms is 7 or more, and the total number is 20 or less, preferably 13 or less, more preferably 11 or less, and even more preferably 9 or less, from the viewpoint of compatibility with the resin.

Specific examples of the aryl group include a phenyl group, a naphthyl group, an anthryl group, a phenanthryl group, a biphenyl group, and a triphenyl group. These aryl groups may be bound alone or in a combination of two or more of them. Among them, a phenyl group, a naphthyl group and a biphenyl group are preferred, and a phenyl group is more preferred, from the viewpoint of compatibility with the resin.

Specific examples of the aralkyl group include a benzyl group, a phenethyl group, a phenylpropyl group, a phenylpentyl group, a phenylhexyl group, and a phenylheptyl group, and these aralkyl groups may be bound alone or in a combination of two or more of them. Among them, a benzyl group, a phenethyl group, a phenylpropyl group, a phenylpentyl group, and a phenylhexyl group are preferred, and a benzyl group, a phenethyl group, a phenylpropyl group, and a phenylpentyl group are more preferred, from the viewpoint of compatibility with the resin.

In addition, the above aryl group or aralkyl group may have a substituent. The substituent includes, for example, alkyl groups having from 1 to 6 carbon atoms, such as a methyl group, an ethyl group, a propyl group, an isopropyl group, a butyl group, an isobutyl group, a sec-butyl group, a tert-butyl group, a pentyl group, an isopentyl group, and a hexyl group; alkoxy groups having from 1 to 6 carbon atoms, such as a methoxy group, an ethoxy group, a propoxy group, an isopropoxy group, a butoxy group, an isobutoxy group, a sec-butoxy group, a tert-butoxy group, a pentyloxy group, an isopentyloxy group, and a hexyloxy group; alkoxycarbonyl groups having from 1 to 6 carbon atoms, such as a methoxycarbonyl group, an ethoxycarbonyl group, a propoxycarbonyl group, an isopropoxycarbonyl group, a butoxycarbonyl group, an isobutoxycarbonyl group, a sec-butoxycarbonyl group, a tert-butoxycarbonyl group, a pentyloxycarbonyl group, and an isopentyloxycarbonyl group; halogen atoms such as a fluorine atom, a chlorine atom, a bromine atom, and an iodine atom; acyl groups having from 1 to 6 carbon atoms, aralkyl groups, and aralkyloxy groups.

Specific examples of the amine having the above aromatic hydrocarbon group include amines having an aryl group, such as aniline, toluylamine, 4-biphenylylamine, diphenylamine, 2-aminonaphthalene, p-terephenylamine, 2-aminoanthracene, and 2-aminoanthraquinone. Among them, aniline, toluylamine, 4-biphenylamine, diphenylamine, and 2-aminonaphthalene are preferred, and aniline is more preferred, from the viewpoint of compatibility with the resin. The amine having an aralkyl group includes benzylamine, phenethylamine, 3-phenylpropylamine, 5-phenylpentylamine, 6-phenylhexylamine, 7-phenylheptylamine, and 8-phenyloctylamine. Among them, from the same viewpoint, benzylamine, phenethylamine, 5-phenylpentylamine, 6-phenylhexylamine, and 7-phenylheptylamine are preferred, benzylamine, phenethylamine, 3-phenylpropylamine, 5-phenylpentylamine, and 6-phenylhexylamine are more preferred, and benzylamine, phenethylamine, 3-phenylpropylamine, and 5-phenylpentylamine are even more preferred. The amine having an aromatic hydrocarbon group used in the present invention may be prepared by a known method, or may be a commercially available product.

In the fine cellulose fiber composite a, in addition to the amine having an EO/PO copolymer moiety or a PO polymer moiety, either one of a quaternary alkylammonium compound having a total number of carbon atoms of from 4 to 40 or an amine having an aromatic hydrocarbon group having a total number of carbon atoms of from 6 to 20 may be bound, or each may be bound alone, or may be bound together.

The binding amount of the amine having an EO/PO copolymer moiety or a PO polymer moiety, which is a first amine, in the fine cellulose fiber composite a, is preferably 0.01 mmol/g or more, more preferably 0.03 mmol/g or more, and even more preferably 0.05 mmol/g or more, from the viewpoint of providing a resin composition having a smaller amount of aggregates in the dispersion obtained, and having excellent transparency when blended with a plasticizer or a solvent, and having excellent compatibility with the resin, and having excellent transparency, mechanical strength, dimensional stability, and heat resistance when blended with the resin. In addition, the binding amount is preferably 1 mmol/g or less, more preferably 0.5 mmol/g or less, even more preferably 0.25 mmol/g or less, even more preferably 0.1 mmol/g or less, even more preferably 0.08 mmol/g or less, and even more preferably 0.06 mmol/g or less, from the same viewpoint and from the viewpoint of reactivity. Here, in the present invention, the binding amount of the first amine in the fine cellulose fiber composite a can be measured in the same manner as in the first amine in the above fine cellulose fiber composite A, or the binding amount may be obtained by IR measurement. Specifically, the binding amount is obtained by a method described in Examples set forth below.

The binding amount of the second amine in the fine cellulose fiber composite a is preferably 0.2 mmol/g or more, more preferably 0.3 mmol/g or more, even more preferably 0.5 mmol/g or more, even more preferably 0.8 mmol/g or more, and even more preferably 1.0 mmol/g or more, from the viewpoint of transparency of the dispersion, from the viewpoint of compatibility with the resin, and from the viewpoint of transparency, mechanical strength, dimensional stability, and heat resistance of the resin composition. Also, the binding amount is preferably 1.5 mmol/g or less, more preferably 1.3 mmol/g or less, and even more preferably 1.2 mmol/g or less, from the same viewpoint, and from the viewpoint of reactivity when binding. The binding amount of the above amine can be adjusted by an amount of the amine, the kinds, a reaction temperature, a reaction time, a solvent, or the like. Here, in the present invention the binding amount of the second amine refers to a total amount of the binding amount of a quaternary alkylammonium compound having a total number of carbon atoms of from 4 to 40 and the binding amount of the amine having an aromatic hydrocarbon group having a total number of carbon atoms of from 6 to 20, which can be obtained according to IR determination. Specifically, the binding amount is obtained in accordance with a method described in Examples set forth below.

A total of the binding amount of the first amine and the binding amount of the second amine in the fine cellulose fiber composite a is preferably 0.2 mmol/g or more, more preferably 0.3 mmol/g or more, even more preferably 0.5 mmol/g or more, even more preferably 0.8 mmol/g or more, and even more preferably 1.0 mmol/g or more, from the viewpoint of compatibility with the resin, and from the viewpoint of transparency, mechanical strength, dimensional stability, and heat resistance of the resin composition. Also, a total of the binding amount is preferably 1.5 mmol/g or less, more preferably 1.3 mmol/g or less, and even more preferably 1.2 mmol/g or less, from the same viewpoint, and from the viewpoint of reactivity when binding.

The modification ratio of the EO/PO copolymer moiety or the PO polymer moiety in the fine cellulose fiber composite a is preferably 0.5% or more, more preferably 1% or more, even more preferably 2% or more, and even more preferably 5% or more, from the viewpoint of transparency of the dispersion, from the viewpoint of compatibility with the resin, and from the viewpoint of transparency, mechanical strength, dimensional stability, and heat resistance of the resin composition. Also, the modification ratio is preferably 90% or less, more preferably 50% or less, even more preferably 20% or less, and even more preferably 10% or less, from the same viewpoint.

In addition, the modification ratio of the quaternary alkylammonium cation and/or the aromatic hydrocarbon group in the fine cellulose fiber composite a is preferably 10% or more, more preferably 20% or more, even more preferably 30% or more, even more preferably 40% or more, even more preferably 50% or more, even more preferably 60% or more, and even more preferably 70% or more, from the viewpoint of transparency of the dispersion, from the viewpoint of compatibility with the resin, and from the viewpoint of transparency, mechanical strength, dimensional stability, and heat resistance of the resin composition. From the same viewpoint, the modification ratio is preferably 90% or less, more preferably 85% or less, and even more preferably 80% or less. Here, in the present specification, the modification ratio (%) of the quaternary alkylammonium cation and/or the aromatic hydrocarbon group is obtained in accordance with a method described in Examples set forth below.

In addition, a total of the modification ratio of the first amine and the modification ratio of the second amine in the fine cellulose fiber composite a is preferably 10% or more, more preferably 20% or more, even more preferably 30% or more, even more preferably 40% or more, even more preferably 50% or more, even more preferably 60% or more, even more preferably 70% or more, even more preferably 75% or more, and even more preferably 80% or more, from the viewpoint of having smaller amounts of aggregates in the dispersion obtained, from the viewpoint of transparency of the dispersion, and from the viewpoint of transparency, mechanical strength, dimensional stability, and heat resistance of the resin composition. From the same viewpoint, a total of the modification ratios is preferably 100% or less, more preferably 98% or less, even more preferably 95% or less, even more preferably 90% or less, and even more preferably 85% or less.

In the fine cellulose fiber composite a of the present invention, a molar ratio of the binding amount of the first amine to the binding amount of the second amine (first amine/second amine) is preferably 0.01 or more, and more preferably 0.03 or more, from the viewpoint of compatibility with the resin, from the viewpoint of transparency of the dispersion, and from the viewpoint of transparency, mechanical strength, dimensional stability, and heat resistance of the resin composition. From the same viewpoint, the molar ratio is preferably 0.4 or less, more preferably 0.3 or less, even more preferably 0.2 or less, even more preferably 0.1 or less, and even more preferably 0.05 or less.

In addition, when the quaternary alkylammonium compound and the amine having an aromatic hydrocarbon group are used together as the second amines, a molar ratio of the binding amounts thereof (quaternary alkylammonium compound/amine having aromatic hydrocarbon group) is preferably 0.1 or more, more preferably 0.2 or more, and even more preferably 0.4 or more, from the viewpoint of compatibility with the resin, from the viewpoint of transparency of the dispersion, and from the viewpoint of transparency, mechanical strength, dimensional stability, and heat resistance of the resin composition. From the same viewpoint, the molar ratio is preferably 0.9 or less, more preferably 0.8 or less, and even more preferably 0.6 or less.

The introduction of the quaternary alkylammonium compound and the amine having an aromatic hydrocarbon group into the fine cellulose fibers can be carried out in accordance with a known method without particular limitations, and the order of introduction is such that any one of the above introduction or the introduction of the amine having an EO/PO copolymer moiety or a PO polymer moiety may be carried out first. It is preferable that the quaternary alkylammonium compound and the amine having an aromatic hydrocarbon group are introduced first, from the viewpoint of reactivity.

<Method for Producing Fine Cellulose Fiber Composite a>

The fine cellulose fiber composite a can be produced in accordance with a known method without particular limitations, so long as a quaternary alkylammonium cation and/or an aromatic hydrocarbon group and an EO/PO copolymer moiety or a PO polymer moiety can be introduced into fine cellulose fibers. For example, a reaction including introducing a quaternary alkylammonium cation via an ionic bond, and/or introducing an aromatic hydrocarbon group via an amide bond into previously prepared fine cellulose fibers, and thereafter introducing an EO/PO copolymer moiety or a PO polymer moiety thereinto via an amide bond may be carried out, or a reaction including introducing the above may be carried out subsequent to the preparation of the fine cellulose fibers. The fine cellulose fibers can be produced in the same manner as mentioned above.

Accordingly, preferred methods for producing a fine cellulose fiber composite a include, for example, a method including the following steps (a), (b-1), and (b-2):

step (a): oxidizing natural cellulose fibers in the presence of an N-oxyl compound, to provide carboxy group-containing cellulose fibers; and step (b-1): mixing the carboxy group-containing cellulose fibers obtained in the step (a) and a quaternary alkylammonium compound, and subjecting them to an amide-formation reaction with an amine having an aromatic hydrocarbon group, or carrying out only one of the above, to provide cellulose fibers with which a quaternary alkylammonium cation and/or an aromatic hydrocarbon group is bound; and step (b-2): subjecting the cellulose fibers obtained in the step (b-1) and an amine having an EO/PO copolymer moiety or a PO polymer moiety to an amide-formation reaction.

Here, the above preferred production methods include a method including, subsequent to the step (a), carrying out a finely pulverizing step mentioned above, to provide carboxy group-containing fine cellulose fibers, and thereafter carrying out steps (b-1) and (b-2) (Production Embodiment 1a); and a method including, subsequent to the step (a), carrying out the steps (b-1) and (b-2), and thereafter carrying out a finely pulverizing step (Production Embodiment 2a).

The method for producing a fine cellulose fiber composite will be explained hereinbelow on the basis of "Production Embodiment 1a" mentioned above.

[Step (a)]

The step (a) is a step of oxidizing natural cellulose fibers in the presence of an N-oxyl compound, to provide carboxy group-containing cellulose fibers, and the step can be carried out in reference to the step (A) in the above "Production Embodiment 1A." In addition, the purifying step and the finely pulverizing step can be also carried out in the same manner referring to the above "Production Embodiment 1A."

[Step (b-1)]

In the Production Embodiment 1a, the step (b-1) is a step of mixing the carboxy group-containing cellulose fibers obtained through the above finely pulverizing step and a quaternary alkylammonium compound, and subjecting them to an amide-formation reaction with an amine having an aromatic hydrocarbon group, or carrying out only one of the above, to provide cellulose fibers with which a quaternary alkylammonium cation and/or an aromatic hydrocarbon group is bound. Here, in case where both of the quaternary alkylammonium cation and the aromatic hydrocarbon group are introduced, either one may be introduced first, and the order of introduction is not particular limited.

The quaternary alkylammonium may be introduced by, specifically, mixing the above carboxy group-containing fine cellulose fibers and a quaternary alkylammonium compound in a solvent.

The quaternary alkylammonium compound usable in the step (b-1) includes the above ones listed above in the fine cellulose fiber composite a.

The amount of the above quaternary alkylammonium compound used can be determined by a desired binding amount in the fine cellulose fiber composite a. The amount of the quaternary alkylammonium compound used is an amount such that the quaternary alkylammonium cation is used in an amount of preferably 0.1 mol or more, more preferably 0.5 mol or more, even more preferably 0.7 mol or more, and still even more preferably 1 mol or more, from the viewpoint of reactivity, and that the quaternary alkylammonium cation is used in an amount of preferably 50 mol or less, more preferably 20 mol or less, and even more preferably 10 mol or less, from the viewpoint of purity of the manufactured article, based on 1 mol of the carboxy groups contained in the carboxy group-containing fine cellulose fibers. Here, the quaternary alkylammonium compound may be subject to reaction at one time, or subject to reaction in divided portions.

As the solvent, it is preferable to select a solvent that dissolves an amine used, and the solvent includes, for example, water, ethanol, isopropanol (IPA), N,N-dimethylformamide (DMF), dimethyl sulfoxide (DMSO), N,N-dimethylacetamide, tetrahydrofuran (THF), a diester obtained from succinic acid and triethylene glycol monomethyl ether, acetone, methyl ethyl ketone (MEK), acetonitrile, dichloromethane, chloroform, toluene, acetic acid, and the like. These solvents can be used alone or in a combination of two or more kinds. Among these polar solvents, a diester obtained from succinic acid and triethylene glycol monomethyl ether, ethanol, and DMF are preferred.

The temperature during mixing is preferably 0° C. or higher, more preferably 5° C. or higher, and even more preferably 10° C. or higher, from the viewpoint of reactivity of the amine. In addition, the temperature is preferably 50° C. or lower, more preferably 40° C. or lower, and even more preferably 30° C. or lower, from the viewpoint of coloration of the composite. The mixing time can be appropriately set depending upon the kinds of the amines and solvents used, and the mixing time is preferably 0.01 hours or more, more preferably 0.1 hours or more, and even more preferably 1 hour or more, and preferably 48 hours or less, more preferably 24 hours or less, and even more preferably 12 hours or less, from the viewpoint of reactivity of the amine.

In addition, the aromatic hydrocarbon group is introduced, specifically, by subjecting the above carboxy group-containing fine cellulose fibers to an amide-formation reaction with an amine having an aromatic hydrocarbon group.

The amine having an aromatic hydrocarbon group usable in the step (b-1) includes the above ones listed above in the fine cellulose fiber composite a.

The amount of the above amine having an aromatic hydrocarbon group used can be determined by a desired binding amount in the fine cellulose fiber composite a. The amount of the amine used is an amount such that the amine groups are used in an amount of preferably 0.1 mol or more, more preferably 0.5 mol or more, even more preferably 0.7 mol or more, and still even more preferably 1 mol or more, from the viewpoint of reactivity, and preferably 50 mol or less, more preferably 20 mol or less, and even more preferably 10 mol or less, from the viewpoint of purity of the manufactured article, based on 1 mol of the carboxy groups contained in the carboxy group-containing fine cellulose fibers. Here, the amine having an aromatic hydrocarbon group in an amount contained in the range defined above may be subjected to a reaction at one time, or subjected to a reaction in divided portions. In a case where the amine is a monoamine, the above amine group and amine are the same.

The reaction of the above carboxy group-containing fine cellulose fibers with the above amine having an aromatic hydrocarbon group is a "condensation reaction" or "amide bond formation reaction," which can be carried out in reference to the step (B) in the above "Production Embodiment 1A."

After the above mixing and after the reaction, post-treatments may be appropriately carried out in order to remove unreacted amines, the condensing agent, and the like. As the method for post-treatments, for example, filtration, centrifugation, dialysis, or the like can be used.

Thus, cellulose fibers in which the fine cellulose fibers are bound with the quaternary alkylammonium cation and/or the aromatic hydrocarbon group can be obtained.

[Step (b-2)]

In Production Embodiment 1a, the step (b-2) is a step of subjecting the cellulose fibers obtained through the above steps containing a quaternary alkylammonium cation and/or an aromatic hydrocarbon group, and an amine having an EO/PO copolymer moiety or a PO polymer moiety to an amide-formation reaction, to provide a fine cellulose fiber composite. Specifically, the step can be carried out in reference to the step (B) in the above "Production Embodiment 1A."

The amine having an EO/PO copolymer moiety or a PO polymer moiety usable in the step (b-2) includes the above ones listed above in the fine cellulose fiber composite a, and the amount used can be determined depending upon the desired binding amount in the fine cellulose fiber composite a. The amount of the amine used is an amount such that the amine groups are used in an amount of preferably 0.01 mol or more, more preferably 0.05 mol or more, even more preferably 0.07 mol or more, and still even more preferably 0.1 mol or more, from the viewpoint of reactivity, and preferably 5 mol or less, more preferably 2 mol or less, even more preferably 1 mol or less, and even more preferably 0.5 mol or less, from the viewpoint of purity of the manufactured article, based on 1 mol of carboxy group contained in the carboxy group-containing fine cellulose fibers. Here, the amine may be subjected to a reaction at one time, or may be subject to a reaction in divided portions.

After the above reaction, the post-treatments can be carried out in the same manner as in the above step (b-1).

Production Embodiment 2a can be carried out in the same manner as in Production Embodiment 1a, except that each of the above steps are carried out in the order of the step (a), the step (b-1), the step (b-2), and the finely pulverizing step.

The fine cellulose fiber composite a thus obtained can be used in a dispersion state after carrying out the above post-treatments, or solvents are removed from the dispersion by a drying treatment or the like, to provide a dried fine cellulose fiber composite in a powder form, and this powder can also be used. Here, the "powder form" is a powder form in which the fine cellulose fiber composites are aggregated, and does not mean the cellulose particles.

In addition, the average fiber size of the fine cellulose fiber composite a is preferably 0.1 nm or more, more preferably 0.2 nm or more, even more preferably 0.5 nm or more, even more preferably 0.8 nm or more, and still even more preferably 1 nm or more, from the viewpoint of heat resistance (lesser extent of coloration upon molding). In addition, the average fiber size is preferably 200 nm or less, more preferably 100 nm or less, even more preferably 50 nm or less, even more preferably 20 nm or less, and still even more preferably 10 nm or less, from the viewpoint of mechanical strength or the like.

It is preferable that the fine cellulose fiber composite a contained in the resin composition of the present invention is, as mentioned above, fine cellulose fibers that are connected with an EO/PO copolymer moiety or a PO polymer moiety via an amide bond, and that are ionically bonded to a quaternary alkylammonium cation and/or that are amide-bonded to an aromatic hydrocarbon group, wherein the average fiber size is from 0.1 to 200 nm.

[Fine Cellulose Fiber Composite Dispersion]

The fine cellulose fiber composite dispersion of the present invention contains a fine cellulose fiber composite in which an EO/PO copolymer moiety or a PO polymer moiety is connected via an amide bond to the above fine cellulose fibers, and a plasticizer. As the fine cellulose fiber composite, both the fine cellulose fiber composite A and the fine cellulose fiber composite a can be used, and they can be used together.

The content of the above fine cellulose fiber composite in the dispersion is preferably 0.01% by mass or more, more preferably 0.03% by mass or more, even more preferably 0.05% by mass or more, and even more preferably 0.1% by mass or more, from the viewpoint of improving mechanical strength or the like of the resin composition upon blending the dispersion in the resin, and the content is preferably 70% by mass or less, more preferably 50% by mass or less, even more preferably 30% by mass or less, even more preferably 10% by mass or less, even more preferably 5% by mass or less, and even more preferably 3% by mass or less, from the viewpoint of preventing the aggregation of the composite.

In addition, the amount of the above fine cellulose fibers (conversion amount) in the dispersion is preferably 0.01% by mass or more, more preferably 0.03% by mass or more, even more preferably 0.05% by mass or more, even more preferably 0.08% by mass or more, and even more preferably 0.1% by mass or more, from the viewpoint of improving mechanical strength or the like of the resin composition upon blending the dispersion in the resin, and the amount is preferably 30% by mass or less, more preferably 20% by mass or less, even more preferably 10% by mass or less, even more preferably 5% by mass or less, even more preferably 1% by mass or less, even more preferably 0.5% by mass or less, and still even more preferably 0.3% by mass or less, from the viewpoint of preventing the aggregation of the composite. Here, the amount of the fine cellulose fibers (conversion amount) as used herein can be obtained in accordance with a method described in Examples set forth below from the fine cellulose fiber composite.

(Plasticizer)

The plasticizer in the dispersion of the present invention is not particularly limited, and includes conventionally known plasticizers polycarboxylic acid esters such as phthalic acid esters, succinic acid esters, and adipic acid esters; fatty acid esters of an aliphatic polyol such as glycerol; and the like. Among them, an ester compound containing two or more ester groups in the molecule, the ester compound in which at least one kind of the alcohol component constituting the ester compound is an adduct of an alcohol reacted with an alkylene oxide having from 2 to 3 carbon atoms in an amount of from 0.5 to 5 mol on average, per one hydroxyl group, is preferred. Specific examples include plasticizers listed in Japanese Patent Laid-Open Nos. 2008-174718 and 2008-115372.

The content of the plasticizer in the dispersion is preferably 95% by mass or more, more preferably 97% by mass or more, even more preferably 99% by mass or more, and still even more preferably 99.5% by mass or more, from the viewpoint of improving mechanical strength or the like of the resin composition when the dispersion is blended with the resin, and at the same time improving heat resistance, transparency, and moldability of the molded article when providing the molded article, and the content is preferably 99.95% by mass or less, more preferably 99.9% by mass or less, and even more preferably 99.8% by mass or less, from the viewpoint of including the fine cellulose fiber composite and from the viewpoint of preventing the strength of the resin from being lowered.

Since the fine cellulose fiber composite dispersion of the present invention contains smaller amounts of aggregates and has excellent transparency and heat resistance, the dispersion can be suitably used in the production of the resin composition, containing a thermoplastic resin or a curable resin mentioned later, and a fine cellulose fiber composite.

[Resin Composition]

The resin composition of the present invention contains a thermoplastic resin or a curable resin and the above fine cellulose fiber composite. By including the above fine cellulose fiber composite, mechanical strength or the like can be improved while maintaining, or without significantly impairing, transparency of the above resin. As the fine cellulose fiber composite as used herein, both of the fine cellulose fiber composite A and the fine cellulose fiber composite a can be used, and they may be used together.

The thermoplastic resin includes saturated polyester-based resins such as polylactic acid resin; olefinic resins such as polyethylene-based resins and polypropylene-based resins; cellulose-based resins such as triacetylated cellulose and diacetylated cellulose; nylon resins, vinyl chloride resins, styrene resins, (meth)acrylic resins, vinyl ether resins, polyvinyl alcohol resins, polyamide-based resins, polycarbonate-based resins, polysulfonate-based resins and the like. These thermoplastic resins may be used alone or may be used as mixed resins of two or more kinds. Among them, the polyester-based resins and the (meth)acrylic resins are preferred, from the viewpoint of providing a resin composition having a smaller amount of aggregates, and having excellent transparency. Here, the term (meth)acrylic resin as used herein means to embrace methacrylic resins and acrylic resins.

The polyester-based resin is not particularly limited so long as the polyester-based resin is known in the art, those having biodegradability are preferred, and biodegradable polyester resins are preferred. Specific examples include aliphatic polyester resins such as polyhydroxy butyrate, polycaprolactone, polybutylene succinate, polybutylene succinate/adipate, polyethylene succinate, polylactic acid resin, polymalic acid, polyglycolic acid, polydioxanone, and poly(2-oxetanone); aliphatic aromatic co-polyester resins such as polybutylene succinate/terephthalate, polybutylene adipate/terephthalate, and polytetramethylene adipate/terephthalate; mixtures of a natural polymer such as starch, cellulose, chitin, chitosan, gluten, gelatin, zain, soybean protein, collagen, or keratin, and the aliphatic polyester resins or the aliphatic aromatic co-polyester resins mentioned above; and the like. Among them, the polybutylene succinate and the polylactic acid resin are preferred, and the polylactic acid resin is more preferred, from the viewpoint of having excellent workability, economic advantages, availability, and physical properties. Here, the term "biodegradable or biodegradability" as used herein refers to a property which is capable of being degraded to low molecular compounds by microorganisms in nature. Specifically, the term means biodegradability based on "test on aerobic and ultimate biodegradation degree and disintegration degree under controlled aerobic compost conditions" of JIS K6953, ISO 14855.

The polylactic acid resin includes commercially available polylactic acid resins, for example, those manufactured by Nature Works LLC under the trade names of Nature Works PLA/NW3001D, NW4032D, and N4000, and those manufactured by TOYOTA MOTOR CORPORATION under the trade names of Ecoplastic U'z S-09, S-12, S-17, etc.; and polylactic acid resins synthesized from lactic acid and lactides. A polylactic acid resin having an optical purity of 90% or more is preferred, from the viewpoint of improving strength and heat resistance, and, for example, polylactic acid resins such as NW4032D and N4000, manufactured by Nature Works LLC having relative large molecular weights and high optical purity are preferred.

As the (meth)acrylic resin, those containing 50% by weight or more of methyl (meth)acrylate, on the basis of a total of the monomer units of the entire polymer constituting the resin are preferred, and methacrylic resin is more preferred.

The methacrylic resin can be produced by copolymerizing methyl methacrylate and other monomer copolymerizable therewith. The polymerization method is not particularly limited, and includes, for example, a bulk polymerization method, a solution polymerization method, a suspension polymerization method, and an injection mold polymerization method, e.g. a cell casting polymerization method, and the injection mold polymerization method, e.g. a cell casting polymerization method, is preferred, from the viewpoint of productivity. In addition, the methacrylic resin having excellent heat resistance is obtained by subjecting a polymerizable mixture containing the above monomer mixture and a radical polymerization initiator to a polymerization reaction.

The curable resin is preferably a photo-curable resin and/or a thermosetting resin.

The photo-curable resin allows to progress the polymerization reaction by active energy ray irradiation of ultraviolet rays or electron beams, using a photopolymerization initiator that generates a radical or cation.

The above photopolymerization initiator includes, for example, acetophenones, benzophenones, ketals, anthraquinones, thioxanthones, azo compounds, peroxides, 2,3-dialkylthione compounds, disulfide compounds, thiuram compounds, fluoroamine compounds, and the like. More specific examples include 1-hydroxy-cyclohexyl-phenyl-ketone, 2-methyl-1[4-(methylthio)phenyl]-2-morpholinopropan-1-one, benzyl methyl ketone, 1-(4-dodecylphenyl)-2-hydroxy-2-methylpropan-1-one, 1-(4-isopropylphenyl)-2-hydroxy-2-hydroxy-2-methylpropan-1-one, benzophenone, and the like. Among them, 1-hydroxy-cyclohexyl-phenyl-ketone is preferred, from the viewpoint of improving antistatic property, waterproofness, transparency, and rubbing resistance.

With the photopolymerization initiator, for example, a monomer (monofunctional monomer and/or polyfunctional monomer), or an oligomer or resin or the like having a reactive unsaturated group can be polymerized.

The monofunctional monomer includes, for example, (meth)acrylic monomers such as (meth)acrylic acid esters; vinyl-based monomers such as vinyl pyrrolidone; (meth)acrylates having a bridged cyclohydrocarbon group such as isobornyl (meth)acrylate and adamantyl (meth)acrylate; and the like. The polyfunctional monomer contains a polyfunctional monomer having 2 to 8 or so polymerizable groups, and the bifunctional monomer includes, for example, di(meth)acrylates having a bridged cyclohydrocarbon group such as ethylene glycol di(meth)acrylate and propylene glycol di(meth)acrylate, and the like. The tri- to octo-functional monomer includes, for example, glycerol tri(meth)acrylate, and the like.

Examples of the oligomer or resin having a reactive unsaturated group include (meth)acrylates of alkylene oxide adducts of bisphenol A, epoxy (meth)acrylates (bisphenol A type epoxy (meth)acrylate, novolak type epoxy (meth)acrylate, etc.), polyester (meth)acrylates (e.g., aliphatic polyester-type (meth)acrylates, aromatic polyester-type (meth)acrylates, etc.), urethane (meth)acrylates (polyester-type urethane (meth)acrylates, polyether-type urethane (meth)acrylates, etc.), silicone (meth)acrylates, and the like. The above oligomer or resin may be used together with the above monomer.

The photo-curable resin is preferred, from the viewpoint of providing a resin composition having a smaller amount of aggregates, and having excellent transparency.

The thermosetting resin includes, for example, epoxy resins; phenol resins; urea resins; melamine resins; unsaturated polyester resins; diallyl phthalate resins; polyurethane resins; silicon-containing resins; polyimide resins; elastomeric resins; and the like. The thermosetting resin can be used alone or in a combination of two or more kinds. Among them, the epoxy resins are more preferred, from the viewpoint of providing a resin composition having a smaller amount of aggregates, and having excellent transparency.

When an epoxy resin is used in the above resin component, it is preferable to use a curing agent. By blending a curing agent, molding materials obtained from the resin composition can be firmly molded, whereby the mechanical strength can be improved. Here, the content of the curing agent may be appropriately set depending upon the kinds of the curing agents used.

In addition, in the present invention, an elastomeric resin can be used as a thermosetting resin. As the elastomeric resin, the carbon black blend product is widely used as a reinforcing material in order to increase the strength, but the reinforcing effects are considered to have some limitations. However, in the present invention, it is considered as follows. Since the fine cellulose fiber composite of the present invention is blended in the elastomeric resin, the fine cellulose fiber composites themselves each having the above ethylene oxide/propylene oxide (EO/PO) copolymer moiety or propylene oxide (PO) polymer moiety increase dispersibility into the resin owing to repulsion caused by steric repulsion, and at the same time the cellulose fiber composites themselves increase affinity to the resin, so that the dispersibility in the resin becomes excellent when blended with the resin, and consequently the resulting resin composition has excellent mechanical strength, thereby making it possible to further improve heat resistance and dimensional stability. Accordingly, in the present invention, the problem of the elastomeric resin of being disadvantageous in mechanical strength can be overcome by blending the fine cellulose fiber composite of the present invention, thereby making it possible to exhibit excellent effects of having excellent mechanical strength and further improved heat resistance and dimensional stability.

The kinds of the elastomeric resin are not particularly limited, and diene-based rubbers are preferred, from the viewpoint of reinforceability.

The diene-based rubber includes natural rubber (NR), polyisoprene rubber (IR), polybutadiene rubber (BR), styrene-butadiene copolymer rubber (SBR), butyl rubber (IIR), butadiene-acrylonitrile copolymer rubber (NBR), modified natural rubbers, and the like. The modified natural rubber includes epoxidized natural rubber, hydrogenated natural rubber, and the like. These can be used alone or in a combination of two or more kinds. Among them, one or more members selected from natural rubber (NR), polyisoprene rubber (IR), polybutadiene rubber (BR), and styrene-butadiene copolymer rubber (SBR) are preferred, and one or more members selected from natural rubber (NR), styrene-butadiene copolymer rubber (SBR), and modified natural rubbers are more preferred, from the viewpoint of satisfying both favorable workability and high-impact resilience of the rubber composition.

As the fine cellulose fiber composite, the fine cellulose fiber composite of the present invention mentioned above can be used. In other words, as the fine cellulose fiber composite, both of the fine cellulose fiber composite A and the fine cellulose fiber composite a can be used.

The content of the resin in the resin composition, the amount of the fine cellulose fiber composite based on the resin, and the amount of the fine cellulose fibers based on the resin (conversion amount) depend on the kinds of the resins, which are as follows.

The content of the resin in the resin composition of the present invention is preferably 50% by mass or more, more preferably 60% by mass or more, 70% by mass or more, even more preferably 80% by mass or more, and even more preferably 85% by mass or more, from the viewpoint of producing a molded article, and the content is preferably 99% by mass or less, more preferably 98% by mass or less, even more preferably 95% by mass or less, and even more preferably 93% by mass or less, from the viewpoint of including the fine cellulose fiber composite, a plasticizer or the like.

The content of the fine cellulose fiber composite in the resin composition of the present invention is preferably 0.01% by mass or more, more preferably 0.05% by mass or more, even more preferably 0.1% by mass or more, even more preferably 0.3% by mass or more, even more preferably 0.5% by mass or more, even more preferably 1% by mass or more, even more preferably 2% by mass or more, and still even more preferably 3% by mass or more, from the viewpoint of mechanical strength, dimensional stability, and heat resistance of the resin composition obtained, and the content is preferably 50% by mass or less, more preferably 40% by mass or less, even more preferably 30% by mass or less, even more preferably 20% by mass or less, and still even more preferably 15% by mass or less, from the viewpoint of transparency of the resin composition obtained.

The amount of the fine cellulose fiber composite in the resin composition of the present invention, based on 100 parts by mass of the resin, is preferably 0.01 parts by mass or more, more preferably 0.05 parts by mass or more, even more preferably 0.1 parts by mass or more, even more preferably 0.3 parts by mass or more, even more preferably 0.5 parts by mass or more, even more preferably 1 part by mass or more, and still even more preferably 3 parts by mass or more, from the viewpoint of mechanical strength, dimensional stability, and heat resistance of the resin composition obtained, and the amount is preferably 60 parts by mass or less, more preferably 50 parts by mass or less, even more preferably 40 parts by mass or less, even more preferably 30 parts by mass or less, even more preferably 20 parts by mass or less, and even more preferably 15 parts by mass or less, from the viewpoint of transparency of the resin composition obtained.

The amount of the fine cellulose fibers (conversion amount) in the resin composition of the present invention, based on 100 parts by mass of the resin, is preferably 0.01 parts by mass or more, more preferably 0.05 parts by mass or more, and even more preferably 0.08 parts by mass or more, from the viewpoint of mechanical strength, dimensional stability, and heat resistance of the resin composition obtained, and the amount is preferably 60 parts by mass or less, more preferably 50 parts by mass or less, even more preferably 40 parts by mass or less, even more preferably 30 parts by mass or less, even more preferably 20 parts by mass or less, even more preferably 15 parts by mass or less, and even more preferably 10 parts by mass or less, from the viewpoint of transparency of the resin composition obtained.

The preferred ranges according to the kinds of the resins are listed hereinbelow.

(1) Case where Resin is Thermoplastic Resin

The content of the resin in the resin composition of the present invention is not particularly limited, and the content is preferably 50% by mass or more, more preferably 60% by mass or more, even more preferably 70% by mass or more, even more preferably 80% by mass or more, and even more preferably 85% by mass or more, from the viewpoint of producing a molded article. The content is preferably 99% by mass or less, more preferably 98% by mass or less, even more preferably 95% by mass or less, even more preferably 93% by mass or less, even more preferably 90% by mass or less, and even more preferably 87% by mass or less, from the viewpoint of including a fine cellulose fiber composite, a plasticizer and the like.

The amount of the fine cellulose fiber composite in the resin composition of the present invention, based on 100 parts by mass of the resin, is preferably 0.01 parts by mass or more, more preferably 0.05 parts by mass or more, even more preferably 0.1 parts by mass or more, even more preferably 0.5 parts by mass or more, even more preferably 1 part by mass or more, even more preferably 3 parts by mass or more, even more preferably 6 parts by mass or more, and even more preferably 10 parts by mass or more, from the viewpoint of mechanical strength, dimensional stability, and heat resistance of the resin composition obtained. The amount is preferably 100 parts by mass or less, more preferably 70 parts by mass or less, even more preferably 50 parts by mass or less, even more preferably 40 parts by mass or less, even more preferably 30 parts by mass or less, even more preferably 20 parts by mass or less, even more preferably 15 parts by mass or less, even more preferably 5 parts by mass or less, even more preferably 3 parts by mass or less, even more preferably 1 part by mass or less, even more preferably 0.5 parts by mass or less, and still even more preferably 0.3 parts by mass or less, from the viewpoint of transparency of the resin composition obtained.

The amount of the fine cellulose fibers (conversion amount) in the resin composition of the present invention, based on 100 parts by mass of the resin, is preferably 0.01 parts by mass or more, more preferably 0.05 parts by mass or more, even more preferably 0.08 parts by mass or more, even more preferably 0.1 parts by mass or more, even more preferably 0.3 parts by mass or more, even more preferably 0.5 parts by mass or more, even more preferably 2 parts by mass or more, and even more preferably 5 parts by mass or more, from the viewpoint of mechanical strength, dimensional stability, and heat resistance of the resin composition obtained. The amount is preferably 60 parts by mass or less, more preferably 50 parts by mass or less, even more preferably 40 parts by mass or less, even more preferably 35 parts by mass or less, even more preferably 30 parts by mass or less, even more preferably 20 parts by mass or less, even more preferably 15 parts by mass or less, even more preferably 10 parts by mass or less, even more preferably 5 parts by mass or less, even more preferably 3 parts by mass or less, even more preferably 1 part by mass or less, even more preferably 0.5 parts by mass or less, and still even more preferably 0.3 parts by mass or less, from the viewpoint of transparency of the resin composition obtained.

(2) Case where Resin is Photo-Curable Resin

The content of the resin in the resin composition of the present invention is not particularly limited, and the content is preferably 50% by mass or more, more preferably 60% by mass or more, even more preferably 70% by mass or more, even more preferably 80% by mass or more, and even more preferably 85% by mass or more, from the viewpoint of producing a molded article. The content is preferably 99% by mass or less, more preferably 98% by mass or less, even more preferably 96% by mass or less, and even more preferably 93% by mass or less, from the viewpoint of including a fine cellulose fiber composite, and the like.

The amount of the fine cellulose fiber composite in the resin composition of the present invention, based on 100 parts by mass of the resin, is preferably 0.01 parts by mass or more, more preferably 0.05 parts by mass or more, even more preferably 0.1 parts by mass or more, even more preferably 0.5 parts by mass or more, even more preferably 1 part by mass or more, even more preferably 3 parts by mass or more, even more preferably 6 parts by mass or more, and still even more preferably 10 parts by mass or more, from the viewpoint of mechanical strength, dimensional stability, and heat resistance of the resin composition obtained. In addition, the amount is preferably 100 parts by mass or less, more preferably 70 parts by mass or less, even more preferably 50 parts by mass or less, even more preferably 40 parts by mass or less, even more preferably 30 parts by mass or less, even more preferably 20 parts by mass or less, even more preferably 15 parts by mass or less, and even more preferably 10 parts by mass or less, from the viewpoint of transparency of the resin composition obtained.

The amount of the fine cellulose fibers (conversion amount) in the resin composition of the present invention, based on 100 parts by mass of the resin, is preferably 0.01 parts by mass or more, more preferably 0.05 parts by mass or more, even more preferably 0.1 parts by mass or more, even more preferably 0.5 parts by mass or more, even more preferably 0.8 parts by mass or more, even more preferably 1 part by mass or more, even more preferably 3 parts by mass or more, and still even more preferably 5 parts by mass or more, from the viewpoint of mechanical strength, dimensional stability, and heat resistance of the resin composition obtained. In addition, the amount is preferably 50 parts by mass or less, more preferably 40 parts by mass or less, even more preferably 35 parts by mass or less, even more preferably 30 parts by mass or less, even more preferably 20 parts by mass or less, even more preferably 15 parts by mass or less, and even more preferably 10 parts by mass or less, from the viewpoint of transparency of the resin composition obtained.

(3) Case where Resin is Thermosetting Resin

The content of the resin in the resin composition of the present invention is not particularly limited, and the content is preferably 50% by mass or more, more preferably 60% by mass or more, even more preferably 70% by mass or more, even more preferably 80% by mass or more, and even more preferably 85% by mass or more, from the viewpoint of producing a molded article. The content is preferably 99% by mass or less, more preferably 98% by mass or less, even more preferably 96% by mass or less, even more preferably 90% by mass or less, even more preferably 85% by mass or less, and even more preferably 80% by mass or less, from the viewpoint of including a fine cellulose fiber composite, and the like.

The amount of the fine cellulose fiber composite in the resin composition of the present invention, based on 100 parts by mass of the resin, is preferably 0.01 parts by mass or more, more preferably 0.05 parts by mass or more, even more preferably 0.1 parts by mass or more, even more preferably 0.5 parts by mass or more, even more preferably 1 part by mass or more, even more preferably 3 parts by mass or more, even more preferably 7 parts by mass or more, even more preferably 10 parts by mass or more, and even more preferably 15 parts by mass or more, from the viewpoint of mechanical strength, dimensional stability, and heat resistance of the resin composition obtained. In addition, the amount is preferably 100 parts by mass or less, more preferably 70 parts by mass or less, even more preferably 50 parts by mass or less, even more preferably 40 parts by mass or less, even more preferably 30 parts by mass or less, even more preferably 20 parts by mass or less, even more preferably 15 parts by mass or less, and even more preferably 10 parts by mass or less, from the viewpoint of transparency of the resin composition obtained.

The amount of the fine cellulose fibers (conversion amount) in the resin composition of the present invention, based on 100 parts by mass of the resin, is preferably 0.01 parts by mass or more, more preferably 0.05 parts by mass or more, even more preferably 0.08 parts by mass or more, even more preferably 0.1 parts by mass or more, even more preferably 0.5 parts by mass or more, even more preferably 0.8 parts by mass or more, even more preferably 1 part by mass or more, even more preferably 3 parts by mass or more, even more preferably 5 parts by mass or more, and even more preferably 8 parts by mass or more, from the viewpoint of mechanical strength, dimensional stability, and heat resistance of the resin composition obtained. In addition, the amount is preferably 50 parts by mass or less, more preferably 40 parts by mass or less, even more preferably 35 parts by mass or less, even more preferably 30 parts by mass or less, even more preferably 20 parts by mass or less, even more preferably 15 parts by mass or less, even more preferably 10 parts by mass or less, even more preferably 5 parts by mass or less, and even more preferably 3 parts by mass or less, from the viewpoint of transparency of the resin composition obtained.

The resin composition of the present invention can contain a plasticizer in addition to the above components. As the plasticizer, the plasticizers that are contained in the fine cellulose fiber composite dispersion of the present invention mentioned above can be used in the same manner.

The content of the plasticizer, based on 100 parts by mass of the resin, is preferably 1 part by mass or more, more preferably 3 parts by mass or more, and even more preferably 5 parts by mass or more, from the viewpoint of improving transparency of the molded article when formed into a molded article, and the content is preferably 30 parts by mass or less, more preferably 20 parts by mass or less, and even more preferably 15 parts by mass or less, from the same viewpoint.

The resin composition of the present invention can contain, as other components besides those mentioned above, a crystal nucleating agent, a filler including an inorganic filler and an organic filler, a hydrolysis inhibitor, a flame retardant, an antioxidant, a lubricant such as a hydrocarbon wax or an anionic surfactant, an ultraviolet absorbent, an antistatic agent, an anti-clouding agent, a photostabilizer, a pigment, a mildewproof agent, a bactericidal agent, a blowing agent, or a surfactant; a polysaccharide such as starch or alginic acid; a natural protein such as gelatin, glue, or casein; an inorganic compound such as tannin, zeolite, ceramics, or metal powder; a perfume; a fluidity modulator; a leveling agent; electroconductive agent; a ultraviolet dispersant; a deodorant; or the like, within the range that would not impair the effects of the present invention. In addition, similarly, other polymeric materials and other resin compositions may be properly added within the range that would not impair the effects of the present invention. As to the content proportion of the optional additives, the optional additives may be properly contained within the range that would not impair the effects of the present invention, and the content proportion of the optional additives is, for example, preferably 10% by mass or so or less, and more preferably 5% by mass or so or less, of the resin composition.

In addition, when the resin composition of the present invention contains a rubber-based resin, the resin composition can be optionally blended, in addition to those mentioned above, with various additives generally blended in tires and other rubbers as other components besides those mentioned above, such as fillers for reinforcements such as carbon black or silica ordinarily used in the rubber industries; various chemicals including, for example, a vulcanizing agent, a vulcanization accelerator, an aging inhibitor, a scorching inhibitor, zinc flower, stearic acid, a process oil, a vegetable fat or oil, a plasticizer or the like in a conventional general amount within the range that would not impair the object of the present invention.

The resin composition of the present invention can be prepared without particular limitations, so long as the resin composition contains a thermoplastic resin or a curable resin, and a fine cellulose fiber composite. For example, raw materials containing a thermoplastic resin or a curable resin, and a fine cellulose fiber composite, and further optionally various additives may be stirred with a Henschel mixer, or melt-kneaded with a known kneader such as a tightly closed kneader, a single-screw or twin-screw extruder, or an open roller-type kneader. In a case where a solvent is contained, the resin composition can be prepared by a solvent casting method.

Since the resin composition of the present invention has favorable workability, and excellent heat resistance, the resin composition can be suitably used in various applications such as daily sundries, household electric appliance parts, and automobile parts, and especially in automobile applications.

[Resin Molded Article]

The resin molded article can be prepared by subjecting the above resin composition to molding, such as extrusion-molding, injection-molding, or press molding. A preferred embodiment will be described hereinbelow for a case of a thermoplastic resin.

In extrusion molding, a resin composition of the present invention which is filled in a heated extruder is melted, and thereafter extruded from a T die, whereby a sheet-like molded product can be obtained. This sheet-like molded product is immediately brought into contact with a cooling roller to cool the sheet to a temperature equal to or lower than the Tg of the resin composition, thereby adjusting the crystalline property of the sheet, and subsequently the sheets are detached from the cooling roller, and wound around with a winding roller, whereby a sheet-like molded article can be obtained. Here, when filled in the extruder, the raw materials constituting the resin composition of the present invention, for example, raw materials containing a resin and a fine cellulose fiber composite, and further optionally various additives may be filled, melt-kneaded, and thereafter subjected to extrusion-molding.

The temperature of the extruder is preferably 170° C. or higher, more preferably 175° C. or higher, and even more preferably 180° C. or higher, from the viewpoint of homogeneously mixing a resin composition and preventing the deterioration of the resin. In addition, the temperature is preferably 240° C. or lower, more preferably 220° C. or lower, and even more preferably 210° C. or lower. Also, the temperature of the cooling roller is preferably 40° C. or lower, more preferably 30° C. or lower, and even more preferably 10° C. or lower, from the viewpoint of adjusting the crystalline property of the molded article.

In addition, the extrusion rate is preferably 1 m/minute or more, more preferably 5 m/minute or more, and even more preferably 10 m/minute or more, from the viewpoint of adjusting the crystalline property of the molded article. In addition, the extrusion rate is preferably 200 m/minute or less, 150 m/minute or less, and even more preferably 100 m/minute or less.

In the injection-molding, for example, the resin composition of the present invention is filled in a mold having a desired shape using an injection-molding machine with a cylinder temperature set at preferably from 180° to 220° C., and more preferably from 180° to 210° C., whereby the resin composition can be molded.

The mold temperature is preferably 110° C. or lower, more preferably 90° C. or lower, and even more preferably 80° C. or lower, from the viewpoint of improving crystallization velocity and improving operability. In addition, the mold temperature is preferably 30° C. or higher, more preferably 40° C. or higher, and even more preferably 60° C. or higher.

The holding time inside the mold is not particularly limited, and the holding time is preferably from 2 to 60 seconds, more preferably from 3 to 30 seconds, and even more preferably from 5 to 20 seconds, for example, in a mold at 90° C., from the viewpoint of productivity of the molded article made of the resin composition.

When a sheet-like molded article, for example, is molded by press molding, a molded article can be prepared by subjecting a resin composition of the present invention to put and press into a frame having a sheet-like shape.

As the temperature and pressure of the press molding, it is preferable that the press can be carried out, for example, preferably under the conditions of a temperature of from 170° to 240° C. and a pressure of from 5 to 30 MPa, more preferably under the conditions of a temperature of from 175° to 220° C. and a pressure of from 10 to 25 MPa, and even more preferably under the conditions of a temperature of from 180° to 210° C. and a pressure of from 10 to 20 MPa. The press time cannot be unconditionally determined because the press time depends upon the temperature and pressure of the press, and the press time is preferably from 1 to 10 minutes, more preferably from 1 to 7 minutes, and even more preferably from 1 to 5 minutes.

In addition, immediately after the press under the above conditions, it is preferable that the resin composition is cooled by subjecting to press preferably under the conditions of a temperature of from 0° to 100° C. and a pressure of from 0.1 to 30 MPa, more preferably under the conditions of a temperature of from 10° to 100° C. and a pressure of from 0.1 to 10 MPa, and even more preferably under the conditions of a temperature of from 10° to 90° C. and a pressure of from 0.1 to 5 MPa. By pressing under the above temperature conditions, a resin composition of the present invention is cooled to a temperature of equal to or lower than its Tg, thereby adjusting its crystalline property. Therefore, the press time cannot be unconditionally determined because the press time depends upon the press temperature and pressure, and the press time is preferably from 1 to 10 minutes, more preferably from 1 to 7 minutes, and even more preferably from 1 to 5 minutes.

When a sheet-like molded article is prepared, its thickness is preferably 0.05 mm or more, more preferably 0.1 mm or more, and even more preferably 0.15 mm or more, from the viewpoint of workability. In addition, the thickness is 1.5 mm or less, more preferably 1.0 mm or less, and even more preferably 0.5 mm or less.

The molded article of the resin composition of the present invention thus obtained has excellent mechanical strength and heat resistance, so that the molded article can be suitably used in various applications listed in the above resin composition.

With respect to the above-mentioned embodiments, the present invention further discloses the following fine cellulose fiber composite, and the resin composition or molded article containing the composite.

<1> A fine cellulose fiber composite containing fine cellulose fibers and a polymer having an ethylene oxide/propylene oxide (EO/PO) copolymer moiety or a propylene oxide (PO) polymer moiety, the fine cellulose fibers being connected with the polymer via an amide bond (also referred to as a fine cellulose fiber composite A).

<2> The fine cellulose fiber composite according to the above <1>, wherein the average fiber size of the fine cellulose fibers is preferably 0.1 nm or more, more preferably 0.2 nm or more, even more preferably 0.5 nm or more, even more preferably 0.8 nm or more, and still even more preferably 1 nm or more, and preferably 200 nm or less, more preferably 100 nm or less, even more preferably 50 nm or less, even more preferably 20 nm or less, even more preferably 10 nm or less, and still even more preferably 5 nm or less.

<3> The fine cellulose fiber composite according to the above <1> or <2>, wherein the carboxy group content of the fine cellulose fibers is preferably 0.1 mmol/g or more, preferably 0.4 mmol/g or more, more preferably 0.6 mmol/g or more, and even more preferably 0.8 mmol/g or more, and preferably 3 mmol/g or less, more preferably 2 mmol/g or less, even more preferably 1.8 mmol/g or less, and even more preferably 1.5 mmol/g or less.

<4> The fine cellulose fiber composite according to any one of the above <1> to <3>, wherein the average aspect ratio (fiber length/fiber size) of the fine cellulose fibers is preferably 10 or more, more preferably 20 or more, even more preferably 50 or more, and still even more preferably 100 or more, and preferably 1,000 or less, more preferably 500 or less, even more preferably 400 or less, and still even more preferably 350 or less.

<5> The fine cellulose fiber composite according to any one of the above <1> to <4>, wherein the crystallinity of the fine cellulose fibers is preferably 30% or more, more preferably 35% or more, even more preferably 40% or more, and still even more preferably 45% or more, and preferably 95% or less, more preferably 90% or less, even more preferably 85% or less, and still even more preferably 80% or less.

<6> The fine cellulose fiber composite according to any one of the above <1> to <5>, wherein the amine having an EO/PO copolymer moiety or a PO polymer moiety may be preferably any one of a primary amine and a secondary amine, and more preferably a primary amine.

<7> The fine cellulose fiber composite according to any one of the above <1> to <6>, wherein the molecular weight of the EO/PO copolymer moiety or the PO polymer moiety is preferably 500 or more, more preferably 700 or more, even more preferably 1,000 or more, and even more preferably 1,500 or more, and preferably 10,000 or less, more preferably 7,000 or less, even more preferably 5,000 or less, even more preferably 4,000 or less, even more preferably 3,500 or less, and still even more preferably 2,500 or less.

<8> The fine cellulose fiber composite according to any one of the above <1> to <7>, wherein the PO content ratio (% by mol) in the EO/PO copolymer moiety is preferably 1% by mol or more, more preferably 6% by mol or more, and even more preferably 8% by mol or more, and preferably less than 100% by mol, more preferably 99% by mol or less, even more preferably 90% by mol or less, even more preferably 80% by mol or less, even more preferably 74% by mol or less, even more preferably 60% by mol or less, even more preferably 51% by mol or less, even more preferably 40% by mol or less, and even more preferably 30% by mol or less.

<9> The fine cellulose fiber composite according to any one of the above <1> to <8>, wherein the EO/PO copolymer moiety or the PO polymer moiety and the amine are preferably bound directly or via a linking group, wherein the linking group is preferably a hydrocarbon group, and more preferably an alkylene group having the number of carbon atoms of preferably from 1 to 6, and more preferably from 1 to 3.

<10> The fine cellulose fiber composite according to any one of the above <1> to <9>, wherein the amine having an EO/PO copolymer moiety or a PO polymer moiety is preferably a compound represented by the following formula (i):

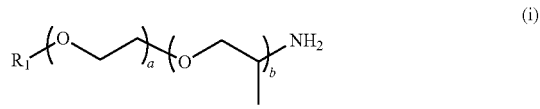

(i)

wherein $R_1$ is a hydrogen atom, a linear or branched alkyl group having from 1 to 6 carbon atoms, a —$CH_2CH(CH_3)$ $NH_2$ group, or a group represented by the following formula (ii); EO and PO are present in a random or block form; a is 0 or a positive number showing an average number of moles of EO added; and b is a positive number showing an average number of moles of PO added, wherein a is preferably exceeding 0, more preferably 1 or more, even more preferably 5 or more, even more preferably 10 or more, even more preferably 15 or more, even more preferably 20 or more, and even more preferably 25 or more, and preferably 100 or less, more preferably 80 or less, even more preferably 60 or less, and even more preferably 45 or less, and wherein b is preferably 9 or more, more preferably 12 or more, even more preferably 17 or more, and still even more preferably 26 or more, and preferably 175 or less, more preferably 120 or less, even more preferably 80 or less, even more preferably 70 or less, even more preferably 60 or less, and still even more preferably 44 or less,
wherein the formula (ii) is:

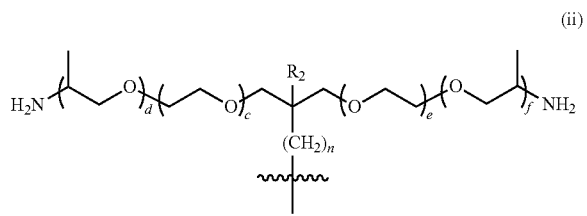

wherein n is 0 or 1; $R_2$ is a phenyl group, a hydrogen atom, or a linear or branched alkyl group having from 1 to 3 carbon atoms; EO and PO are present in a random or block form; c and e show an average number of moles of EO added, which is independently a number of from 0 to 50; and d and f show an average number of moles of PO added, which is independently a number of from 1 to 50.

<11> The fine cellulose fiber composite according to any one of the above <1> to <10>, wherein the binding amount of the amide groups having an EO/PO copolymer moiety or a PO polymer moiety in the fine cellulose fiber composite A is preferably 0.01 mmol/g or more, more preferably 0.05 mmol/g or more, even more preferably 0.1 mmol/g or more, and even more preferably 0.2 mmol/g or more, and preferably 3 mmol/g or less, more preferably 2 mmol/g or less, even more preferably 1 mmol/g or less, and even more preferably 0.5 mmol/g or less.

<12> The fine cellulose fiber composite according to any one of the above <1> to <11>, wherein the modification ratio of the amine having an EO/PO copolymer moiety or a PO polymer moiety in the fine cellulose fiber composite A is preferably 1% or more, more preferably 5% or more, even more preferably 10% or more, even more preferably 15% or more, and even more preferably 20% or more, and preferably 90% or less, more preferably 70% or less, even more preferably 50% or less, and even more preferably 40% or less.

<13> The fine cellulose fiber composite according to any one of the above <1> to <12>, wherein the fine cellulose fiber composite is obtainable by a production method including the following step (A) and step (B): step (A): oxidizing natural cellulose fibers in the presence of an N-oxyl compound, to provide carboxy group-containing cellulose fibers; and step (B): subjecting the carboxy group-containing cellulose fibers obtained in the step (A) and an amine having an EO/PO copolymer moiety or a PO polymer moiety to an amide-formation reaction.

<14> The fine cellulose fiber composite according to the above <13>, wherein in the step (A), the carboxy group-containing cellulose fibers obtained by the oxidation reaction are subjected to purification, to provide carboxy group-containing cellulose fibers having high purity.

<15> The fine cellulose fiber composite according to the above <14>, wherein the method includes, subsequent to the purification step, finely pulverizing the carboxy group-containing cellulose fibers obtained in the step (A).

<16> The fine cellulose fiber composite according to any one of the above <13> to <15>, wherein the amount of the amine having an EO/PO copolymer moiety or a PO polymer moiety used is an amount such that the amine groups are used in an amount of preferably 0.1 mol or more, more preferably 0.5 mol or more, even more preferably 0.7 mol or more, and still even more preferably 1 mol or more, and preferably 50 mol or less, more preferably 20 mol or less, and even more preferably 10 mol or less, based on one mol of the carboxy groups contained in the carboxy group-containing fine cellulose fibers.

<17> The fine cellulose fiber composite according to any one of the above <13> to <16>, wherein the reaction temperature is preferably 0° C. or higher, more preferably 5° C. or higher, and even more preferably 10° C. or higher, and preferably 200° C. or lower, more preferably 80° C. or lower, and even more preferably 30° C. or lower, and wherein the reaction time is preferably from 1 to 24 hours, and more preferably from 10 to 20 hours.

<18> The fine cellulose fiber composite according to any one of the above <1> to <17>, wherein the average fiber size of the fine cellulose fiber composite A is preferably 0.1 nm or more, more preferably 0.2 nm or more, even more preferably 0.5 nm or more, even more preferably 0.8 nm or more, and still even more preferably 1 nm or more, and preferably 200 nm or less, more preferably 100 nm or less, even more preferably 50 nm or less, even more preferably 20 nm or less, and still even more preferably 10 nm or less.

<19> The fine cellulose fiber composite according to any one of the above <1> to <18>, wherein the fine cellulose fiber composite A contains fine cellulose fibers and an EO/PO copolymer moiety or a PO polymer moiety, the fine cellulose fiber being connected with the copolymer moiety or polymer moiety via an amide bond, and preferably has an average fiber size of from 0.1 to 200 nm.

<20> A fine cellulose fiber composite, as one embodiment of a fine cellulose fiber composite A, containing fine cellulose fibers and a polymer having an ethylene oxide/propylene oxide (EO/PO) copolymer moiety or a propylene oxide (PO) polymer moiety, wherein the fine cellulose fibers are connected with the polymer via an amide bond, and wherein one or two bindings selected from the group consisting of the following (1) and (2) are further introduced (also referred to as a fine cellulose fiber composite a):

(1) the binding via an ionic bond of a quaternary alkylammonium cation having a total number of carbon atoms of from 4 to 40; and (2) the binding via an amide bond of an aromatic hydrocarbon group having a total number of carbon atoms of from 6 to 20.

<21> The fine cellulose fiber composite according to the above <20>, wherein the amine having an EO/PO copolymer moiety or a PO polymer moiety is used in the binding of the EO/PO copolymer moiety or the PO polymer moiety, the quaternary alkylammonium compound having a total number of carbon atoms of from 4 to 40 is used in the binding of the quaternary alkylammonium cation having a total number of carbon atoms of from 4 to 40, and/or an amine having an aromatic hydrocarbon group having a total number of carbon atoms of from 6 to 20 is used in the binding of an aromatic hydrocarbon group having a total number of carbon atoms of from 6 to 20 (the amine having an EO/PO copolymer moiety or a PO polymer moiety is also referred to as a first amine, and the quaternary alkylammonium compound having a total number of carbon atoms of from 4 to 40 and the amine having an aromatic hydrocarbon group having a total number of carbon atoms of from 6 to 20 is also referred to as a second amine).

<22> The fine cellulose fiber composite according to the above <20> or <21>, wherein the fine cellulose fibers are those as defined in any one of the above <2> to <5>.

<23> The fine cellulose fiber composite according to any one of the above <20> to <22>, wherein the amine having an EO/PO copolymer moiety or a PO polymer moiety is one as defined in any one of the above <6> to <10>.

<24> The fine cellulose fiber composite according to any one of the above <20> to <23>, wherein the quaternary alkylammonium compound having a total number of carbon atoms of from 4 to 40 preferably contains alkyl groups having from 1 to 20 carbon atoms, wherein the alkyl group may be substituted or unsubstituted, and more preferably contains one or more members selected from the group consisting of a methyl group, an ethyl group, a propyl group, a butyl group, a lauryl group, a cetyl group, a stearyl group, a benzyl group, and a phenethyl group.

<25> The fine cellulose fiber composite according to any one of the above <20> to <24>, wherein in the quaternary alkylammonium compound having a total number of carbon atoms of from 4 to 40, the total number of carbon atoms is preferably 8 or more, and more preferably 12 or more, and preferably 36 or less, more preferably 32 or less, even more preferably 24 or less, even more preferably 20 or less, and even more preferably 18 or less.

<26> The fine cellulose fiber composite according to any one of the above <20> to <25>, wherein the amine having an aromatic hydrocarbon group may be any of primary amines and secondary amines, and preferably the primary amines, and the number of the aromatic hydrocarbon groups in the amine may be one or two, and preferably one.

<27> The fine cellulose fiber composite according to any one of the above <20> to <26>, wherein the number of carbon atoms of the amine having an aromatic hydrocarbon group is preferably 18 or less, and more preferably 12 or less.

<28> The fine cellulose fiber composite according to any one of the above <20> to <27>, wherein the amine having an aromatic hydrocarbon group is preferably an amine having an aryl group and an amine having an aralkyl group, and more preferably the amine having an aryl group.

<29> The fine cellulose fiber composite according to any one of the above <20> to <28>, wherein in a case where the aromatic hydrocarbon group in the amine having an aromatic hydrocarbon group is an aryl group, a total number of carbon atoms is 6 or more, and 20 or less, preferably 14 or less, and more preferably 10 or less, and in a case where the aromatic hydrocarbon group is an aralkyl group, a total number of carbon atoms is 7 or more, and 20 or less, preferably 13 or less, more preferably 11 or less, and even more preferably 9 or less.

<30> The fine cellulose fiber composite according to any one of the above <20> to <29>, wherein in the fine cellulose fiber composite a, in addition to the amine having an EO/PO copolymer moiety or a PO polymer moiety, either one of a quaternary alkylammonium compound having a total number of carbon atoms of from 4 to 40 or an amine having an aromatic hydrocarbon group having a total number of carbon atoms of from 6 to 20 may be bound, or each may be bound alone, or may be bound together.

<31> The fine cellulose fiber composite according to any one of the above <20> to <30>, wherein the binding amount of the amine having an EO/PO copolymer moiety or a PO polymer moiety, which is a first amine, in the fine cellulose fiber composite a, is preferably 0.01 mmol/g or more, more preferably 0.03 mmol/g or more, and even more preferably 0.05 mmol/g or more, and preferably 1 mmol/g or less, more preferably 0.5 mmol/g or less, even more preferably 0.25 mmol/g or less, even more preferably 0.1 mmol/g or less, even more preferably 0.08 mmol/g or less, and even more preferably 0.06 mmol/g or less.

<32> The fine cellulose fiber composite according to any one of the above <20> to <31>, wherein the binding amount of the second amine in the fine cellulose fiber composite a is preferably 0.2 mmol/g or more, more preferably 0.3 mmol/g or more, even more preferably 0.5 mmol/g or more, even more preferably 0.8 mmol/g or more, and even more preferably 1.0 mmol/g or more, and preferably 1.5 mmol/g or less, more preferably 1.3 mmol/g or less, and even more preferably 1.2 mmol/g or less.

<33> The fine cellulose fiber composite according to any one of the above <20> to <32>, wherein a total of the binding amount of the first amine and the binding amount of the second amine in the fine cellulose fiber composite a is preferably 0.2 mmol/g or more, more preferably 0.3 mmol/g or more, even more preferably 0.5 mmol/g or more, even more preferably 0.8 mmol/g or more, and even more preferably 1.0 mmol/g or more, and preferably 1.5 mmol/g or less, more preferably 1.3 mmol/g or less, and even more preferably 1.2 mmol/g or less.

<34> The fine cellulose fiber composite according to any one of the above <20> to <33>, wherein the modification ratio of the EO/PO copolymer moiety or the PO polymer moiety in the fine cellulose fiber composite a is preferably 0.5% or more, more preferably 1% or more, even more preferably 2% or more, and even more preferably 5% or more, and preferably 90% or less, more preferably 50% or less, even more preferably 20% or less, and even more preferably 10% or less.

<35> The fine cellulose fiber composite according to any one of the above <20> to <34>, wherein the modification ratio of the quaternary alkylammonium cation and/or the aromatic hydrocarbon group in the fine cellulose fiber composite a is preferably 10% or more, more preferably 20% or more, even more preferably 30% or more, even more preferably 40% or more, even more preferably 50% or more, even more preferably 60% or more, and even more preferably 70% or more, and preferably 90% or less, more preferably 85% or less, and even more preferably 80% or less.

<36> The fine cellulose fiber composite according to any one of the above <20> to <35>, wherein a total of the modification ratio of the first amine and the modification ratio of the second amine in the fine cellulose fiber composite a is preferably 10% or more, more preferably 20% or more, even more preferably 30% or more, even more preferably 40% or more, even more preferably 50% or more, even more preferably 60% or more, even more preferably 70% or more, even more preferably 75% or more, and even more preferably 80% or more, and preferably 100% or less, more preferably 98% or less, even more preferably 95% or less, even more preferably 90% or less, and even more preferably 85% or less.

<37> The fine cellulose fiber composite according to any one of the above <20> to <36>, wherein in the fine cellulose fiber composite a, a molar ratio of the binding amount of the first amine to the binding amount of the second amine (first amine/second amine) is preferably 0.01 or more, and more preferably 0.03 or more, and preferably 0.4 or less, more preferably 0.3 or less, even more preferably 0.2 or less, even more preferably 0.1 or less, and even more preferably 0.05 or less.

<38> The fine cellulose fiber composite according to any one of the above <20> to <37>, wherein when the quaternary alkylammonium compound and the amine having an aromatic hydrocarbon group are used together as the second amines, a molar ratio of the binding amounts thereof (quaternary alkylammonium compound/amine having aromatic hydrocarbon group) is preferably 0.1 or more, more preferably 0.2 or more, and even more preferably 0.4 or more, and preferably 0.9 or less, more preferably 0.8 or less, and even more preferably 0.6 or less.

<39> The fine cellulose fiber composite according to any one of the above <20> to <38>, wherein the order of introduction of the quaternary alkylammonium compound and the amine having an aromatic hydrocarbon group into the fine cellulose fibers or the introduction of amine having an EO/PO copolymer moiety or a PO polymer moiety is such that either one may be carried out first, and the introduction of the quaternary alkylammonium compound and the amine having an aromatic hydrocarbon group is preferably carried out first.

<40> The fine cellulose fiber composite according to any one of the above <20> to <39>, wherein the fine cellulose fiber composite a is obtained by a production method including the following steps (a), (b-1), and (b-2):

step (a): oxidizing natural cellulose fibers in the presence of an N-oxyl compound, to provide carboxy group-containing cellulose fibers; and step (b-1): mixing the carboxy group-containing cellulose fibers obtained in the step (a) and a quaternary alkylammonium compound, and subjecting them to an amide-formation reaction with an amine having an aromatic hydrocarbon group, or carrying out only one of the above, to provide cellulose fibers to which the quaternary alkylammonium cation and/or the aromatic hydrocarbon group is bound; and step (b-2): subjecting the cellulose fibers obtained in the step (b-1) and an amine having an EO/PO copolymer moiety or a PO polymer moiety to an amide-formation reaction.

<41> The fine cellulose fiber composite according to the above <40>, wherein, in the step (a), the carboxy group-containing cellulose fibers obtained in the oxidation reaction are subjected to purification, to provide carboxy group-containing cellulose fibers having high purity.

<42> The fine cellulose fiber composite according to the above <41>, wherein, subsequent to the purifying step, the carboxy-group containing fine cellulose fibers obtained in the step (a) are subjected to a finely pulverizing step.

<43> The fine cellulose fiber composite according to any one of the above <40> to <42>, wherein the amount of the above quaternary alkylammonium compound in the step (b-1) used is an amount such that the quaternary alkylammonium cation is used in an amount of preferably 0.1 mol or more, more preferably 0.5 mol or more, even more preferably 0.7 mol or more, and still even more preferably 1 mol or more, and preferably 50 mol or less, more preferably 20 mol or less, and even more preferably 10 mol or less, based on 1 mol of the carboxy groups contained in the carboxy group-containing fine cellulose fibers.

<44> The fine cellulose fiber composite according to any one of the above <40> to <43>, wherein the solvent used when mixing the carboxy group-containing fine cellulose fibers and the quaternary alkylammonium compound in the step (b-1) is preferably water, a diester obtained from succinic acid and triethylene glycol monomethyl ether, ethanol, and DMF.

<45> The fine cellulose fiber composite according to any one of the above <40> to <44>, wherein the temperature during mixing of the carboxy group-containing fine cellulose fibers and the quaternary alkylammonium compound in the step (b-1) is preferably 0° C. or higher, more preferably 5° C. or higher, and even more preferably 10° C. or higher, and preferably 50° C. or lower, more preferably 40° C. or lower, and even more preferably 30° C. or lower.

<46> The fine cellulose fiber composite according to any one of the above <40> to <45>, wherein the mixing time of the carboxy group-containing fine cellulose fibers and the quaternary alkylammonium compound in the step (b-1) is preferably 0.01 hours or more, more preferably 0.1 hours or more, and even more preferably 1 hour or more, and preferably 48 hours or less, more preferably 24 hours or less, and even more preferably 12 hours or less.

<47> The fine cellulose fiber composite according to any one of the above <40> to <46>, wherein the amount of the amine having an aromatic hydrocarbon group used in the step (b-1) used is an amount such that the amine groups are used in an amount of preferably 0.1 mol or more, more preferably 0.5 mol or more, even more preferably 0.7 mol or more, and still even more preferably 1 mol or more, and preferably 50 mol or less, more preferably 20 mol or less, and even more preferably 10 mol or less, based on 1 mol of the carboxy groups contained in the carboxy group-containing fine cellulose fibers.

<48> The fine cellulose fiber composite according to any one of the above <40> to <47>, wherein in the reaction of the carboxy group-containing fine cellulose fibers with the amine having an aromatic hydrocarbon group in the step (b-1), a known condensing agent can be used.

<49> The fine cellulose fiber composite according to any one of the above <40> to <48>, wherein in the reaction of the carboxy group-containing fine cellulose fibers with the amine having an aromatic hydrocarbon group in the step (b-1), a solvent can be used, and it is preferable to select a solvent that dissolves an amine used.

<50> The fine cellulose fiber composite according to any one of the above <40> to <49>, wherein the temperature and time during the reaction of the carboxy group-containing fine cellulose fibers with the amine having an aromatic hydrocarbon group in the step (b-1) can be selected from those as listed in the above <17>.

<51> The fine cellulose fiber composite according to any one of the above <40> to <50>, wherein the amount of the amine having an EO/PO copolymer moiety or a PO polymer moiety usable in the step (b-2) used is an amount such that the amine groups are used in an amount of preferably 0.01 mol or more, more preferably 0.05 mol or more, even more preferably 0.1 mol or more, even more preferably 0.5 mol or more, even more preferably 0.7 mol or more, and still even more preferably 1 mol or more, and preferably 50 mol or less, more preferably 20 mol or less, and even more preferably 10 mol or less, based on one mol of carboxy groups contained in the carboxy group-containing fine cellulose fibers.

<52> The fine cellulose fiber composite according to any one of the above <40> to <51>, wherein the temperature and time during the reaction in the step (b-2) can be selected from those as listed in the above <17>.

<53> The fine cellulose fiber composite according to any one of the above <20> to <52>, wherein the average fiber size of the fine cellulose fiber composite a is preferably 0.1 nm or more, more preferably 0.2 nm or more, even more preferably 0.5 nm or more, even more preferably 0.8 nm or more, and still even more preferably 1 nm or more, and preferably 200 nm or less, more preferably 100 nm or less, even more preferably 50 nm or less, even more preferably 20 nm or less, and still even more preferably 10 nm or less.

<54> The fine cellulose fiber composite according to any one of the above <20> to <53>, wherein it is preferable that the fine cellulose fiber composite a contains fine cellulose fibers, an EO/PO copolymer moiety or a PO polymer moiety, and a quaternary alkylammonium cation and/or an aromatic hydrocarbon, the fine cellulose fibers being connected with the copolymer moiety or the polymer moiety via an amide bond, being ionically bonded to the quaternary alkylammonium cation and/or amide-bonded to the aromatic hydrocarbon group, wherein the average fiber size is from 0.1 to 200 nm.

<55> A fine cellulose fiber composite dispersion containing a fine cellulose fiber composite as defined in any one of the above <1> to <54> and a plasticizer.

<56> The fine cellulose fiber composite dispersion according to the above <55>, wherein the content of the fine cellulose fiber composite in the dispersion is preferably 0.01% by mass or more, more preferably 0.03% by mass or more, even more preferably 0.05% by mass or more, and even more preferably 0.1% by mass or more, and preferably 70% by mass or less, more preferably 50% by mass or less, even more preferably 30% by mass or less, even more preferably 10% by mass or less, even more preferably 5% by mass or less, and even more preferably 3% by mass or less.

<57> The fine cellulose fiber composite dispersion according to the above <55> or <56>, wherein the amount of the fine cellulose fibers (conversion amount) is preferably 0.01% by mass or more, more preferably 0.03% by mass or more, even more preferably 0.05% by mass or more, even more preferably 0.08% by mass or more, and even more preferably 0.1% by mass or more, and preferably 30% by mass or less, more preferably 20% by mass or less, even more preferably 10% by mass or less, even more preferably 5% by mass or less, even more preferably 1% by mass or less, even more preferably 0.5% by mass or less, and still even more preferably 0.3% by mass or less of the dispersion.

<58> The fine cellulose fiber composite dispersion according to any one of the above <55> to <57>, wherein the content of the plasticizer in the dispersion is preferably 95% by mass or more, more preferably 97% by mass or more, even more preferably 99% by mass or more, and still even more preferably 99.5% by mass or more, and preferably 99.95% by mass or less, more preferably 99.9% by mass or less, and even more preferably 99.8% by mass or less.

<59> A resin composition containing a thermoplastic resin or a curable resin and a fine cellulose fiber composite as defined in any one of the above <1> to <54>.

<60> The resin composition according to the above <59>, wherein the thermoplastic resin is preferably one or more members selected from the group consisting of saturated polyester-based resins such as polylactic acid resin; olefinic resins such as polyethylene-based resins and polypropylene-based resins; cellulose-based resins such as triacetylated cellulose and diacetylated cellulose; nylon resins, vinyl chloride resins, styrene resins, (meth)acrylic resins, vinyl ether resins, polyvinyl alcohol resins, polyamide-based resins, polycarbonate-based resins, polysulfonate-based resins, and the like, and more preferably the polyester-based resins and the (meth)acrylic resins.

<61> The resin composition according to the above <60>, wherein the polyester-based resin is preferably one or more members selected from the group consisting of aliphatic polyester resins such as polyhydroxy butyrate, polycaprolactone, polybutylene succinate, polybutylene succinate/adipate, polyethylene succinate, polylactic acid resin, polymalic acid, polyglycolic acid, polydioxanone, and poly(2-oxetanone); aliphatic aromatic co-polyester resins such as polybutylene succinate/terephthalate, polybutylene adipate/terephthalate, and polytetramethylene adipate/terephthalate; mixtures of a natural polymer such as starch, cellulose, chitin, chitosan, gluten, gelatin, zain, soybean protein, collagen, or keratin, and the aliphatic polyester resins or the aliphatic aromatic co-polyester resins mentioned above; and the like, more preferably the polybutylene succinate and the polylactic acid resin, and even more preferably the polylactic acid resin.

<62> The resin composition according to the above <60>, wherein the (meth)acrylic resin is preferably those containing 50% by weight or more of methyl (meth)acrylate, on the basis of a total of the monomer units of the entire polymer constituting the resin, and more preferably methacrylic resin.

<63> The resin composition according to the above <59>, wherein the curable resin is preferably a photo-curable resin and/or a thermosetting resin.

<64> The resin composition according to the above <63>, wherein the photo-curable resin is preferably obtained by polymerization with a photopolymerization initiator, an oligomer or resin having one or more reactive unsaturated groups, selected from (meth)acrylates of alkylene oxide adducts of bisphenol A, epoxy (meth)acrylates (bisphenol A type epoxy (meth)acrylate, novolak type epoxy (meth)acrylate, etc.), polyester (meth)acrylates (e.g., aliphatic polyester-type (meth)acrylates, aromatic polyester-type (meth)acrylates, etc.), urethane (meth)acrylates (polyester-type urethane (meth)acrylates, polyether-type urethane (meth)acrylates, etc.), and silicone (meth)acrylates.

<65> The resin composition according to the above <63> or <64>, wherein the photopolymerization initiator used in the photo-curable resin is preferably one or more members selected from the group consisting of 1-hydroxy-cyclohexyl-phenyl-ketone, 2-methyl-1[4-(methylthio)phenyl]-2-morpholinopropan-1-one, benzyl methyl ketone, 1-(4-dodecylphenyl)-2-hydroxy-2-methylpropan-1-one, 1-(4-isopropylphenyl)-2-hydroxy-2-hydroxy-2-methylpropan-1-one, and benzophenone, and more preferably 1-hydroxy-cyclohexyl-phenyl-ketone.

<66> The resin composition according to the above <63>, wherein the thermosetting resin is preferably one or more members selected from the group consisting of epoxy resins; phenol resins; urea resins; melamine resins; unsaturated polyester resins; diallyl phthalate resins; polyurethane resins; silicon-containing resins; polyimide resins; elastomeric resins, and more preferably epoxy resins.

<67> The resin composition according to the above <66>, wherein the elastomeric resin is preferably diene-based rubbers, and more preferably natural rubber (NR), polyisoprene rubber (IR), polybutadiene rubber (BR), styrene-butadiene copolymer rubber (SBR), butyl rubber (IIR), butadiene-acrylonitrile copolymer rubber (NBR), and modified natural rubbers, and the like, wherein the modified natural rubber includes epoxidized natural rubber, hydrogenated natural rubber, and the like, and these can be used alone or in a combination of two or more kinds, and one or more members selected from natural rubber (NR), polyisoprene rubber (IR), polybutadiene rubber (BR), and styrene-butadiene copolymer rubber (SBR) are even more preferred, and one or more members selected from natural rubber (NR), styrene-butadiene copolymer rubber (SBR), and modified natural rubbers are more preferred.

<68> The resin composition according to any one of the above <59> to <67>, wherein in the resin composition, the content of the resin is preferably 50% by mass or more, more preferably 60% by mass or more, 70% by mass or more, even more preferably 80% by mass or more, and even more preferably 85% by mass or more, and preferably 99% by mass or less, more preferably 98% by mass or less, even more preferably 95% by mass or less, and even more preferably 93% by mass or less;

the content of the fine cellulose fiber composite is preferably 0.01% by mass or more, more preferably 0.05% by mass or more, even more preferably 0.1% by mass or more, even more preferably 0.3% by mass or more, even more preferably 0.5% by mass or more, even more preferably 1% by mass or more, even more preferably 2% by mass or more, and even more preferably 3% by mass or more, and preferably 50% by mass or less, more preferably 40% by mass or less, even more preferably 30% by mass or less, even more preferably 20% by mass or less, and still even more preferably 15% by mass or less;

the amount of the fine cellulose fiber composite, based on 100 parts by mass of the resin, is preferably 0.01 parts by mass or more, more preferably 0.05 parts by mass or more, even more preferably 0.1 parts by mass or more, even more preferably 0.3 parts by mass or more, even more preferably 0.5 parts by mass or more, even more preferably 1 part by mass or more, and still even more preferably 3 parts by mass or more, and preferably 60 parts by mass or less, more preferably 50 parts by mass or less, even more preferably 40 parts by mass or less, even more preferably 30 parts by mass or less, even more preferably 20 parts by mass or less, and even more preferably 15 parts by mass or less; and the amount of the fine cellulose fibers (conversion amount), based on 100 parts by mass of the resin, is preferably 0.01 parts by mass or more, more preferably 0.05 parts by mass or more, and even more preferably 0.08 parts by mass or more, and preferably 60 parts by mass or less, more preferably 50 parts by mass or less, even more preferably 40 parts by mass or less, even more preferably 30 parts by mass or less, even more preferably 20 parts by mass or less, even more preferably 15 parts by mass or less, and even more preferably 10 parts by mass or less.

<69> The resin composition according to any one of the above <59> to <62> and <68>, wherein in a case where the resin is a thermoplastic resin, in the resin composition, the content of the resin is preferably 50% by mass or more, more preferably 60% by mass or more, even more preferably 70% by mass or more, even more preferably 80% by mass or more, and even more preferably 85% by mass or more, and preferably 99% by mass or less, more preferably 98% by mass or less, even more preferably 95% by mass or less, even more preferably 93% by mass or less, even more preferably 90% by mass or less, and even more preferably 87% by mass or less;

the amount of the fine cellulose fiber composite, based on 100 parts by mass of the resin, is preferably 0.01 parts by mass or more, more preferably 0.05 parts by mass or more, even more preferably 0.1 parts by mass or more, even more preferably 0.5 parts by mass or more, even more preferably 1 part by mass or more, even more preferably 3 parts by mass or more, even more preferably 6 parts by mass or more, and even more preferably 10 parts by mass or more, and preferably 100 parts by mass or less, more preferably 70 parts by mass or less, even more preferably 50 parts by mass or less, even more preferably 40 parts by mass or less, even more preferably 30 parts by mass or less, even more preferably 20 parts by mass or less, even more preferably 15 parts by mass or less, even more preferably 5 parts by mass or less, even more preferably 3 parts by mass or less, even more preferably 1 part by mass or less, even more preferably 0.5 parts by mass or less, and even more preferably 0.3 parts by mass or less; and the amount of the fine cellulose fibers (conversion amount), based on 100 parts by mass of the resin, is preferably 0.01 parts by mass or more, more preferably 0.05 parts by mass or more, even more preferably 0.08 parts by mass or more, even more preferably 0.1 parts by mass or more, even more preferably 0.3 parts by mass or more, even more preferably 0.5 parts by mass or more, even more preferably 2 parts by mass or more, and even more preferably 5 parts by mass or more, and preferably 60 parts by mass or less, more preferably 50 parts by mass or less, even more preferably 40 parts by mass or less, even more preferably 35 parts by mass or less, even more preferably 30 parts by mass or less, even more preferably 20 parts by mass or less, even more preferably 15 parts by mass or less, even more preferably 10 parts by mass or less, even more preferably 5 parts by mass or less, even more preferably 3 parts by mass or less, even more preferably 1 part by mass or less, even more preferably 0.5 parts by mass or less, and even more preferably 0.3 parts by mass or less.

<70> The resin composition according to any one of the above <59>, <63> to <65>, and <68>, wherein in a case where the resin is a photo-curable resin, in the resin composition, the content of the resin is preferably 50% by mass or more, more preferably 60% by mass or more, even more preferably 70% by mass or more, even more preferably 80% by mass or more, and even more preferably 85% by mass or more, and preferably 99% by mass or less, more preferably 98% by mass or less, even more preferably 96% by mass or less, and even more preferably 93% by mass or less;

the amount of the fine cellulose fiber composite, based on 100 parts by mass of the resin, is preferably 0.01 parts by mass or more, more preferably 0.05 parts by mass or more, even more preferably 0.1 parts by mass or more, even more preferably 0.5 parts by mass or more, even more preferably 1 part by mass or more, even more preferably 3 parts by mass or more, even more preferably 6 parts by mass or more, and still even more preferably 10 parts by mass or more, and preferably 100 parts by mass or less, more preferably 70 parts by mass or less, even more preferably 50 parts by mass or less, even more preferably 40 parts by mass or less, even more preferably 30 parts by mass or less, even more preferably 20 parts by mass or less, even more preferably 15 parts by mass or less, and even more preferably 10 parts by mass or less; and the amount of the fine cellulose fibers (conversion amount), based on 100 parts by mass of the resin, is preferably 0.01 parts by mass or more, more preferably 0.05 parts by mass or more, even more preferably 0.1 parts by mass or more, even more preferably 0.5 parts by mass or more, even more preferably 0.8 parts by mass or more, even more preferably 1 part by mass or more, even more preferably 3 parts by mass or more, and still even more preferably 5 parts by mass or more, and preferably 50 parts by mass or less, more preferably 40 parts by mass or less, even more preferably 35 parts by mass or less, even more preferably 30 parts by mass or less, even more preferably 20 parts by mass or less, even more preferably 15 parts by mass or less, and even more preferably 10 parts by mass or less.

<71> The resin composition according to any one of the above <59>, <63>, and <66> to <68>, wherein in a case where the resin is a thermosetting resin, in the resin composition, the content of the resin is preferably 50% by mass or more, more preferably 60% by mass or more, even more preferably 70% by mass or more, even more preferably 80% by mass or more, and even more preferably 85% by mass or more, and preferably 99% by mass or less, more preferably 98% by mass or less, even more preferably 96% by mass or less, even more preferably 90% by mass or less, even more preferably 85% by mass or less, and even more preferably 80% by mass or less;

the amount of the fine cellulose fiber composite, based on 100 parts by mass of the resin, is preferably 0.01 parts by mass or more, more preferably 0M5 parts by mass or more, even more preferably 0.1 parts by mass or more, even more preferably 0.5 parts by mass or more, even more preferably 1 part by mass or more, even more preferably 3 parts by mass or more, even more preferably 7 parts by mass or more, even more preferably 10 parts by mass or more, and even more preferably 15 parts by mass or more, and preferably 100 parts by mass or less, more preferably 70 parts by mass or less, even more preferably 50 parts by mass or less, even more preferably 40 parts by mass or less, even more preferably 30 parts by mass or less, even more preferably 20 parts by mass or less, even more preferably 15 parts by mass or less, and even more preferably 10 parts by mass or less; and the amount of the fine cellulose fibers (conversion amount), based on 100 parts by mass of the resin, is preferably 0.01 parts by mass or more, more preferably 0.05 parts by mass or more, even more preferably 0.08 parts by mass or more, even more preferably 0.1 parts by mass or more, even more preferably 0.5 parts by mass or more, even more preferably 0.8 parts by mass or more, even more preferably 1 part by mass or more, even more preferably 3 parts by mass or more, even more preferably 5 parts by mass or more, and even more preferably 8 parts by mass or more, and preferably 50 parts by mass or less, more preferably 40 parts by mass or less, even more preferably 35 parts by mass or less, even more preferably 30 parts by mass or less, even more preferably 20 parts by mass or less, even more preferably 15 parts by mass or less, even more preferably 10 parts by mass or less, even more preferably 5 parts by mass or less, and even more preferably 3 parts by mass or less.

<72> The resin composition according to any one of the above <59> to <71>, wherein the resin composition can be prepared by subjecting raw materials containing a thermoplastic resin or a curable resin and a fine cellulose fiber composite, and further optionally various additives to melt-kneading or a solvent casting method.

<73> The resin composition according to any one of the above <59> to <72>, which can be suitably used in various applications such as daily sundries, household electric appliance parts, and automobile parts, and especially more suitably used in automobile applications.

<74> A resin molded article which can be prepared by subjecting a resin composition as defined in any one of the above <59> to <73> to molding such as extrusion molding, injection molding, or press molding.

<75> The molded article according to the above <74>, wherein the molded article is in a sheet-like form, and has a thickness of preferably 0.05 mm or more, more preferably 0.1 mm or more, and even more preferably 0.15 mm or more, and preferably 1.5 mm or less, more preferably 1.0 mm or less, and even more preferably 0.5 mm or less.

EXAMPLES

The present invention will be described more specifically by means of the following Examples and Comparative Examples, without intending to limit the scope of the present invention to the following Examples.

[Average Fiber Size of Fine Cellulose Fibers]

Water is added to fine cellulose fibers to provide a dispersion of which concentration is 0.0001% by mass. The dispersion is added dropwise to mica (mica), and dried to provide an observation sample. A fiber height of the cellulose fibers in the observation sample is measured with an atomic force microscope (AFM, Nanoscope III Tapping mode AFM, manufactured by Digital Instrument, a probe used being Point Probe (NCH) manufactured by NANOSENSORS. During that measurement, five or more sets of fine cellulose fibers are extracted from a microscopic image in which the cellulose fibers can be confirmed, and an average fiber size is calculated from those fiber heights.

[Carboxy Group Contents of Fine Cellulose Fibers and Fine Cellulose Fiber Composite]

Fine cellulose fibers or a fine cellulose fiber composite with the mass of 0.5 g on a dry basis is placed in a 100 mL beaker, a mixed solvent of (ion-exchanged water or methanol)/water=2/1 is added thereto to make up a total volume of 55 mL. Five milliliters of a 0.01 M aqueous sodium chloride solution is added thereto to provide a dispersion, and the dispersion is stirred until the fine cellulose fibers or the fine cellulose fiber composite is sufficiently dispersed. A 0.1 M hydrochloric acid is added to this dispersion to adjust its pH to 2.5 to 3, and a 0.05 M aqueous sodium hydroxide solution is added dropwise to the dispersion with an automated titration instrument manufactured by DKK-TOA CORPORATION under the trade name of "AUT-50," under the conditions of a waiting time of 60 seconds. The values of electroconductivity and a pH are measured every minute, and the measurements are continued up to a pH of 11 or so to obtain an electroconductivity curve. A titrated amount of sodium hydroxide is obtained from this electroconductivity curve, and the carboxy group content of the fine cellulose fibers or the fine cellulose fiber composite is calculated in accordance with the following formulas:

Carboxy Group Content (mmol/g)=Titrated Amount of Sodium Hydroxide×Aqueous Sodium Hydroxide Solution Concentration (0.05 M)/Mass of Cellulose Fibers (0.5 g)

[Average Binding Amount and Modification Ratio (Amide-Formation Ratio) of Amide Group Having EO/PO Copolymer Moiety or PO Polymer Moiety of Fine Cellulose Fiber Composite]

The average binding amount of the amide group having an EO/PO copolymer moiety or a PO polymer moiety in the fine cellulose fiber composite is calculated by the following formula.

Binding Amount of Amide Group Having EO/PO Copolymer Moiety or PO Polymer Moiety (mmol/g)=Carboxy Group Content of Fine Cellulose Fibers Before Introducing Amide Group (mmol/g)−Carboxy Group Content of Fine Cellulose Fibers After Introducing Amide Group (mmol/g)

Modification Ratio (%) (Amide-Formation Ratio (%))={Binding Amount of the Amide Group (mmol/g)/Carboxy Group Content (mmol/g) in Fine Cellulose Fibers Before Introducing the Amide Group}×100

Preparation Example 1 of Fine Cellulose Fibers—Dispersion of Carboxy Group-Containing Fine Cellulose Fibers Obtained by Treating Natural Cellulose with N-Oxyl Compound Needle-leaf bleached kraft pulp manufactured by Fletcher Challenge Canada Ltd., under the trade name of "Machenzie," CSF 650 ml, was used as natural cellulose fibers. As TEMPO, a commercially available product manufactured by ALDRICH, Free radical, 98% by mass, was used. As sodium hypochlorite, a commercially available product manufactured by Wako Pure Chemical Industries, Ltd. was used. As sodium bromide, a commercially available product manufactured by Wako Pure Chemical Industries, Ltd. was used.

First, 100 g of the needle-leaf bleached kraft pulp fibers were sufficiently stirred in 9,900 g of ion-exchanged water, and 1.25% by mass of TEMPO, 12.5% by mass of sodium bromide, and 28.4% by mass of sodium hypochlorite were added in that order to 100 g of the mass of the pulp. Using a pH stud, a 0.5 M sodium hydroxide was added dropwise to keep a pH at 10.5. After the reaction was carried out at 20° C. for 120 minutes, the dropwise addition of sodium hydroxide was stopped, to provide oxidized pulp. The oxidized pulp obtained was sufficiently washed with ion-exchanged water, and subsequently subjected to a dehydration treatment. Thereafter, 3.9 g of the oxidized pulp and 296.1 g of ion-exchanged water were subjected twice to a finely pulverizing treatment with a high-pressure homogenizer manufactured by Sugino Machine Limited, Starburstlabo HJP-2 5005 at 245 MPa, to provide a dispersion of carboxy group-containing fine cellulose fibers, a solid content concentration of which was 1.3% by mass. The resulting fine cellulose fibers had an average fiber size of 3.3 nm and a carboxy group content of 1.4 mmol/g.

Preparation Example 2 of Fine Cellulose Fibers—Dispersion of Carboxy Group-Containing Fine Cellulose Fibers Obtained by Acidic Treatment In a beaker, 4,085 g of ion-exchanged water was added to 4,088.75 g of a dispersion of carboxy group-containing fine cellulose fibers obtained in Preparation Example 1, a solid content concentration of which was 1.3% by mass, to provide a 0.5% by mass aqueous solution, and the aqueous solution was stirred with a mechanical stirrer at room temperature, 25° C., for 30 minutes. Next, the beaker was charged with 245 g of a 1 M aqueous hydrochloric acid solution, and the contents were allowed to react for 1 hour at room temperature. After the termination of the reaction, the reaction mixture was reprecipitated with acetone, the precipitates were filtered, and thereafter the residue was washed with acetone/ion-exchanged water, to remove hydrochloric acid and salt. Finally, acetone was added thereto, and the mixture was filtered, to provide a dispersion of acetone-containing acidic cellulose fibers in a state that the carboxy group-containing fine cellulose fibers were swollen with acetone, a solid content concentration of which was 5.0% by mass. After the termination of the reaction, the reaction mixture was filtered, and thereafter the residue was washed with ion-exchanged water to remove hydrochloric acid and salt. The washed mixture was subjected to a solvent replacement with acetone, and thereafter subjected to a solvent replacement with IPA, to provide a dispersion of IPA-containing acidic cellulose fibers in a state that the carboxy group-containing fine cellulose fibers were swollen, a solid content concentration of which was 5.0% by mass. The resulting fine cellulose fibers had an average fiber size of 3.3 nm and a carboxy group content of 1.4 mmol/g.

Preparation Example 1 of Plasticizer—Diester Obtained from Succinic Acid and Triethylene Glycol Monomethyl Ether A 3-L flask equipped with a stirrer, a thermometer, and a dehydration tube was charged with 500 g of succinic anhydride, 2,463 g of triethylene glycol monomethyl ether, and 9.5 g of paratoluenesulfonic acid monohydrate, and the contents were allowed to react at 110° C. for 15 hours under a reduced pressure of from 4 to 10.7 kPa, while blowing nitrogen at 500 mL/min in a space portion. The liquid reaction mixture had an acid value of 1.6 mgKOH/g. To the liquid reaction mixture was added 27 g of an adsorbent KYOWAAD 500SH manufactured by Kyowa Chemical Industry Co., Ltd., and the mixture was stirred at 80° C. and 2.7 kPa for 45 minutes, and filtered. Thereafter, triethylene glycol monomethyl ether was distilled off at a liquid temperature of from 115° to 200° C. and a pressure of 0.03 kPa, and after cooling to 80° C., the residual liquid was filtered under a reduced pressure, to provide a diester obtained from succinic acid and triethylene glycol monomethyl ether as a filtrate. The diester obtained had an acid value of 0.2 mgKOH/g, a saponification value of 276 mgKOH/g, a hydroxyl value of 1 mgKOH/g or less, and a hue APHA of 200.

Production Examples 1 to 9 of Amines Having EO/PO Copolymer Moiety or PO Polymer Moiety (Amine with EOPO Copolymer, Amine with PO Polymer)

A 1-L autoclave was charged with 132 g (1 mol) of propylene glycol tertiary butyl ether, and the content was heated to 75° C., 1.2 g of a flake-like potassium hydroxide was added thereto, and stirred until being dissolved. Next, ethylene oxide (EO) and propylene oxide (PO) in amounts as listed in Table 1 were allowed to react therewith at 110° C. and 0.34 MPa, and 7.14 g of magnesium silicate Magnesol 30/40, manufactured by Dallas Group of America was then introduced thereto. The mixture was neutralized at 95° C., and 0.16 g of di-tertiary butyl-p-cresol was added to the reaction product obtained and mixed, and thereafter filtered to provide a polyether, an EO/PO copolymer or a PO polymer.

On the other hand, the polyether obtained above was fed at 8.4 mL/min, ammonia at 12.6 mL/min and hydrogen at 0.8 mL/min, respectively, to a 1.250 mL tubular reaction vessel filled with catalysts of nickel oxide/copper oxide/chromium oxide at a molar ratio of 75/23/2, manufactured by Wako Pure Chemicals Industries, Ltd. The temperature of the reaction vessel was maintained at 190° C., and the pressure was maintained at 14 MPa. Thereafter, a crude discharged liquid from the vessel was distilled off at 70° C. and 3.5 mmHg for 30 minutes. A flask was charged with 200 g of the amino-forming polyether obtained and 93.6 g of a 15% aqueous hydrochloric acid solution, the reaction mixture was heated at 100° C. for 3.75 hours, to allow the tertiary butyl ether to open with the acid. Subsequently, the product was neutralized with 144 g of a 15% aqueous potassium hydroxide solution. Next, the neutralized product was distilled off at 112° C. under a reduced pressure for one hour, and the residue was filtered, to provide a monoamine having an EO/PO copolymer moiety or a PO polymer represented by the formula (i). Here, in the monoamine obtained the EO/PO copolymer moiety or the PO polymer and the amine are directly bound, and $R_1$ in the formula (i) is a hydrogen atom.

Here, the molecular weight of the amine with a copolymer moiety was calculated, for example, in a case of the amine of Production Example 1, as follows:

2,201 [molecular weight of EO (44.03)×number of moles of EO added (50)]+697 [molecular weight of PO (58.04)×number of moles of PO added (12.0)]+58.04 [molecular weight of PO moiety of the starting raw materials (propylene glycol)]=2,956, which was rounded up to 3,000.

Production Examples 1-1 to -11 of Fine Cellulose Fiber Composite—Examples 1-1 to -9 and Comparative Examples 1-1 to -2

A beaker equipped with a magnetic stirrer and a stirring bar was charged with 35 g of a dispersion of carboxy group-containing fine cellulose fibers, of which solid content was 5.4% by mass, obtained in Preparation Example 2 of Fine Cellulose Fibers. Subsequently, the beaker was charged with an amine of the kinds as listed in Tables 1 and 2 each in an amount corresponding to 5 mol of amine groups based on one mol of carboxy groups of the fine cellulose fibers, and 3.78 g of 4-(4,6-dimethoxy-1,3,5-triazin-2-yl)-4-methylmorpholinium chloride (DMT-MM), a condensing agent, and dissolved in 300 g of IPA. The liquid reaction mixture was allowed to react at room temperature, 25° C., for 14 hours. After the termination of the reaction, the reaction mixture was filtered, washed with ion-exchanged water to remove a DMT-MM salt, and washed with acetone, and subjected to solvent replacement, to provide a fine cellulose fiber composite in which the fine cellulose fibers were connected with an EOPO copolymer or a PO polymer, a PEG chain, or a propyl group via an amide bond.

Production Example 1-12 of Fine Cellulose Fiber Composite—Comparative Example 1-3

A beaker equipped with a magnetic stirrer and a stirring bar was charged with 35 g of a dispersion of carboxy group-containing fine cellulose fibers, of which solid content was 5.4% by mass, obtained in Preparation Example 2 of Fine Cellulose Fibers. Subsequently, the beaker was charged with 0.8 g of propylamine, an amount corresponding to 5 mol of amine groups based on one mol of carboxy groups of the fine cellulose fibers, and dissolved in 300 g of ethanol. The liquid reaction mixture was allowed to react at room temperature, 25° C., for 6 hours. After the termination of the reaction, the reaction mixture was filtered, washed with acetone, and subjected to solvent replacement, to provide a fine cellulose fiber composite in which the fine cellulose fibers were connected with a propyl group via an ionic bond.

Preparation Examples 1-1 to -12 of Dispersion of Fine Cellulose Fiber Composite—Examples 1-1 to -9 and Comparative Examples 1-1 to -3

Fine cellulose fibers in the fine cellulose fiber composite of the kinds as listed in Tables 1 and 2 in an amount corresponding to 0.04 g according to the following formula, and 40 g of a diester obtained from succinic acid and triethylene glycol monomethyl ether, synthesized in Preparation Example 1 of Plasticizer, as a dispersant were mixed, and stirred with a ultrasonic homogenizer US-300E, manufactured by NIHONSEIKI KAISHA, LTD. for 2 minutes. Thus, a dispersion of the fine cellulose fiber composite containing a fine cellulose fiber composite and a plasticizer was prepared, of which fine cellulose fiber concentration was 0.10% by mass. Here, the molecular weight of the amine as referred to herein is a molecular weight of the entire amine compound including the copolymer moiety.

Amount of Fine Cellulose Fibers (g)=Fine Cellulose Fiber Composite (g)/[1+Molecular Weight of Amine (g/mol)×Binding Amount of Amine (mmol/g)×0.001]

The properties of the dispersion of the fine cellulose fiber composite obtained were evaluated in accordance with the methods of the following Test Examples 1 to 3. The results are shown in Tables 1 and 2.

Test Example 1—Amount of Aggregates

The dispersion of the fine cellulose fiber composite obtained was observed in a crossed Nicol state using transmitting light with a digital microscope VHX-1000, manufactured by KEYENCE. The image analysis was performed using WINROOF manufactured by MITANI CORPORATION to calculate an area of aggregates. Specifically, the image obtained was monochromatized, and converted to a binary image, and areas of white portions were calculated. The lower the numerical value, the more excellent the transparency.

Test Example 2—Transmittance

Transmittance of the dispersion of the fine cellulose fiber composite obtained was measured at 600 nm using a ultraviolet-visible spectrophotometer, UV-VISIBLE SPECTROMETER UV-2550, manufactured by Shimadzu Corporation, and this was used as an index for transparency. The higher the numerical value, the more excellent the transparency.

Test Example 3—Thermal Degradation Temperature

The dispersion of the fine cellulose fiber composite obtained was dried under a reduced pressure at 60° C. overnight, and thereafter the temperature was raised from 25° to 500° C. at a rate of 10° C./minute, using a thermogravimetric analyzer TG-DTA6300 manufactured by Seiko Instruments, Inc. A temperature at a point where the weight is 5% reduced from that at 100° C. is defined as a thermal degradation temperature, which was used as an index for thermal stability. The higher the numerical value, the more excellent the thermal stability.

TABLE 1

|  |  | Examples | | | | |
| --- | --- | --- | --- | --- | --- | --- |
|  |  | 1-1 | 1-2 | 1-3 | 1-4 | 1-5 |
| Amine | Kinds | Amine with EO/PO Copolymer | Amine with EO/PO Copolymer | Amine with EO/PO Copolymer | Amine with EO/PO Copolymer | Amine with EO/PO Copolymer |
|  | Production Example No. of Amine with EO/PO Copolymer | 1 | 2 | 3 | 4 | 5 |
|  | Amount of EO used, g, number of mol | 2,201 g, 50.0 mol | 1,893 g, 43.0 mol | 1,761 g, 40.0 mol | 1,409 g, 32.0 mol | 837 g, 19.0 mol |
|  | a of formula (i) | 50.0 | 43.0 | 40.0 | 32.0 | 19.0 |
|  | Amount of PO used, g, number of mol | 697 g, 12.0 mol | 58 g, 1.0 mol | 174 g, 3.0 mol | 523 g, 9.0 mol | 1,104 g, 19.0 mol |
|  | b of formula (i) [1] | 13.0 | 2.0 | 4.0 | 10.0 | 20.0 |
|  | PO Content Ratio, % by mol, b × 100/(a + b) | 21 | 4 | 9 | 24 | 51 |
|  | Molecular Weight of Copolymer Moiety | 3,000 | 2,000 | 2,000 | 2,000 | 2,000 |
| Fine Cellulose Fiber Composite | Binding Amount of Amide, mmol/g | 0.28 | 0.36 | 0.39 | 0.38 | 0.39 |
|  | Amide-Formation Ratio, % | 20 | 26 | 28 | 27 | 28 |
| Plasticizer Dispersion | Amount of Aggregates, ×10$^4$ μm$^2$ | 0.5 | 0.8 | 0.4 | 0.4 | 0.6 |
|  | Transmittance, % | 98 | 95 | 99 | 99 | 97 |
|  | Thermal Degradation Temperature, °C. | 286 | 283 | 282 | 282 | 283 |

|  |  | Examples | | | |
| --- | --- | --- | --- | --- | --- |
|  |  | 1-6 | 1-7 | 1-8 | 1-9 |
| Amine | Kinds | Amine with EO/PO Copolymer | Amine with EO/PO Copolymer | Amine with PO Polymer | Amine with EO/PO Copolymer |
|  | Production Example No. of Amine with EO/PO Copolymer | 6 | 7 | 8 | 9 |
|  | Amount of EO used, g, number of mol | 396 g, 9.0 mol | 88 g, 2.0 mol | 0 g, 0 mol | 881 g, 20.0 mol |
|  | a of formula (i) | 9.0 | 2.0 | 0 | 20.0 |
|  | Amount of PO used, g, number of mol | 1,568 g, 27.0 mol | 1,859 g, 32.0 mol | 1,975 g, 34.0 mol | 58 g, 1.0 mol |
|  | b of formula (i) [1] | 28.0 | 33.0 | 35.0 | 2.0 |
|  | PO Content Ratio, % by mol, b × 100/(a + b) | 76 | 94 | 100 | 9 |
|  | Molecular Weight of Copolymer Moiety | 2,000 | 2,000 | 2,000 | 1,000 |
| Fine Cellulose Fiber Composite | Binding Amount of Amide, mmol/g | 0.39 | 0.38 | 0.36 | 0.42 |
|  | Amide-Formation Ratio, % | 28 | 27 | 26 | 30 |
| Plasticizer Dispersion | Amount of Aggregates, ×10$^4$ μm$^2$ | 0.8 | 0.9 | 1.0 | 0.5 |
|  | Transmittance, % | 95 | 94 | 93 | 98 |
|  | Thermal Degradation Temperature, °C. | 283 | 283 | 283 | 278 |

[1] The number of moles totaling 1 mol of propylene glycol from tert-butyl ether of propylene glycol, the raw material.

TABLE 2

|  |  | Comparative Examples | | |
| --- | --- | --- | --- | --- |
|  |  | 1-1 | 1-2 | 1-3 |
| Amine | Kinds | PEG Amine | n-Propyl-amine | n-Propyl-amine |
|  | Molecular Weight | 2,000 | 59 | 59 |
|  | Amount, g | 30.46 g | 1.35 g | 0.80 g |
|  | Binding Form | Amide Bond | Amide Bond | Ionic Bond |
| Fine Cellulose Fiber Composite | Binding Amount of Amide Group, mmol/g | 038 | 0.88 | — |
|  | Amide-Formation Ratio, % | 27 | 63 | — |
| Plasticizer Dispersion | Amount of Aggregates, ×10$^4$ μm$^2$ | 2.0 | 2.4 | 3.1 |
|  | Transmittance, % | 83 | 79 | 72 |
| | Thermal Degradation Temperature, °C. | 280 | 215 | 195 |

* PEG Amine: average molecular weight: 2,000, SUNBRIGHT, MEPA-20H, manufactured by NOF Corporation n-Propylamineamine: C3 amine, manufactured by Wako Pure Chemical Industries, Ltd.

It could be seen from Tables 1 and 2, from the results of the comparisons of Example 1-1 and Example 1-4, even while the PO content ratio in the copolymer moiety was nearly the same, if the molecular weight of the copolymer increased from 2,000 to 3,000, the heat resistance slightly improves, even though the amount of aggregates was slightly increased, and the transmittance was slightly lowered. In addition, from the comparison of Example 1-3 and Example 1-9, even while the PO content ratio in the copolymer moiety was the same, if the molecular weight of the copolymer was decreased from 2,000 to 1,000, the amount of aggregates slightly increased, the transmittance was also slightly lowered, and the heat resistance was also slightly lowered.

From the results of the comparisons of Examples 1-2 to -8, even while the molecular weight of the copolymer was 2,000, which was the same, Examples 1-3 and 1-4 where the PO content ratios in the copolymer moiety were 9 and 24% by mol gave the least amount of aggregates and also high transmittance. On the other hand, Comparative Examples 1-1 and 1-2 where amide-formation was carried out with PEG amine or n-propylamine gave a considerably increased amount of aggregates, and lowered transmittance. Also, it could be seen that a case of Comparative Example 1-3 where an amine salt is formed with n-propylamine gave a larger amount of aggregates and clearly lowered transmittance and heat resistance.

Example 1-10 <Thermoplastic Resin 1>

The fine cellulose fiber composite used in Example 1-4 in an amount as solid content conversion of 0.16 g, and 10 g of a diester obtained from succinic acid and triethylene glycol monomethyl ether, synthesized in Preparation Example 1 of Plasticizer as a dispersant were mixed, and stirred with the ultrasonic homogenizer US-300E for 3 minutes, to provide a dispersion of the fine cellulose fiber composite, of which fine cellulose fiber composite concentration (conversion amount) was about 1% by mass, the dispersion containing the fine cellulose fiber composite and a plasticizer. The amount 10.16 g of this dispersion of the fine cellulose fiber composite and 100 g of a polylactic acid resin, manufactured by Nature works, trade name of N4000, were sequentially added, and the mixture was kneaded with a kneader manufactured by TOYO SEIKI SEISAKU-SHO, trade name "Labo-plastomill," under conditions of a rotational speed of 50 rpm, and 180° C. for 10 minutes to provide a homogeneous mixture. The homogeneous mixture was sequentially pressed with a press machine manufactured by TOYO SEIKI SEISAKU-SHO, trade name "Labo-press," under conditions of at 180° C. and 0.5 MPa for 2 minutes, at 20 MPa for 2 minutes, at 0.5 MPa for 1 minute, and then at 80° C. and 0.5 MPa for 2 minutes, to provide a sheet-like composite material having a thickness of about 0.4 mm.

Comparative Example 1-4

The same procedures as in Example 1-8 were carried out except that a dispersion of a fine cellulose fiber composite was not used, and 10 g of a plasticizer alone was used, to provide a composite material.

Comparative Example 1-5

The same procedures as in Example 1-10 were carried out except that the fine cellulose fiber composite was changed to a fine cellulose fiber composite of Comparative Example 1-1, to provide a composite material.

Comparative Example 1-6

The same procedures as in Example 1-10 were carried out except that the fine cellulose fiber composite was changed to a fine cellulose fiber composite of Comparative Example 1-2, and that the amount of the dispersion of the fine cellulose fiber composite was changed such that the amount of the fine cellulose fibers was in an amount as listed in Table 3 to provide a composite material.

Comparative Example 1-7

The same procedures as in Example 1-10 were carried out except that the fine cellulose fiber composite was changed to a fine cellulose fiber composite of Comparative Example 1-3, and that the amount of the dispersion of the fine cellulose fiber composite was changed such that the amount of the dispersion of the fine cellulose fiber composite was in an amount as listed in Table 3 to provide a composite material.

The properties of the molded article obtained were evaluated in accordance with the methods of the above Test Examples 4 and 5. The results are shown in Table 3. In Table 3, the conversion amount of the fine cellulose fibers was obtained by the above formula.

Test Example 4—Tensile Modulus

Each of the tensile modulus and the tensile strength at yield of the molded article was measured in accordance with a tensile test as prescribed in JIS K7113 using a tensile compression testing machine manufactured by SHIMADZU CORPORATION, under the trade name of presence "Autograph AGS-X". Samples punched through with No. 2 dumbbell were set at a span of 80 mm and measured at a crosshead speed of 50 mm/min. It is shown that the higher the tensile modulus, the more excellent the mechanical strength.

Test Example 5—Transparency

Haze values were measured with a haze meter Model HM-150, manufactured by MURAKAMI COLOR RESEARCH LABORATORY CO., Ltd., and the Haze values were used as indexes for transparency. It is shown that the lower the numerical values, the more excellent the transparency.

TABLE 3

| | | Example | Comparative Examples | | | |
|---|---|---|---|---|---|---|
| | | 1-10 | 1-4 | 1-5 | 1-6 | 1-7 |
| Amine | Kinds | Amine with EO/PO Copolymer | — | PEG Amine | n-Propylamine | n-Propylamine |
| | Production Example No. of Amine with EO/PO Copolymer | 4 | — | — | — | — |
| | Binding Form | Amide Bond | — | Amide Bond | Amide Bond | Ionic Bond |
| Amount of Polylactic Acid Resin, parts by mass | | 100 | 100 | 100 | 100 | 100 |
| Amount of Plasticizer, parts by mass | | 10 | 10 | 10 | 10 | 10 |

TABLE 3-continued

| | Example | Comparative Examples | | | |
|---|---|---|---|---|---|
| | 1-10 | 1-4 | 1-5 | 1-6 | 1-7 |
| Amount of Fine Cellulose Fiber Composite, parts by mass | 0.16 | 0 | 0.16 | 0.11 | 0.11 |
| Amount of Fine Cellulose Fibers, parts by mass, Conversion Amount | 0.09 | 0 | 0.09 | 0.10 | 0.10 |
| Content of Polylactic Acid Resin in Resin Composition, % by mass | 90.8 | 90.9 | 90.8 | 90.8 | 90.8 |
| Content of Plasticizer in Resin Composition, % by mass | 9.06 | 9.1 | 9.06 | 9.08 | 9.08 |
| Content of Fine Cellulose Fiber Composite in Resin Composition, % by mass | 0.14 | 0.0 | 0.14 | 0.12 | 0.12 |
| Properties   Tensile Modulus, GPa | 2.2 | 1.5 | 1.7 | 2.2 | 1.6 |
| Haze, % | 4 | 4 | 7 | 7 | 13 |

* PEG Amine: average molecular weight: 2,000, SUNBRIGHT, MEPA-20H, manufactured by NOF Corporation n-Propylamine: C3 amine, manufactured by Wako Pure Chemical Industries, Ltd.

It could be seen from Table 3 that from the comparison of Example 1-10 and Comparative Examples 1-4 to -7, the thermoplastic resin composition containing a fine cellulose fiber composite of the present invention product can improve the mechanical strength of the resin composition, while maintaining the transparency.

Example 1-11 <Photo-Curable Resin>

A fine cellulose fiber composite used in Example 1-4 was subjected to a solvent replacement with dimethyl formamide (DMF), and a solid content concentration was adjusted to 4.3% by mass. The amount 3.5 g of this dispersion of the fine cellulose composite, 10 g of a urethane acrylate resin UV-3310B manufactured by The Nippon Synthetic Chemical Industry Co., Ltd., and 56 g of DMF were mixed, and the mixture was subjected to a finely pulverizing treatment using a high-pressure homogenizer under conditions of at 60 MPa in one pass and then at 100 MPa in one pass. To a solution obtained was added 0.4 g of 1-hydroxy-cyclohexyphenyl ketone manufactured by Wako Pure Chemical Industries, Ltd. as a photopolymerization initiator, and the mixture was stirred with a planetary centrifugal agitator Awatori Rentaro manufactured by THINKY CORPORATION for 7 minutes. The varnish obtained was applied in a coating thickness of 1.8 mm using a bar coater, and dried at 80° C. for 30 minutes, to remove the solvents. The dried coating film was irradiated using a UV irradiation apparatus manufactured by Fusion Systems Japan Co., Ltd., Light Hammer10 at 200 mJ/cm$^2$ to allow photo-curing, to provide a sheet-like composite material having a thickness of about 0.27 mm.

Example 1-12

The same procedures as in Example 1-11 were carried out except that the dispersion of the fine cellulose fiber composite was changed from 3.5 g to 10.5 g, and DMF was changed from 56 g to 52 g, to provide a composite material.

Example 1-13

The same procedures as in Example 1-11 were carried out except that the dispersion of the fine cellulose fiber composite was changed from 3.5 g to 35 g, and DMF was changed from 56 g to 34 g, to provide a composite material.

Comparative Example 1-8

The same procedures as in Example 1-11 were carried out except that the fine cellulose fiber composite was not added, and DMF was changed from 56 g to 58 g, to provide a composite material.

Comparative Example 1-9

The same procedures as in Example 1-11 were carried out except that the fine cellulose fiber composite was changed to a fine cellulose fiber composite used in Comparative Example 1-1, to provide a composite material.

Comparative Example 1-10

The same procedures as in Example 1-11 were carried out except that the fine cellulose fiber composite was changed to a fine cellulose fiber composite used in Comparative Example 1-2, and the amount of the dispersion was changed such that the fine cellulose fibers were added in an amount as listed in Table 4, to provide a composite material.

The properties of the molded article obtained were evaluated in accordance with the methods of the above Test Examples 4 and 5 and the following Test Examples 6 and 7. The results are shown in Table 4. In Table 4, the conversion amount of the fine cellulose fibers was obtained by the above formula.

Test Example 6—Coefficient of Linear Thermal Expansion

Using a thermal stress-strain measurement apparatus manufactured by SEIKO INSTRUMENTS, under the trade name of "EXSTAR TMA/SS6100," rectangular samples having sizes of a width of 3 mm and a length of 20 mm were measured at a tensile mode with a load of 7 g while raising the temperature at a rate of 5° C. per minute under nitrogen atmosphere. The coefficient of linear thermal expansion was obtained by calculating an average coefficient of linear thermal expansion within the temperature range of from room temperature, 25° C., to 150° C. It is shown that the lower the coefficient of the linear thermal expansion, the more excellent the dimensional stability.

Test Example 7—Storage Modulus

Using a dynamic viscoelastometer manufactured by SII, under the trade name of "DMS6100," rectangular samples having sizes of a width of 5 mm and a length of 20 mm were subjected to measurement in a tensile mode under nitrogen atmosphere at a frequency of 1 Hz, while raising the temperature from −20° to 160° C. at a rate of 2° C. per minute. As the storage modulus, the value at 100° C. was used. It is shown that the higher the storage modulus, the more excellent the heat resistance.

TABLE 4

|  |  | Examples | | | Comparative Examples | | |
| --- | --- | --- | --- | --- | --- | --- | --- |
|  |  | 1-11 | 1-12 | 1-13 | 1-8 | 1-9 | 1-10 |
| Amine | Kinds | Amine with EO/PO Copolymer | Amine with EO/PO Copolymer | Amine with EO/PO Copolymer | — | PEG Amine | n-Propylamine |
|  | Production Example No. of Amine with EO/PO Copolymer | 4 | 4 | 4 | — | — | — |
|  | Binding Form | Amide Bond | Amide Bond | Amide Bond | — | Amide Bond | Amide Bond |
| Amount of Urethane-Acrylate Resin, parts by mass |  | 100 | 100 | 100 | 100 | 100 | 100 |
| Amount of Fine Cellulose Fiber Composite, parts by mass |  | 1.51 | 4.52 | 15.05 | 0 | 1.51 | 0.89 |
| Amount of Fine Cellulose Fibers, parts by mass, Conversion Amount |  | 0.86 | 2.57 | 8.55 | 0 | 0.86 | 0.85 |
| Content of Urethane-Acrylate Resin in Resin Composition, % by mass |  | 98.5 | 95.7 | 86.9 | 100.0 | 98.5 | 99.1 |
| Content of Fine Cellulose Fiber Composite in Resin Composition, % by mass |  | 1.5 | 4.3 | 13.1 | 0.0 | 1.5 | 0.9 |
| Property | Tensile Modulus, GPa | 0.28 | 0.56 | 1.18 | 0.13 | 0.15 | 0.15 |
|  | Haze, % | 0.4 | 0.6 | 0.6 | 0.3 | 1.0 | 3.0 |
|  | Coefficient of Linear Thermal Expansion, ppm/K | 36 | 28 | −10 | 150 | 150 | 140 |
|  | Storage Modulus at 100° C., ×$10^7$ Pa | 10.0 | 17.6 | 18.9 | 1.5 | 1.7 | 1.6 |

* PEG Amine: average molecular weight: 2,000, SUNBRIGHT, MEPA-20H, manufactured by NOF Corporation n-Propylamineamine: C3 amine, manufactured by Wako Pure Chemical Industries, Ltd.

From Table 4, it can be seen from the comparison of Example 1-11 and Comparative Examples 1-8 to -10 that the photo-curable resin composition containing the fine cellulose fiber composite of the present invention product has a high mechanical strength, a high transparency, excellent dimensional stability, and also excellent heat resistance. In addition, it can be seen from the comparison of Examples 1-11 to -13 that even when the content of the fine cellulose fiber composite is increased, the transparency remains high without lowering, the mechanical strength is high, the dimensional stability is excellent, and the heat resistance is excellent.

Example 1-14 <Thermosetting Resin 1>

A fine cellulose fiber composite used in Example 1-4 was subjected to a solvent replacement with DMF, and a solid content concentration was adjusted to 0.4% by mass. The amount 9.4 g of this dispersion of the fine cellulose fiber composite and 2.5 g of an epoxy resin jER828 manufactured by Mitsubishi Chemical Corporation were mixed, and the mixture was subjected to a finely pulverizing treatment using a high-pressure homogenizer under conditions of at 60 MPa in one pass, and then at 100 MPa in one pass. To a solution obtained was added 0.4 g of 2-ethyl-4-methylimidazole manufactured by Wako Pure Chemical Industries, Ltd. as a curing agent, and the mixture was stirred with a planetary centrifugal agitator Awatori Rentaro manufactured by THINKY CORPORATION for 7 minutes. The varnish obtained was applied in a coating thickness of 0.85 mm using a bar coater, and dried at 100° C. for 1 hour, to remove the solvents. Thereafter, the coating film was thermally cured at 150° C. for 2 hours, to provide a sheet-like composite material having a thickness of about 0.2 mm.

Example 1-15

The same procedures as in Example 1-14 were carried out except that the dispersion of the fine cellulose fiber composite was changed from 9.4 g to 28.4 g, and that a coating film thickness was changed from 0.85 mm to 2.1 mm to provide a composite material.

Comparative Example 1-11

The same procedures as in Example 1-14 were carried out except that the fine cellulose fiber composite was not added, and that a coating film thickness was changed from 0.85 mm to 0.20 mm to provide a composite material.

Comparative Example 1-12

The same procedures as in Example 1-14 were carried out except that the fine cellulose fiber composite was changed to a fine cellulose fiber composite used in Comparative Example 1-1 to provide a composite material.

Comparative Example 1-13

The same procedures as in Example 1-14 were carried out except that the fine cellulose fiber composite was changed to a fine cellulose fiber composite used in Comparative Example 1-2, and that the amount of the dispersion was changed such that the fine cellulose fibers are in an amount as listed in Table 5 to provide a composite material.

The properties of the molded article obtained were evaluated in accordance with the methods of the above Test Examples 4 to 7. The results are shown in Table 5. In Table 5, the conversion amount of the fine cellulose fibers was obtained by the above formula.

TABLE 5

| | | Examples | | Comparative Examples | | |
|---|---|---|---|---|---|---|
| | | 1-14 | 1-15 | 1-11 | 1-12 | 1-13 |
| Amine | Kinds | Amine with EO/PO Copolymer | Amine with EO/PO Copolymer | — | PEG Amine | n-Propylamine |
| | Production Example No. of Amine with EO/PO Copolymer | 4 | 4 | — | — | — |
| | Binding Form | Amide Bond | Amide Bond | — | Amide Bond | Amide Bond |
| Content of Epoxy Resin, parts by mass | | 100 | 100 | 100 | 100 | 100 |
| Content of Fine Cellulose Fiber Composite, parts by mass | | 1.50 | 4.54 | 0 | 1.50 | 0.89 |
| Amount of Fine Cellulose Fibers, parts by mass, Conversion Amount | | 0.85 | 2.58 | 0 | 0.85 | 0.85 |
| Content of Epoxy Resin in Resin Composition, % by mass | | 98.5 | 95.7 | 100 | 98.5 | 99.1 |
| Content of Fine Cellulose Fiber Composite in Resin Composition, % by mass | | 1.5 | 4.3 | 0 | 1.5 | 0.9 |
| Properties | Tensile Modulus, GPa | 2.8 | 3.2 | 2.5 | 2.6 | 2.6 |
| | Haze, % | 4.9 | 8.4 | 1 | 10 | 15 |
| | Coefficient of Linear Thermal Expansion, ppm/K | 51 | 35 | 63 | 62 | 63 |
| | Storage Modulus at 100° C., ×10$^7$ Pa | 163 | 225 | 130 | 135 | 133 |

* PEG Amine: average molecular weight: 2,000, SUNBRIGHT, MEPA-20H, manufactured by NOF Corporation n-Propylamine: C3 amine, manufactured by Wako Pure Chemical Industries, Ltd.

It can be seen from Table 5 that from the comparisons of Example 1-14 and Comparative Examples 1-11 to -13, the thermosetting resin composition containing a fine cellulose fiber composite of the present invention product has a high mechanical strength, a relatively high transparency, and excellent dimensional stability and heat resistance. In addition, it can be seen that from the comparison of Examples 1-14 to -15, when the content of the fine cellulose fiber composite is increased, the composite has a high mechanical strength and excellent dimensional stability and heat resistance, even though the transparency is slightly lowered.

Example 1-16 <Thermoplastic Resin 2>

A fine cellulose fiber composite used in Example 1-4 was subjected to a solvent replacement with methyl methacrylate (MMA), and a solid content concentration was adjusted to 1.5% by mass. The amount 5.05 g of this dispersion of the fine cellulose fiber composite was subjected to a finely pulverizing treatment using a high-pressure homogenizer under conditions of at 60 MPa in one pass, and then at 100 MPa in one pass. To a solution obtained was added 0.005 g of 2,2'-azobis(2,4-dimethylvaleronitrile) V-65B, manufactured by Wako Pure Chemical Industries, Ltd. as a polymerization initiator, and the mixture was stirred with a planetary centrifugal agitator Awatori Rentaro manufactured by THINKY CORPORATION for 7 minutes. The polymerizable mixture obtained was injected into a hollow portion of a cell formed by two glass plates facing each other and interposing a flexible gasket made of vinyl chloride, a sealing material for 0.2 mm, the two glass plates having a thickness of 10 mm and being a square of 300 mm each side. The mixture was subjected to vacuum degassing and nitrogen replacement, and polymerized at 65° C. for 2 hours. Thereafter, the polymerized product was dried at 120° C. for 1 hour to provide a sheet-like composite material having a thickness of about 0.2 mm.

Example 1-17

The same procedures as in Example 1-16 were carried out except that the solid content concentration of the dispersion of the fine cellulose fiber composite was changed to 4.3% by mass to provide a composite material.

Example 1-18

The same procedures as in Example 1-16 were carried out except that the solid content concentration of the dispersion of the fine cellulose fiber composite was changed to 16.5% by mass to provide a composite material.

Comparative Example 1-14

The same procedures as in Example 1-16 were carried out except that 5.0 g of methyl methacrylate was used in place of 5.05 g of the dispersion of the fine cellulose fiber composite to provide a composite material.

Comparative Example 1-15

The same procedures as in Example 1-16 were carried out except that the fine cellulose fiber composite was changed to a fine cellulose fiber composite used in Comparative Example 1-1 to provide a composite material.

Comparative Example 1-16

The same procedures as in Example 1-16 were carried out except that the fine cellulose fiber composite was changed to a fine cellulose fiber composite used in Comparative Example 1-2, and that a solid content concentration was changed to 1.1% by mass to provide a composite material.

The properties of the molded article obtained were evaluated in accordance with the methods of the above Test Examples 5 to 7. Here, in Test Example 6, the numerical values at 100° C. and 25° C. were used. It is shown that the higher the storage modulus at 25° C., the more excellent the mechanical strength. The results are shown in Table 6. In Table 6 the conversion amount of the fine cellulose fibers was obtained by the above formula.

TABLE 6

|  |  | Examples | | | Comparative Examples | | |
|---|---|---|---|---|---|---|---|
|  |  | 1-16 | 1-17 | 1-18 | 1-14 | 1-15 | 1-16 |
| Amine | Kinds | Amine with EO/PO Copolymer | Amine with EO/PO Copolymer | Amine with EO/PO Copolymer | — | PEG Amine | n-Propylamine |
|  | Production Example No. of Amine with EO/PO Copolymer | 4 | 4 | 4 | — | — | — |
| Amount of MMA, parts by mass | | 100 | 100 | 100 | 100 | 100 | 100 |
| Amount of Fine Cellulose Fiber Composite, parts by mass | | 1.52 | 4.49 | 19.76 | 0 | 1.52 | 1.11 |
| Amount of Fine Cellulose Fibers, parts by mass, Conversion Amount | | 0.87 | 2.55 | 11.23 | 0 | 0.87 | 1.06 |
| Content of PMMA Resin in Resin Composition, % by mass | | 98.5 | 95.7 | 83.5 | 100 | 98.5 | 98.9 |
| Content of Fine Cellulose Fiber Composite in Resin Composition, % by mass | | 1.5 | 4.3 | 16.5 | 0 | 1.5 | 1.1 |
| Property | Haze, % | 0.3 | 0.3 | 0.3 | 0.3 | 0.6 | 1.3 |
|  | Coefficient of Linear Thermal Expansion, ppm/K | 110 | 79 | 34 | 150 | 150 | 140 |
|  | Storage Modulus at 25° C., ×$10^9$ Pa | 2.6 | 2.8 | 3.2 | 2.4 | 1.8 | 2.2 |
|  | Storage Modulus at 100° C., ×$10^7$ Pa | 2.6 | 3.1 | 3.9 | 1.5 | 1.7 | 1.6 |

* PEG Amine: average molecular weight 2,000, SUNBRIGHT, MEPA-20H, manufactured by NOF Corporation n-Propylamine: C3 amine, manufactured by Wako Pure Chemical Industries, Ltd.

It can be seen from Table 6 that from the comparisons of Example 1-16 and Comparative Examples 1-14 to -16, the thermoplastic resin composition containing the fine cellulose fiber composite of the present invention product has a high mechanical strength, a high transparency, excellent dimensional stability, and also excellent heat resistance. In addition, it can be seen from the comparisons of Examples 1-16 to -18 that even when the content of the fine cellulose fiber composite is increased, the transparency remains high without being lowered, the mechanical strength is high, the dimensional stability is excellent, and the heat resistance is also excellent.

Example 1-19 <Thermosetting Resin 2>

A fine cellulose fiber composite used in Example 1-4 was subjected to a solvent replacement with toluene, and a solid content concentration was adjusted to 1.1% by mass. The amount 3.4 g of this dispersion of the fine cellulose composite, 2.0 g of a styrene-butadiene copolymer SBR Nipol NS210, manufactured by Nippon Zeon Co., Ltd, 0.03 g of a vulcanizing agent sulfur, 0.01 g of a vulcanization accelerator TBBS, 0.06 g of a vulcanization aid zinc oxide, and 43 g of toluene were added together, and stirred at room temperature, 25° C., for 2 hours. After having confirmed of the dissolution, the solution obtained was subjected to a treatment at 150 MPa in two passes with a high-pressure homogenizer. The dispersion obtained was poured to a glass petri dish, and toluene was removed for two days. Thereafter, the residue was dried with a vacuum dryer for 12 hours, and subjected to vulcanization at 150° C. for 1 hour, to provide a sheet-like composite material having a thickness of about 0.2 mm.

Example 1-20

The same procedures as in Example 1-19 were carried out except that the dispersion of the fine cellulose fiber composite was changed from 3.4 g to 17.0 g to provide a composite material.

Example 1-21

The same procedures as in Example 1-19 were carried out except that the dispersion of the fine cellulose fiber composite was changed from 3.4 g to 34.0 g to provide a composite material.

Comparative Example 1-17

The same procedures as in Example 1-19 were carried out except that the dispersion of the fine cellulose fiber composite was changed from 3.4 g to 0 g to provide a composite material.

Comparative Example 1-18

The same procedures as in Example 1-19 were carried out except that the fine cellulose fiber composite was changed to a fine cellulose fiber composite used in Comparative Example 1-1 to provide a composite material.

Comparative Example 1-19

The same procedures as in Example 1-19 were carried out except that the fine cellulose fiber composite was changed to a fine cellulose fiber composite used in Comparative Example 1-2, and that the amount of the dispersion used was changed from 3.4 g to 2.1 g to provide a composite material.

Comparative Example 1-20

The same procedures as in Example 1-19 were carried out except that 0.02 g of carbon black was added in place of adding 3.4 g of the dispersion of the fine cellulose fiber composite to provide a composite material.

Comparative Example 1-21

The same procedures as in Example 1-19 were carried out except that 0.1 g of carbon black was added in place of adding 3.4 g of the dispersion of the fine cellulose fiber composite to provide a composite material.

Comparative Example 1-22

The same procedures as in Example 1-19 were carried out except that 0.2 g of carbon black was added in place of adding 3.4 g of the dispersion of the fine cellulose fiber composite to provide a composite material.

Comparative Example 1-23

The same procedures as in Example 1-19 were carried out except that 1.0 g of carbon black was added in place of adding 3.4 g of the dispersion of the fine cellulose fiber composite to provide a composite material.

The properties of the molded article obtained were evaluated in accordance with the methods of the above Test Examples 6 and 7. Here, in Test Example 7, the numerical values at 100° C. and 25° C. were used. The results are shown in Tables 7 and 8. In Table 7 and 8 the conversion amount of the fine cellulose fibers was obtained by the above formula.

TABLE 7

| | | Examples | | |
|---|---|---|---|---|
| | | 1-19 | 1-20 | 1-21 |
| Amine | Kinds | Amine with EO/PO Copolymer | Amine with EO/PO Copolymer | Amine with EO/PO Copolymer |
| | Production Example No. of Amine with EO/PO Copolymer | 4 | 4 | 4 |
| Amount of SBR Resin, parts by mass | | 100 | 100 | 100 |
| Amount of Fine Cellulose Fiber Composite, parts by mass | | 1.87 | 9.35 | 18.70 |
| Amount of Fine Cellulose Fibers, parts by mass, Conversion Amount | | 1.06 | 5.31 | 10.63 |
| Content of SBR Resin in Resin Composition, % by mass | | 98.2 | 91.4 | 84.2 |
| Content of Fine Cellulose Fiber Composite in Resin Composition, % by mass | | 1.8 | 8.6 | 15.8 |
| Properties | Coefficient of Linear Thermal Expansion, ppm/K | 114 | 47 | 10 |
| | Storage Modulus at 25° C., ×10$^6$ Pa | 3.2 | 13.3 | 36.7 |
| | Storage Modulus at 100° C., ×10$^6$ Pa | 2.0 | 10.9 | 32.5 |

From Tables 7 and 8, it can be seen from the comparisons of Example 1-21 and Comparative Examples 1-17 to -23 that the thermosetting resin composition containing the fine cellulose fiber composite of the present invention product has excellent dimensional stability, a high mechanical strength, and also excellent heat resistance. In addition, it can be seen from the comparisons of Example 1-19 to -21 that if the content of the fine cellulose fiber composite is increased, the dimensional stability is even more excellent, the mechanical strength is high, and the heat resistance is excellent.

Production Example 2-1 of Fine Cellulose Fiber Composite—Example 2-1

<Modification with Second Amine>

A beaker equipped with a magnetic stirrer and a stirring bar was charged with 157 g of the dispersion of carboxy-group containing fine cellulose fibers obtained in Preparation Example 2 of Fine Cellulose Fibers of which solid content concentration was 1.91% by mass. Subsequently, the beaker was charged with 0.58 g of aniline (phenylamine), corresponding to 1.5 mol based on one mol of carboxy groups contained in the carboxy group-containing fine cellulose fibers, 0.58 g of N-methylmorpholine (NMM), and 3.39 g of a condensing agent DMT-MM, and the contents were dissolved in 566 g of DMF. The liquid reaction mixture was allowed to react at room temperature, 25° C., for 14 hours. After the termination of reaction, the reaction product was filtered, washed with ethanol, and the washed mixture was subjected to removal of a DMT-MM salt, washing and solvent replacement, to provide a fine cellulose fiber composite in which the fine cellulose fibers were was bound with a phenyl group via an amide bond.

Here, the binding amount of the modifying group with the second amine, i.e. the binding amount of the second amine, was measured. Specifically, a dried fine cellulose fiber composite was subjected to a determination in accordance with an ATR method using an infrared absorption spectrophotometer (IR) Nicolet 6700 manufactured by Thermo Fisher Scientific K.K., and the binding amount of the modifying group with a second amine was calculated by the following formula:

TABLE 8

| | Comparative Examples | | | | | | |
|---|---|---|---|---|---|---|---|
| | 1-17 | 1-18 | 1-19 | 1-20 | 1-21 | 1-22 | 1-23 |
| Filler | — | PEG Amine | n-Propylamine | Carbon Black | Carbon Black | Carbon Black | Carbon Black |
| Amount of SBR Resin, parts by mass | 100 | 100 | 100 | 100 | 100 | 100 | 100 |
| Amount of Filler, parts by mass | 0 | 1.87 | 1.16 | 1 | 5 | 10 | 50 |
| Amount of Fine Cellulose Fibers, parts by mass, Conversion Amount | 0 | 1.06 | 1.10 | 0 | 0 | 0 | 0 |
| Content of SBR Resin in Resin Composition, % by mass | 100 | 98.2 | 98.9 | 99.0 | 95.2 | 90.9 | 66.7 |
| Content of Filler in Resin Composition. % by mass | 0 | 1.8 | 1.1 | 1.0 | 4.8 | 9.1 | 33.3 |
| Properties Coefficient of Linear Thermal Expansion, ppm/K | 179 | 148 | 146 | 178 | 166 | 155 | 138 |
| Storage Modulus at 25° C., ×10$^6$Pa | 1.3 | 0.7 | 1.4 | 1.6 | 5.5 | 14.2 | 16.1 |
| Storage Modulus at 100° C., ×10$^6$Pa | 0.9 | 0.4 | 0.8 | 1.2 | 2.9 | 6.1 | 7.5 |

\* PEG Amine: average molecular weight: 2,000, SUNBRIGHT, MEPA-20H, manufactured by NOF Corporation n-Propylamineamine: C3 amine, manufactured by Wako Pure Chemical Industries, Ltd.

Binding Amount of Second Amine (mmol/g)=1.4×
[(Peak Intensity of Fine Cellulose Fibers
(Preparation Example 2) at 1720 cm$^{-1}$–Peak
Intensity of Fine Cellulose Fiber Composite
(After Modification with Second Amine) at
1720 cm$^{-1}$)÷Peak Intensity of Fine Cellulose
Fibers (Fine Cellulose Fiber Composite (Preparation Example 2) at 1720 cm$^1$]

Peak Intensity at 1720 cm$^{-1}$: Peak intensity ascribed to the carbonyl group of carboxylic acid Also, the modification ratio with a second amine was calculated by the following formula:

Modification Ratio (%)={Binding Amount of Second
Amine (mmol/g)/Carboxy Group Content in the
Fine Cellulose Fibers Before Introduction
(mmol/g)}×100

<Modification with First Amine>

The amount 0.11 g of an amine with EOPO copolymer prepared in Production Example 4, i.e. 0.07 mol based on one mol of carboxy groups contained in the carboxy group-containing fine cellulose fibers, 0/49 g of NMM, and 2.83 g of DMT-MM were added to 50 g of the dispersion of the fine cellulose fiber composite obtained of which solid content concentration was 5.0% by mass, and the mixture was dissolved with 425 g of DMF. The liquid reaction mixture was allowed to react at room temperature, 25° C., for 14 hours. After the termination of the reaction, the reaction product was filtered, washed with ethanol, and the DMT-MM salt was removed and washed, to provide a fine cellulose fiber composite in which the fine cellulose fibers were bound with a phenyl group via an amide bond, and also bound with an EO/PO copolymer moiety via an amide bond.

Here, the binding amount of the amine having an EO/PO copolymer and a modification ratio thereof were obtained as follows. Specifically, the composite was subjected to an IR determination in the same manner as above, and the binding amount of modifying group with a first amine was calculated as follows:

Binding Amount of First Amine (mmol/g)=1.4×
[(Peak Intensity of Fine Cellulose Fiber Composite (After Modification with Second Amine)
at 1720 cm$^{-1}$–Peak Intensity of Fine Cellulose
Fiber Composite (After Modification with First
Amine) at 1720 cm$^{-1}$)÷Peak Intensity of Fine
Cellulose Fiber Composite (After Modification
with Second Amine) at 1720 cm$^{-1}$]

Peak Intensity at 1720 cm$^{-1}$: Peak intensity ascribed to the carbonyl group of carboxylic acid Modification Ratio (%)={Binding Amount of First
Amine (mmol/g)/Carboxy Group Content in the
Fine Cellulose Fibers Before Introduction
(mmol/g)}×100

Production Example 2-2 of Fine Cellulose Fiber Composite—Example 2-2

The same procedures as in Production Example 2-1 were carried out except that the amount of the amine with an EOPO copolymer used was changed to 0.23 g, that NMM was changed to 0.015 g, and that DMT-MM was changed to 0.085 g, to provide a fine cellulose fiber composite. Here, the binding amount of an amine and the modification ratio were calculated in the same manner as above.

Production Example 2-3 of Fine Cellulose Fiber Composite—Example 2-3

The same procedures as in Production Example 2-1 were carried out except that the amount of the amine with an EOPO copolymer used was changed to 0.45 g, that NMM was changed to 0.029 g, and that DMT-MM was changed to 0.170 g, to provide a fine cellulose fiber composite. Here, the binding amount of an amine and the modification ratio were calculated in the same manner as above.

Production Example 2-4 of Fine Cellulose Fiber Composite—Example 2-4

The same procedures as in Production Example 2-1 were carried out except that the amount of the amine with an EOPO copolymer used was changed to 0.135 g, that NMM was changed to 0.088 g, and that DMT-MM was changed to 0.509 g, to provide a fine cellulose fiber composite. Here, the binding amount of an amine and the modification ratio were calculated in the same manner as above.

Production Example 2-5 of Fine Cellulose Fiber Composite—Example 2-5

The same procedures as in Production Example 2-3 were carried out except that the amount of the aniline used was changed to 0.29 g to provide a fine cellulose fiber composite. Here, the binding amount of an amine and the modification ratio were calculated in the same manner as above.

Production Example 2-6 of Fine Cellulose Fiber Composite—Example 2-6

The same procedures as in Production Example 2-3 were carried out except that the amount of the aniline used was changed to 0.20 g to provide a fine cellulose fiber composite. Here, the binding amount of an amine and the modification ratio were calculated in the same manner as above.

Production Example 2-7 of Fine Cellulose Fiber Composite—Example 2-7

<Modification with Second Amine>

A beaker equipped with a magnetic stirrer and a stirring bar was charged with 157 g of the dispersion of carboxy-group containing fine cellulose fibers obtained in Preparation Example 2 of Fine Cellulose Fibers of which solid content concentration was 1.91% by mass. Subsequently, the beaker was charged with 3.99 g of a 25% aqueous tetrabutylammonium hydroxide solution, and the contents were dissolved with 300 g of ethanol. The liquid reaction mixture was allowed to react at room temperature of 25° C. for 6 hours. After the termination of reaction, the reaction product was filtered, washed with ethanol, and subjected to solvent replacement, to provide a fine cellulose fiber composite in which the fine cellulose fibers were bound with a second amine group via an ionic bond.

<Modification with First Amine>

The amount 0.011 g of an amine with EOPO copolymer prepared in Production Example 4, 0.49 g of NMM, and 2.83 g of DMT-MM were added to 50 g of the dispersion of the fine cellulose fiber composite obtained of which solid content concentration was 5.0% by mass, and the mixture was dissolved with 425 g of DMF. The liquid reaction mixture was allowed to react at room temperature, 25° C., for 14 hours. After the termination of the reaction, the reaction product was filtered, and washed with ethanol, and the DMT-MM salt was removed and washed, to provide a fine cellulose fiber composite in which the fine cellulose fibers were bound with a second amine group via an ionic bond, and also bound with an EO/PO copolymer moiety via an amide bond.

Here, the binding amount of the amine and a modification ratio thereof were calculated in the same manner as above.

Production Example 2-8 of Fine Cellulose Fiber Composite—Example 2-8

The same procedures as in Production Example 2-7 were carried out except that the amount of a 25% aqueous tetrabutylammonium hydroxide solution was changed to 1.35 g to provide a fine cellulose fiber composite. Here, the binding amount of an amine and the modification ratio were calculated in the same manner as above.

Preparation Examples 2-1 to -8 of Dispersion of Fine Cellulose Fiber Composite Dispersion—Examples 2-1 to -8

Fine cellulose fibers in the fine cellulose fiber composite of the kinds as listed in Table 9 in an amount corresponding to 0.04 g according to the following formula, and 40 g of a diester obtained from succinic acid and triethylene glycol monomethyl ether, synthesized in Preparation Example 1 of Plasticizer, as a dispersant were mixed, and stirred with a ultrasonic homogenizer US-300E, manufactured by NIHONSEIKI KAISHA, LTD. for 2 minutes. Thus, a plasticizer dispersion of the fine cellulose fiber composite was prepared, of which fine cellulose fiber concentration was 0.10% by mass.

Amount of Fine Cellulose Fibers (g)=Fine Cellulose Fiber Composite (g)/[1+Molecular Weight of First Amine (g/mol)×Binding Amount of First Amine (mmol/g)×0.001+Molecular Weight of Second Amine (g/mol)×Binding Amount of Second Amine (mmol/g)×0.001]

The properties of the dispersion of the fine cellulose fiber composite obtained were evaluated in accordance with the methods of the above Test Examples 1 to 3. The results are shown in Table 9. Here, the data of Example 1-4 where only the first amine of the same kind was introduced are attached as a reference.

From Table 9, from the results of the comparisons of Examples 2-1 to -4, in a case where a binding amount of the second amine is at a given level, if the modification ratio of the first amine is 3% or so, the aggregates are present in the least amount, and the transmittance is the highest; and if the modification ratio is higher or lower than the above, the amount of aggregates is slightly increased and the transmittance is also slightly lowered. In addition, it can be seen from the comparisons of Example 2-3 and Examples 2-5 and 2-6 that in a case where the binding amount of the first amine is at a given level, the larger the binding amount of the second amine, the smaller the amount of aggregates, and also the higher the transmittance. In addition, it can be seen from the results of the comparisons of Example 1-4 and Examples 2-7 and -8 that similar effects are found even when the second amine is a quaternary alkylammonium.

Example 1-4-2 <Thermosetting Resin 1>

A fine cellulose fiber composite used in Example 1-4 was subjected to solvent replacement with methyl ethyl ketone (MEK), the composite of which solid content concentration was adjusted to 2.7%. The amount 16.3 g of this dispersion of the fine cellulose fiber composite and 2.5 g of an epoxy resin jER828 manufactured by Mitsubishi Chemical Corporation were mixed, and the mixture was subjected to a finely pulverizing treatment using a high-pressure homogenizer under conditions of at 60 MPa in one pass, and then at 100 MPa in one pass. To a solution obtained was added 0.4 g of 2-ethyl-4-methylimidazole as a curing agent, and the mixture was stirred with a planetary centrifugal agitator Awatori Rentaro manufactured by THINKY CORPORATION for 7 minutes. The varnish obtained was applied in a coating thickness of 1.14 mm using a bar coater, and the applied coating was dried at 80° C. for 90 minutes, to remove the solvents. Thereafter, the coating film was thermally cured at

TABLE 9

| | | | Examples | | | | | | | | |
|---|---|---|---|---|---|---|---|---|---|---|---|
| | | | 1-4 | 2-1 | 2-2 | 2-3 | 2-4 | 2-5 | 2-6 | 2-7 | 2-8 |
| Amine | First Amine (Amine with EO/PO Copolymer) | Production Example No. | 4 | 4 | 4 | 4 | 4 | 4 | 4 | 4 | 4 |
| | | Binding Form | Amide Bond | Amide Bond | Amide Bond | Amide Bond | Amide Bond | Amide Bond | Amide Bond | Amide Bond | Amide Bond |
| | Second Amine | Kinds | — | Phenyl-amine | Phenyl-amine | Phenyl-amine | Phenyl-amine | Phenyl-amine | Phenyl-amine | Tetrabutyl-ammonium Hydroxide | Tetrabutyl-ammonium Hydroxide |
| | | Binding Form | — | Amide Bond | Amide Bond | Amide Bond | Amide Bond | Amide Bond | Amide Bond | Ionic Bond | Ionic Bond |
| Fine Cellulose Fiber Composite | First Amine | Binding Amount, mmol/g | 0.38 | 0.02 | 0.04 | 0.08 | 0.25 | 0.08 | 0.08 | 0.08 | 0.08 |
| | | Modification Ratio, % | 27 | 1.4 | 2.9 | 5.7 | 17.9 | 5.7 | 5.7 | 5.7 | 5.7 |
| | Second Amine | Binding Amount, mmol/g | — | 1.12 | 1.12 | 1.12 | 1.12 | 0.56 | 0.37 | 1.12 | 0.37 |
| | | Modification Ratio, % | — | 80.0 | 80.0 | 80.0 | 80.0 | 40.0 | 26.4 | 80.0 | 26.4 |
| | Total of Binding Amounts of First Amine and Second Amine, mmol/g | | 0.38 | 1.14 | 1.16 | 1.20 | 1.37 | 0.64 | 0.45 | 1.20 | 0.45 |
| | Total of Modification Ratio of First Amine and Second Amine, % | | 27 | 81.4 | 82.9 | 85.7 | 97.9 | 45.7 | 32.1 | 85.7 | 32.1 |
| | Ratio of Binding Amounts of First Amine to Second Amine, First Amine/Second Amine | | — | 0.02 | 0.04 | 0.07 | 0.22 | 0.14 | 0.22 | 0.07 | 0.22 |
| Plasticizer Dispersion | Amount of Aggregates, ×10$^4$ μm$^2$ | | 0.4 | 0.8 | 0.4 | 0.4 | 0.6 | 0.8 | 0.9 | 0.5 | 0.9 |
| | Transmittance, % | | 99 | 95 | 99 | 99 | 97 | 95 | 94 | 98 | 93 |
| | Thermal Degradation Temp., ° C. | | 282 | 207 | 208 | 209 | 212 | 209 | 209 | 209 | 209 |

Example 2-1

The same procedures as in Example 1-4-2 were carried out except that the fine cellulose fiber composite was changed to a fine cellulose fiber composite of Example 2-1, that the amount of the dispersion was changed to 10.6 g, and that the film thickness was changed to 0.85 mm to provide a composite material.

Example 2-2

The same procedures as in Example 1-4-2 were carried out except that the fine cellulose fiber composite was changed to a fine cellulose fiber composite of Example 2-2, that the amount of the dispersion was changed to 11.0 g, and that the film thickness was changed to 0.87 mm to provide a composite material.

Example 2-3

The same procedures as in Example 1-4-2 were carried out except that the fine cellulose fiber composite was changed to a fine cellulose fiber composite of Example 2-3, that the amount of the dispersion was changed to 11.7 g, and that the film thickness was changed to 0.91 mm to provide a composite material.

Example 2-4

The same procedures as in Example 1-4-2 were carried out except that the fine cellulose fiber composite was changed to a fine cellulose fiber composite of Example 2-4, that the amount of the dispersion was changed to 14.8 g, and that the film thickness was changed to 1.07 mm to provide a composite material.

Example 2-5

The same procedures as in Example 1-4-2 were carried out except that the fine cellulose fiber composite was changed to a fine cellulose fiber composite of Example 2-5, that the amount of the dispersion was changed to 11.2 g, and that the film thickness was changed to 0.88 mm to provide a composite material.

Example 2-6

The same procedures as in Example 1-4-2 were carried out except that the fine cellulose fiber composite was changed to a fine cellulose fiber composite of Example 2-6, that the amount of the dispersion was changed to 11.1 g, and that the film thickness was changed to 0.88 mm to provide a composite material.

Example 2-7

The same procedures as in Example 1-4-2 were carried out except that the fine cellulose fiber composite was changed to a fine cellulose fiber composite of Example 2-7, that the amount of the dispersion was changed to 13.3 g, and that the film thickness was changed to 0.99 mm to provide a composite material.

Example 2-8

The same procedures as in Example 1-4-2 were carried out except that the fine cellulose fiber composite was changed to a fine cellulose fiber composite of Example 2-8, that the amount of the dispersion was changed to 11.6 g, and that the film thickness was changed to 0.90 mm to provide a composite material.

The properties of the molded article obtained were evaluated in accordance with the methods of the above Test Examples 4 to 7. The results are shown in Table 10. In Table 10, the conversion amount of the fine cellulose fibers was obtained by the above formula, and the conversion amounts of the EOPO copolymer moiety and the second amine were obtained by a calculation from the molecular weight and the binding amount of the amine.

TABLE 10

| | | | Examples | | | | | | | | |
|---|---|---|---|---|---|---|---|---|---|---|---|
| | | | 1-4-2 | 2-1 | 2-2 | 2-3 | 2-4 | 2-5 | 2-6 | 2-7 | 2-8 |
| Amine | First Amine, Amine with EO/PO Copolymer | Production No. | 4 | 4 | 4 | 4 | 4 | 4 | 4 | 4 | 4 |
| | | Binding Form | Amide Bond | Amide Bond | Amide Bond | Amide Bond | Amide Bond | Amide Bond | Amide Bond | Amide Bond | Amide Bond |
| | Second Amine | Kinds | — | Phenyl-amine | Phenyl-amine | Phenyl-amine | Phenyl-amine | Phenyl-amine | Phenyl-amine | Tetrabutyl-ammonium Hydroxide | Tetrabutyl-ammonium Hydroxide |
| | | Binding Form | — | Amide Bond | Amide Bond | Amide Bond | Amide Bond | Amide Bond | Amide Bond | Ionic Bond | Ionic Bond |
| Amount of Epoxy Resin, parts by mass | | | 100 | 100 | 100 | 100 | 100 | 100 | 100 | 100 | 100 |
| Amount of Fine Cellulose Fiber Composite, parts by mass | | | 17.6 | 11.4 | 11.8 | 12.6 | 16.0 | 12.1 | 12.0 | 14.3 | 12.5 |
| Fine Cellulose Fiber Composite | Amount of Fine Cellulose Fibers, parts by mass, Conversion Amount | | 10.0 | 10.0 | 10.0 | 10.0 | 10.0 | 10.0 | 10.0 | 10.0 | 10.0 |
| | EOPO Copolymer Moiety, parts by mass, Conversion Amount | | 7.6 | 0.4 | 0.8 | 1.6 | 5.0 | 1.6 | 1.6 | 1.6 | 1.6 |
| | Second Amine, parts by mass, Conversion Amount | | 0 | 1.0 | 1.0 | 1.0 | 1.0 | 0.5 | 0.4 | 2.7 | 0.9 |
| Content of Epoxy Resin in Resin Composition, % by mass | | | 85.0 | 89.7 | 89.4 | 88.8 | 86.2 | 89.2 | 89.3 | 87.4 | 88.9 |
| Content of Fine Cellulose Fiber Composite in Resin Composition, % by mass | | | 15.0 | 10.3 | 10.6 | 11.2 | 13.8 | 10.8 | 10.7 | 12.6 | 11.1 |
| Property | Tensile Modulus, GPa | | 3.3 | 4.5 | 4.8 | 4.6 | 3.9 | 3.8 | 3.6 | 4.3 | 4.1 |

TABLE 10-continued

| | Examples | | | | | | | | |
|---|---|---|---|---|---|---|---|---|---|
| | 1-4-2 | 2-1 | 2-2 | 2-3 | 2-4 | 2-5 | 2-6 | 2-7 | 2-8 |
| Haze, % | 9.0 | 2.8 | 2.7 | 2.8 | 2.9 | 2.9 | 2.9 | 2.8 | 2.9 |
| Coefficient of Linear Thermal Expansion, ppm/K | 30 | 12 | 3 | 11 | 23 | 24 | 28 | 18 | 22 |
| Storage Modulus at 100° C., ×10$^7$ Pa | 340 | 470 | 494 | 475 | 400 | 388 | 369 | 448 | 413 |

It can be seen from Table 10 that from the comparisons of Example 1-4-2 and Examples 2-1 to -8, the thermosetting resin composition containing a fine cellulose fiber composite in which a first amine and a second amine are used in combination has a high mechanical strength, a high transparency, excellent dimensional stability, and also excellent heat resistance. In addition, it can be seen that from the comparisons of Examples 2-1 to -4, in a case where the number of parts by mass of the second amine is at a given level, when the number of parts by mass of the first amine is 1 part or so, based on 100 parts by mass of the resin, the mechanical strength is the highest, the transparency is high, the dimensional stability is excellent, and the heat resistance is also excellent. In addition, it can be seen from the comparisons of Examples 2-3, -5, and -6 that in a case where the number of parts by mass of the first amine is at a given level, with the increase in the number of parts by mass of the second amine, the mechanical strength, the transparency, the dimensional stability, and the heat resistance are improved.

INDUSTRIAL APPLICABILITY

The fine cellulose fiber composite of the present invention has high dispersibility in the resin and can exhibit an effect of increasing strength, so that the fine cellulose fiber composite is suitably used as various fillers, and the like. Also, the resin composition of the present invention containing a dispersion of the fine cellulose fiber composite can be suitably used in various industrial applications such as daily sundries, household electric appliance parts, wrapping materials for household electric appliance parts, and automobile parts.

The invention claimed is:

1. A resin composition comprising a thermoplastic resin or a curable resin and a fine cellulose fiber composite, wherein
the fine cellulose fiber composite comprises fine cellulose fibers and a polymer having an ethylene oxide/propylene oxide (EO/PO) copolymer moiety or a propylene oxide (PO) polymer moiety, the fine cellulose fibers being connected with the polymer via an amide bond of an amide group which is directly bonded to a C6 position of a cellulose backbone,
the fine cellulose fiber has a cellulose I crystal structure,
the fine cellulose fiber has an average fiber size in the range 0.1 to 200 nanometers, and
the fine cellulose fiber composite has an average fiber size in the range 0.1 to 200 nanometers.

2. The resin composition according to claim 1, wherein the molecular weight of the EO/PO copolymer moiety or the PO polymer moiety is from 500 to 10,000.

3. The resin composition according to claim 1, wherein the average fiber size of the fine cellulose fibers is from 0.1 to 20 nm.

4. The resin composition according to claim 1, wherein the carboxy group content of the fine cellulose fibers is from 0.4 to 3 mmol/g or less.

5. The resin composition according to claim 1, wherein the molecular weight of the EO/PO copolymer moiety or the PO polymer moiety is from 1,000 to 5,000.

6. The resin composition according to claim 1, wherein the PO content ratio in the EO/PO copolymer moiety is 1% by mol or more and less than 100% by mol.

7. The resin composition according to claim 1, wherein the PO content ratio in the EO/PO copolymer moiety is 8% by mol or more and 51% by mol or less.

8. The resin composition according to claim 1, wherein the binding amount of the EO/PO copolymer moiety or the PO polymer moiety in the fine cellulose fiber composite is from 0.01 to 3 mmol/g.

9. The resin composition according to claim 1, wherein the binding amount of the amide group having an EO/PO copolymer moiety or a PO polymer moiety in the fine cellulose fiber composite is from 0.01 to 3 mmol/g.

10. The resin composition according to claim 1, wherein an amide providing said amine bond is formed utilizing an amine having an EO/PO copolymer moiety or a PO polymer moiety comprises a compound represented by the following formula (i):

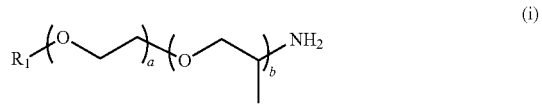

wherein $R_1$ is a hydrogen atom, a linear or branched alkyl group having from 1 to 6 carbon atoms, a —CH$_2$CH(CH$_3$)NH$_2$ group, or a group represented by the following formula (ii); EO and PO are present in a random or block form; a is a number of from 11 to 70 showing an average number of moles of EO added; and b is a number of from 1 to 50 showing an average number of moles of PO added,
wherein the formula (ii) is:

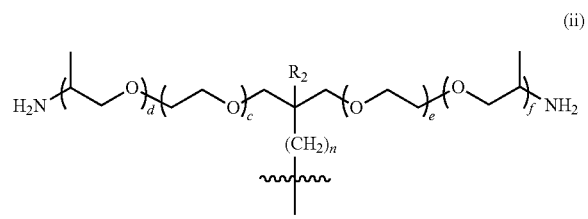

wherein n is 0 or 1; $R_2$ is a phenyl group, a hydrogen atom, or a linear or branched alkyl group having from 1 to 3 carbon atoms; EO and PO are present in a random or block form; c and e show an average number of moles of EO added, which is independently a number of from 0 to 50; and d and f show an average number of moles of PO added, which is independently a number of from 1 to 50.

11. The resin composition according to claim 1, wherein the average fiber size of the fine cellulose fiber composite is from 1 to 100 nm.

12. The resin composition according to claim 1, wherein one or two bindings selected from the group consisting of the following (1) and (2) may be further introduced to the fine cellulose fibers:
   (1) the binding via an ionic bond of a quaternary alkylammonium cation having a total number of carbon atoms of from 4 to 40; and
   (2) the binding via an amide bond of an aromatic hydrocarbon group having a total number of carbon atoms of from 6 to 20.

13. The resin composition according to claim 12, wherein the binding amount of the quaternary alkylammonium compound and/or the amine having an aromatic hydrocarbon group in the fine cellulose fiber composite is from 0.2 to 1.5 mmol/g.

14. The resin composition according to claim 12, wherein a molar ratio of the binding amount of the amine having an EO/PO copolymer moiety or a PO polymer moiety to the binding amount of the quaternary alkylammonium compound and/or the amine having an aromatic hydrocarbon group (the amine having an EO/PO copolymer moiety or a PO polymer moiety/(the quaternary alkylammonium compound and/or the amine having an aromatic hydrocarbon group)) in the fine cellulose fiber composite is from 0.01 to 0.4.

15. The resin composition according to claim 1, wherein the thermoplastic resin comprises a polyester-based resin or a (meth)acrylic resin.

16. The resin composition according to claim 1, wherein the curable resin comprises one or more members selected from the group consisting of urethane (meth)acrylate, epoxy resins, and elastomeric resins.

17. The resin composition according to claim 1, wherein the carboxy group content of the fine cellulose fibers is 0.1 mmol/g or more and 3 mmol/g or less.

18. The resin composition according to claim 1, wherein the fine cellulose fibers are finely pulverized cellulose fibers.

* * * * *